US012185201B2

(12) United States Patent
Konen et al.

(10) Patent No.: US 12,185,201 B2
(45) Date of Patent: *Dec. 31, 2024

(54) ASSET TRACKING SYSTEMS AND METHODS

(71) Applicant: IP CO, LLC, Overland Park, KS (US)

(72) Inventors: Ryan R. Konen, Shawnee, KS (US); Stephen D. Ore, Olathe, KS (US); Timothy J. Carney, Olathe, KS (US); Steve R. Hardwick, Overland Park, KS (US); Dustin M. Gary, Topeka, KS (US); Doran N. Schwartz, Kansas City, MO (US); Jarrod B. Piper, Topeka, KS (US); Matthew J.H. Kenney, Manhattan, KS (US); Daniel A. Holmgren, Wamego, KS (US)

(73) Assignee: ROOSTER, LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,400

(22) Filed: Nov. 2, 2023

(65) Prior Publication Data
US 2024/0064497 A1 Feb. 22, 2024

Related U.S. Application Data

(63) Continuation of application No. 18/090,007, filed on Dec. 28, 2022, now Pat. No. 11,844,001, which is a
(Continued)

(51) Int. Cl.
H04W 4/35 (2018.01)
H04W 4/50 (2018.01)
(Continued)

(52) U.S. Cl.
CPC ............ *H04W 4/35* (2018.02); *H04W 4/50* (2018.02); *H04W 4/70* (2018.02); *H04W 76/15* (2018.02);
(Continued)

(58) Field of Classification Search
CPC .......... H04W 4/30; H04W 4/35; H04W 4/50; H04W 4/70; H04W 76/10; H04W 76/15;
(Continued)

(56) References Cited

U.S. PATENT DOCUMENTS 5,892,441 A 4/1999 Woolley et al.
5,977,913 A 11/1999 Christ
(Continued)

FOREIGN PATENT DOCUMENTS

AU 2009210525 B2 7/2013
AU 2017100671 B4 2/2018
(Continued)

OTHER PUBLICATIONS

Augustin A., et al., "A Study of LoRa: Long Range & Low Power Networks for the Internet of Things," MDPI Sensors, Sep. 9, 2016, vol. 16 (1466), 18 pages.
(Continued)

Primary Examiner — Jenee Holland
(74) Attorney, Agent, or Firm — Polsinelli PC

(57) ABSTRACT

Asset tracking systems and methods include one or more tracking devices that pair with one or more hub devices to transmit sensor data from a tracking device only to a paired hub device with a hub device state quality rating, and from the paired hub device to a network server, thereby reducing redundant communications and communication network usage.

30 Claims, 8 Drawing Sheets

Related U.S. Application Data continuation of application No. 16/998,293, filed on Aug. 20, 2020, now Pat. No. 11,589,195.

(51) Int. Cl.
*H04W 4/70* (2018.01)
*H04W 76/15* (2018.01)
*H04W 76/18* (2018.01)
*H04W 76/19* (2018.01)
*G06K 19/077* (2006.01)

(52) U.S. Cl.
CPC ........... *H04W 76/18* (2018.02); *H04W 76/19* (2018.02); *G06K 19/07758* (2013.01)

(58) Field of Classification Search
CPC . H04W 76/18; H04W 76/19; G06K 19/07758
See application file for complete search history.

(56) References Cited

U.S. PATENT DOCUMENTS

| | | |
|---|---|---|
| 7,292,956 B1 | 11/2007 | Guday et al. |
| 7,693,093 B2 | 4/2010 | Riedel et al. |
| 7,702,290 B1 | 4/2010 | Myers |
| 8,125,896 B2 | 2/2012 | Cohen et al. |
| 8,213,405 B2 | 7/2012 | Horn et al. |
| 8,340,289 B2 | 12/2012 | Adams et al. |
| 9,298,954 B1 | 3/2016 | Ewing |
| 9,411,936 B2 | 8/2016 | Landrum et al. |
| 9,445,032 B2 | 9/2016 | Muth |
| 9,654,931 B2 | 5/2017 | Wang et al. |
| 9,734,480 B2 | 8/2017 | Kerai |
| 9,794,095 B2 | 10/2017 | Sornin et al. |
| 9,913,230 B1 | 3/2018 | Tyagi et al. |
| 9,960,933 B2 | 5/2018 | Ghosh et al. |
| 10,045,415 B1 | 8/2018 | Coombes et al. |
| 10,047,921 B2 | 8/2018 | Coombes et al. |
| 10,075,334 B1 | 9/2018 | Kozura et al. |
| 10,075,813 B1 | 9/2018 | Struhsaker et al. |
| 10,129,700 B2 | 11/2018 | Singamsetty et al. |
| 10,187,870 B1 | 1/2019 | Achamola et al. |
| 10,197,661 B1 | 2/2019 | Girimaji et al. |
| 10,212,030 B2 | 2/2019 | Chakrabarti et al. |
| 10,212,494 B1 | 2/2019 | Struhsaker et al. |
| 10,225,009 B2 | 3/2019 | Cress et al. |
| 10,231,267 B2 | 3/2019 | Lee et al. |
| 10,291,477 B1 | 5/2019 | Askar |
| 10,306,397 B2 | 5/2019 | La et al. |
| 10,313,842 B2 | 6/2019 | Nolan et al. |
| 10,326,556 B2 | 6/2019 | Batura et al. |
| 10,334,333 B2 | 6/2019 | Struhsaker et al. |
| 10,356,820 B1 | 7/2019 | Kim et al. |
| 10,383,060 B2 | 8/2019 | Gilson et al. |
| 10,397,013 B1 | 8/2019 | Hill et al. |
| 10,455,640 B2 | 10/2019 | Nolan et al. |
| 10,475,323 B1 | 11/2019 | Ross |
| 10,477,549 B2 | 11/2019 | Watts |
| 10,477,600 B1 | 11/2019 | Willis et al. |
| 10,492,730 B1 | 12/2019 | Mehta |
| 10,505,662 B2 | 12/2019 | Vissers et al. |
| 10,582,548 B2 | 3/2020 | Kwag et al. |
| 10,693,672 B2 | 6/2020 | Goldstein et al. |
| 10,854,061 B2 | 12/2020 | Skaaksrud |
| 10,855,321 B2 | 12/2020 | Zalewski et al. |
| 10,945,105 B1 | 3/2021 | Konen et al. |
| 2002/0024443 A1 | 2/2002 | Hawkins et al. |
| 2005/0030924 A1 | 2/2005 | Yano et al. |
| 2005/0174235 A1 | 8/2005 | Davis et al. |
| 2006/0009240 A1 | 1/2006 | Katz |
| 2007/0021100 A1 | 1/2007 | Haave et al. |
| 2007/0055805 A1 | 3/2007 | Hayashi et al. |
| 2008/0040244 A1 | 2/2008 | Ricciuti et al. |
| 2008/0061963 A1 | 3/2008 | Schnitz et al. |
| 2008/0126533 A1 | 5/2008 | Klein et al. |
| 2009/0042561 A1 | 2/2009 | Jackson |
| 2009/0045970 A1 | 2/2009 | Miyabayashi et al. |
| 2009/0051823 A1 | 2/2009 | Tsurumoto et al. |
| 2009/0125918 A1 | 5/2009 | Kansal et al. |
| 2009/0195407 A1 | 8/2009 | Nakano et al. |
| 2009/0310501 A1 | 12/2009 | Catovic et al. |
| 2010/0120365 A1 | 5/2010 | Sim et al. |
| 2010/0214908 A1 | 8/2010 | Ralev |
| 2010/0265061 A1 | 10/2010 | Harmon et al. |
| 2011/0119507 A1 | 5/2011 | Reidt |
| 2011/0260858 A1 | 10/2011 | Eruchimovitch et al. |
| 2012/0182939 A1 | 7/2012 | Rajan et al. |
| 2012/0260118 A1 | 10/2012 | Jiang et al. |
| 2012/0284427 A1 | 11/2012 | Dods et al. |
| 2012/0300860 A1 | 11/2012 | Washiro |
| 2013/0013757 A1 | 1/2013 | Millington et al. |
| 2013/0322400 A1 | 12/2013 | Visuri et al. |
| 2014/0003342 A1 | 1/2014 | Sheriff et al. |
| 2014/0055243 A1 | 2/2014 | Kerai |
| 2014/0133353 A1 | 5/2014 | Jung et al. |
| 2014/0157135 A1 | 6/2014 | Lee et al. |
| 2014/0163867 A1 | 6/2014 | Fernandez |
| 2014/0236365 A1 | 8/2014 | Martin et al. |
| 2014/0344269 A1 | 11/2014 | Dong et al. |
| 2014/0357295 A1 | 12/2014 | Skomra et al. |
| 2015/0002274 A1 | 1/2015 | Sengstaken, Jr. |
| 2015/0067151 A1 | 3/2015 | Sands et al. |
| 2015/0139197 A1 | 5/2015 | He et al. |
| 2015/0213295 A1 | 7/2015 | Ginsburg et al. |
| 2015/0262443 A1 | 9/2015 | Chong |
| 2015/0295684 A1 | 10/2015 | Jin et al. |
| 2015/0302377 A1 | 10/2015 | Sweitzer et al. |
| 2015/0365902 A1 | 12/2015 | Ur et al. |
| 2015/0381737 A1 | 12/2015 | Quinn et al. |
| 2016/0021502 A1 | 1/2016 | Kim et al. |
| 2016/0026201 A1 | 1/2016 | Vellanki et al. |
| 2016/0028646 A1 | 1/2016 | Fablet et al. |
| 2016/0128121 A1 | 5/2016 | Koriyama |
| 2016/0128123 A1 | 5/2016 | Li |
| 2016/0149767 A1 | 5/2016 | Britt et al. |
| 2016/0150021 A1 | 5/2016 | Britt et al. |
| 2016/0170477 A1 | 6/2016 | Flack et al. |
| 2016/0173185 A1 | 6/2016 | Kang et al. |
| 2016/0197772 A1 | 7/2016 | Britt et al. |
| 2016/0216362 A1 | 7/2016 | Subramanian et al. |
| 2016/0219516 A1 | 7/2016 | Subramanian et al. |
| 2016/0224046 A1 | 8/2016 | Hsieh et al. |
| 2016/0227350 A1 | 8/2016 | Zhang et al. |
| 2016/0227351 A1 | 8/2016 | Gu et al. |
| 2016/0253394 A1 | 9/2016 | Elias et al. |
| 2016/0260301 A1 | 9/2016 | Miller et al. |
| 2016/0262191 A1 | 9/2016 | Flynn et al. |
| 2016/0278014 A1 | 9/2016 | Chen |
| 2016/0284185 A1 | 9/2016 | Maison et al. |
| 2016/0292938 A1 | 10/2016 | Zakaria |
| 2016/0316375 A1 | 10/2016 | Li |
| 2016/0323156 A1 | 11/2016 | Zakaria |
| 2016/0323257 A1 | 11/2016 | Kang et al. |
| 2016/0337322 A1 | 11/2016 | Kang et al. |
| 2017/0019873 A1 | 1/2017 | Britt |
| 2017/0025892 A1 | 1/2017 | Van Ostrand et al. |
| 2017/0055104 A1 | 2/2017 | Wegelin et al. |
| 2017/0055110 A1 | 2/2017 | Tian et al. |
| 2017/0055148 A1 | 2/2017 | Zimmerman et al. |
| 2017/0150533 A1 | 5/2017 | Alipour et al. |
| 2017/0171204 A1 | 6/2017 | Forood et al. |
| 2017/0214852 A1 | 7/2017 | Yoon et al. |
| 2017/0223653 A1 | 8/2017 | Weitnauer et al. |
| 2017/0278061 A1 | 9/2017 | Skaaksrud |
| 2017/0295253 A1 | 10/2017 | Siegel et al. |
| 2017/0318421 A1 | 11/2017 | Kim et al. |
| 2017/0323555 A1 | 11/2017 | Embree et al. |
| 2017/0347887 A1 | 12/2017 | Jin et al. |
| 2017/0358202 A1 | 12/2017 | Park et al. |
| 2017/0365157 A1 | 12/2017 | Shoari et al. |
| 2017/0366956 A1 | 12/2017 | Yoshida et al. |
| 2018/0038937 A1 | 2/2018 | Afzal |
| 2018/0077743 A1 | 3/2018 | Li |
| 2018/0091989 A1 | 3/2018 | Baroudi et al. |
| 2018/0124590 A1 | 5/2018 | O'Connell et al. |

(56) References Cited

U.S. PATENT DOCUMENTS

| | | |
|---|---|---|
| 2018/0137858 A1 | 5/2018 | Saxena et al. |
| 2018/0139274 A1 | 5/2018 | Gandhi et al. |
| 2018/0160269 A1 | 6/2018 | Baarman et al. |
| 2018/0191717 A1 | 7/2018 | Rajagopal et al. |
| 2018/0234454 A1 | 8/2018 | Aggarwal et al. |
| 2018/0295541 A1 | 10/2018 | Hall et al. |
| 2018/0309831 A1 | 10/2018 | Sherman et al. |
| 2018/0332443 A1 | 11/2018 | Novo Diaz et al. |
| 2018/0367374 A1* | 12/2018 | Liu .................... H04W 16/28 |
| 2018/0373304 A1 | 12/2018 | Davis et al. |
| 2019/0005956 A1 | 1/2019 | Bhattacharya et al. |
| 2019/0041484 A1 | 2/2019 | Mishra et al. |
| 2019/0042227 A1 | 2/2019 | Sharma |
| 2019/0066483 A1 | 2/2019 | Darling et al. |
| 2019/0069241 A1 | 2/2019 | Gilson et al. |
| 2019/0075025 A1 | 3/2019 | McCann et al. |
| 2019/0082038 A1 | 3/2019 | Ma et al. |
| 2019/0089761 A1 | 3/2019 | Lee |
| 2019/0238202 A1 | 8/2019 | Chavva et al. |
| 2019/0281370 A1 | 9/2019 | Struhsaker et al. |
| 2019/0305875 A1 | 10/2019 | Xue |
| 2019/0306880 A1 | 10/2019 | Ribeiro Blard et al. |
| 2019/0319780 A1 | 10/2019 | Teo et al. |
| 2019/0357023 A1 | 11/2019 | Park |
| 2019/0364590 A1 | 11/2019 | Sartori et al. |
| 2019/0377399 A1 | 12/2019 | Cannell et al. |
| 2020/0026674 A1 | 1/2020 | Tune |
| 2020/0037053 A1 | 1/2020 | Cobb |
| 2020/0050753 A1 | 2/2020 | Davis et al. |
| 2020/0051015 A1 | 2/2020 | Davis et al. |
| 2020/0145175 A1 | 5/2020 | Hassan Hussein et al. |
| 2020/0186985 A1 | 6/2020 | Dinata et al. |
| 2020/0195321 A1 | 6/2020 | Black et al. |
| 2020/0195323 A1 | 6/2020 | Black et al. |
| 2020/0204010 A1 | 6/2020 | Pettinotto et al. |
| 2020/0252876 A1 | 8/2020 | Yeon et al. |
| 2020/0314742 A1 | 10/2020 | Jantzi et al. |
| 2021/0099349 A1 | 4/2021 | Lee et al. |

FOREIGN PATENT DOCUMENTS

| | | |
|---|---|---|
| CA | 2713798 C | 8/2015 |
| CA | 2891428 C | 7/2016 |
| CA | 3014958 A1 | 2/2019 |
| CA | 3043924 C | 8/2019 |
| CN | 206133913 U | 4/2017 |
| CN | 107135554 A | 9/2017 |
| CN | 206523771 U | 9/2017 |
| CN | 107635254 A | 1/2018 |
| CN | 206974423 U | 2/2018 |
| CN | 207008416 U | 2/2018 |
| CN | 207200765 U | 4/2018 |
| CN | 104954830 B | 6/2018 |
| CN | 108173752 A | 6/2018 |
| CN | 108270611 A | 7/2018 |
| CN | 207906048 U | 9/2018 |
| CN | 108848538 A | 11/2018 |
| CN | 108881052 A | 11/2018 |
| CN | 208158613 U | 11/2018 |
| CN | 208188112 U | 12/2018 |
| CN | 208384449 U | 1/2019 |
| CN | 109474936 A | 3/2019 |
| CN | 10974936 B | 6/2019 |
| CN | 107155209 B | 6/2019 |
| CN | 110247667 A | 9/2019 |
| CN | 106879038 B | 12/2019 |
| CN | 209823788 U | 12/2019 |
| CN | 209823789 U | 12/2019 |
| EP | 2243324 B1 | 11/2012 |
| EP | 2925038 B1 | 10/2017 |
| EP | 3343863 A1 | 7/2018 |
| EP | 3451716 A3 | 4/2019 |
| EP | 3479526 A1 | 5/2019 |
| EP | 3499928 A1 | 6/2019 |
| MX | 2010008319 A | 9/2010 |
| MX | 2019005447 A | 7/2019 |
| WO | WO-2015114685 A1 | 8/2015 |
| WO | WO-2018183789 A1 | 10/2018 |
| WO | WO-2019055004 A1 | 3/2019 |
| WO | WO-2019070619 A1 | 4/2019 |
| WO | WO-2019231331 A1 | 12/2019 |

OTHER PUBLICATIONS

Cesana M., et al., "A Framework for Planning LoRaWAN Networks," Sep. 2018, 7 pages.

Chen M., et al., "Narrow Band Internet of Things," IEEE Journals & Magazine, Sep. 15, 2017, Retrieved from URL: https://ieeexplore.ieee.org/abstract/document/8038776, vol. 5, 31 pages.

Co-pending U.S. Appl. No. 17/316,515, inventors Konen; Ryan R. et al., filed May 10, 2021.

Co-pending U.S. Appl. No. 17/316,525, inventors Konen; Ryan R. et al., filed May 10, 2021.

Co-pending U.S. Appl. No. 17/316,631, inventors Konen; Ryan R. et al., filed May 10, 2021.

Ducrot N., et al., "LoRa Device Developer Guide," Orange Connected Objects & Partnerships, Apr. 2016, 42 pages.

Eriksson J., et al., "Investigating the Practical Performance of the LoRaWAN Technology," Linkoping University, Department of Computer Science Master thesis, 30 ECTS, Computer Technology, 2017, LIU-IDA/LITH-EX-A—17/054—SE, 61 pages.

"Indoor Tracking and Monitoring Solutions," Smart Factories, Warehouse, Software Associates IT Private Limited, 2018, 5 pages.

International Search Report and Written Opinion for International Application No. PCT/US2021/031609, dated Aug. 6, 2021, 8 pages.

LoRa Alliance, "LoRaWAN, What is it?, A Technical Overview of LoRa and LoRaWAN," Technical Marketing Workgroup 1.0, Nov. 2015, 20 pages.

Lysogor I., et al., "Study of Data Transfer in a Heterogeneous LoRa-Satellite Network for the Internet of Remote Things," MDPI Sensors, Aug. 1, 2019, vol. 19 (3384), 17 pages.

Non-Final Office Action for U.S. Appl. No. 17/012,450, mailed Dec. 8, 2020, 36 pages.

Office Action for U.S. Appl. No. 17/316,515, mailed Jul. 30, 2021, 40 pages.

Office Action for U.S. Appl. No. 17/316,525, mailed Jul. 20, 2021, 37 pages.

Office Action for U.S. Appl. No. 17/316,631, mailed Jul. 6, 2021, 10 pages.

Paasi J., "Towards a New Era in Manufacturing," Final Report of VTT's For Industry Spearhead Programme, VTT Technology 288, Jan. 27, 2017, 187 pages.

Park S., et al., "Forestry Monitoring System using LoRa and Drone," WIMS, Conference Paper, Jun. 25-27, 2018, 9 pages.

Pease S.G., et al., "Hybrid ToF and RSSI Real-Time Semantic Tracking with an Adaptive Industrial Internet of Things Architecture," ScienceDirect, Oct. 11, 2017, Retrieved from the URL: https://www.sciencedirect.com/science/article/pii/S1084804517303235, on Jul. 7, 2021, vol. 99, pp. 98-109.

Petajajarvi J., et al., "Performance of a Low-Power Wide-Area Network Based on LoRa Technology: Doppler Robustness, Scalability, and Coverage," International Journal of Distributed Sensor Networks, Feb. 18, 2017, vol. 13 (3), pp. 1-16.

Petajajarvi J., et al., "Performance of a Low-Power Wide-Area Network Based on LoRa Technology: Doppler Robustness, Scalability, and Coverage," International Journal of Distributed Sensor Networks, Mar. 17, 2017, 28 pages.

Piyare R., et al., "On-Demand LoRa: Asynchronous TDMA for Energy Efficient and Low Latency Communication in IoT," MDPI Sensors, Nov. 1, 2018, vol. 18 (3718), 22 pages.

Reynders B., et al., "Improving Reliability and Scalability of LoRaWANs Through Lightweight Scheduling," IEEE Internet of Things Journal, Mar. 18, 2018, Retrieved from URL: https://ieeexplore.ieee.org/document/8315103, pp. 1-12.

Sanchez-Iborra R., et al., "State of the Art in LP-WAN Solutions for Industrial IoT Services," MDPI Sensors, May 17, 2016, vol. 16 (708), 14 pages.

(56) References Cited

OTHER PUBLICATIONS

Shilpa B., et al., "Design and Implementation of Framework for Smart City Using Lora Technology," Sreyas International Journal of Scientists and Technocrats, Oct. 30, 2017, vol. 1 (11), pp. 36-43.
Sinha R.S., et al., "A Survey on LPWA Technology: LoRa and NB-IoT," The Korean Institute of Communications and Information Science, Science Direct, Mar. 21, 2017, pp. 14-21.
Sornin N., et al., "LoRaWAN 1.1 Specification," LoRa Alliance Technical Committee, V1.1, Oct. 11, 2017, 101 pages.
Sornin N., et al., "LoRaWAN Specification," LoRa Alliance, Incorporated, V1.0.2, Jul. 2016, 70 pages.
Supplementary European Search Report for EP 21 85 8747 dated Jan. 26, 2024 (6 pages).

* cited by examiner

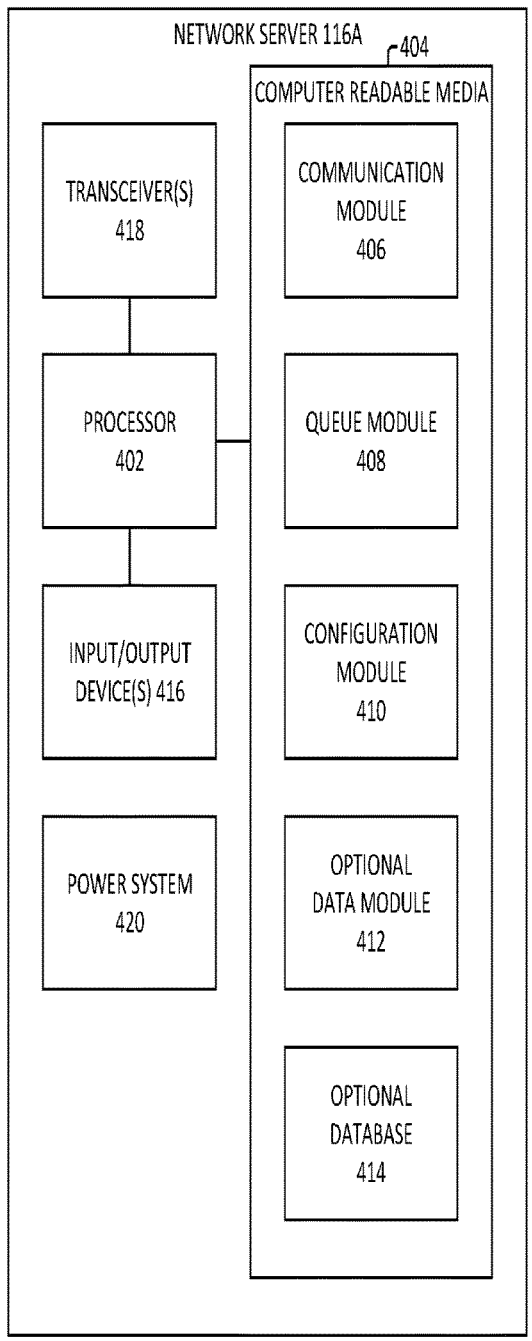
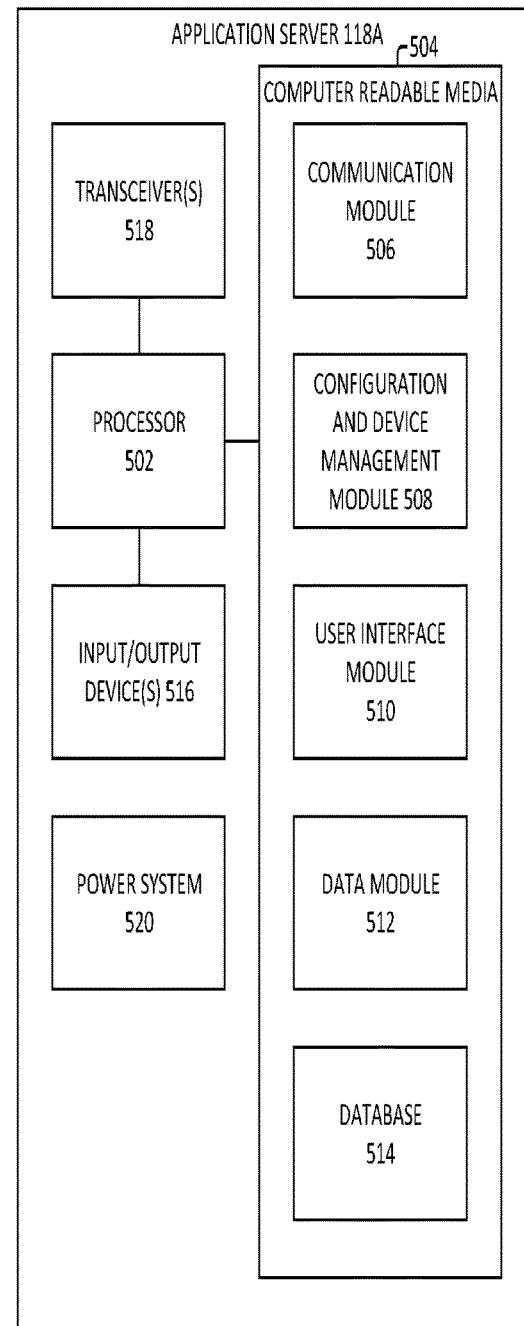
FIG. 4
FIG. 5

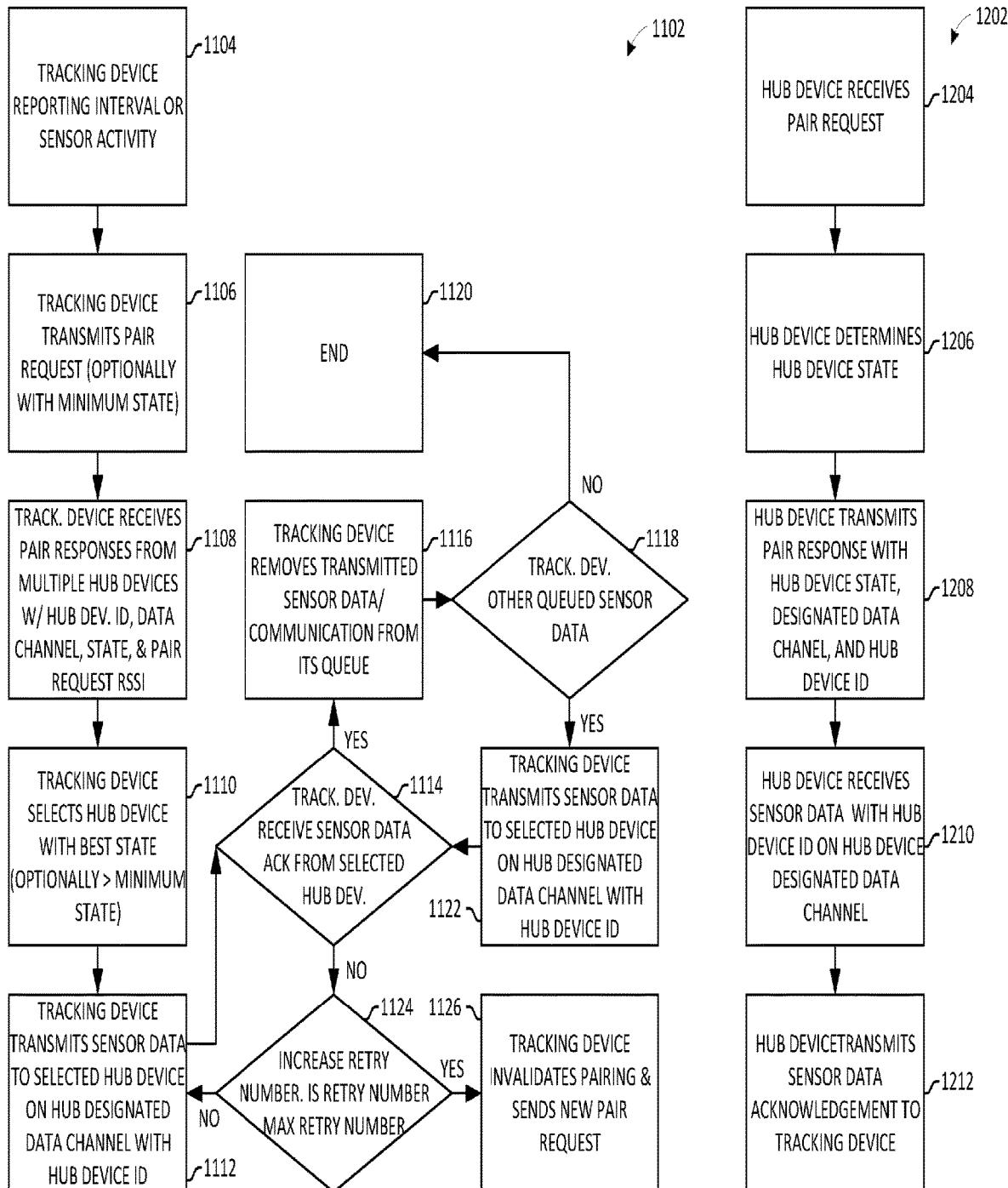

ASSET TRACKING SYSTEMS AND METHODS

CROSS-REFERENCE TO RELATED APPLICATIONS

This application is a continuation of and claims priority to U.S. patent application Ser. No. 18/090,007 filed on Dec. 28, 2022, and entitled "Asset Tracking Systems and Methods", which is a continuation of and claims priority to U.S. patent application Ser. No. 16/998,293 filed on Aug. 20, 2020, and entitled "Asset Tracking Systems and Methods". Each of these applications is incorporated by reference in its entirety herein.

BACKGROUND

Asset trackers are used to monitor equipment locations and equipment activity, such as on construction sites. That equipment includes ladders, hand-held devices, backhoes, and other equipment. Asset trackers may include an accelerometer to determine movement, a global positioning system (GPS) receiver to identify location, and a communication chip to transmit messages to a gateway. The gateways typically are fixed, and the tracker transmits its GPS location in communications to gateways.

The Long Range Wide Area Network (LoRaWAN) protocol is a Low Power, Wide Area (LPWA) networking protocol designed to wirelessly connect low power battery operating devices to the Internet in regional, national, or global networks and targets key Internet of Things (IoT) requirements, such as bi-directional communication, end-to-end security, mobility, and localization services. Some asset trackers use LoRaWAN technologies to transmit communications with activity data and location data to a gateway.

However, LoRaWAN networks are open to any LoRaWAN device sending any communication. Therefore, LoRaWAN devices broadcast their communications, and the communications will be received and processed by every LoRaWAN gateway in range of the transmitting device's communication, regardless of whether one particular gateway is an intended recipient or not an intended recipient of a particular communication, and each gateway then transmits the received communications to a network server. So, a gateway will receive all LoRaWAN communications from all LoRaWAN devices in its range and be expected to process all of those communications, even if the gateway only is intended to communicate with a single LoRaWAN transmitting device, and then transmit all of those communications to a network server, resulting in unneeded redundant processing. This results in a significant processing load on the gateways. It also results in a significant amount of network activity required by the gateway to transmit the unwanted communications to a network server, which increases transmission costs for activity for that gateway and the network server.

Moreover, there is a significant amount of data in communications from trackers to gateways, resulting in increased transmission time and bandwidth usage. For example, a communication from a tracker to a gateway could include Global Positioning System (GPS) coordinates in addition to sensor data, and the GPS coordinates increase bandwidth needs. Use of that large bandwidth increases network transmission costs due to the large transmissions.

SUMMARY

In one aspect, an asset tracking system comprises a plurality of hub devices and a tracking device connectable to an asset device. Each of the plurality of hub devices receive a pair request, determine a quality value representative of a quality of communication states with the tracking device and a network server, and transmit a pair response with the quality value. The quality value is based on a combination of states comprising a received signal strength indicator (RSSI) of the pair request, a power status of the hub device indicative of whether or not the hub device is connected to an external power source, a signal quality of a cellular signal at the hub device for communication with a network server, and a special offset value provided by the network server. The tracking device senses activity of the asset device, transmits the pair request, receives the pair responses with the quality values from the hub devices, selects one hub device of the plurality of hub devices with which to pair based on the quality value in the pair response from the one hub device, and transmits one or more communications with data indicative of the asset device activity to the one hub device.

In another aspect, an asset tracking system comprises a plurality of hub devices and a tracking device connectable to an asset device. Each of the plurality of hub devices receive a pair request, determine a quality value representative of a quality of a plurality of states of the hub device, and transmit a pair response with the quality value. The tracking device has at least one sensor to sense activity of the asset device. The tracking device transmits the pair request, receives the pair responses with the quality values from the hub devices, selects one hub device of the plurality of hub devices with which to pair based on the quality value in the pair response from the one hub device, and transmits one or more communications with sensor data of activity of the asset device to the one hub device.

BRIEF DESCRIPTION OF THE DRAWINGS

FIG. 4 is a block diagram of an exemplary embodiment of a network server.

FIG. 5 is a block diagram of an exemplary embodiment of an application server.

FIG. 11 is a flow diagram of an example embodiment of a sensor data queue of a pairing process of a tracking device.

FIG. 12 is a flow diagram of an example embodiment of a pairing process of a hub device.

DETAILED DESCRIPTION

The asset tracking systems and methods of the present disclosure solve problems associated with monitoring and tracking equipment and equipment activity used on construction sites and other locations. The asset tracking systems and methods reduce redundant communications processed by network devices and reduce network usage required to transmit communications by creating a custom communication network with a custom point-to-point tracking device-hub device-network server communication protocol in which a tracking device pairs with a hub device and communicates sensor data with only the one paired hub device instead of broadcasting sensor data communications to all hub devices, resulting in data optimization and transmission cost savings based on tracking device-hub device pairing. The tracking devices pair with a hub device that has a better hub device state, for example by using a pairing quality rating value of the hub device, which optimizes the tracking device to hub device communications. Communications from a tracking device to the hub device and from the hub device to the network server may be binary formatted communications, for example where the binary code is a zero or a one to indicate whether activity exists or does not exist for an asset device. This reduces transmission time and bandwidth required for communications from tracking devices to hub devices, resulting in additional cost savings. The custom communication network eliminates out-of-network devices from communicating with hub devices on the custom communication network, for example by using a special application identification (ID) and network device identifications (IDs) in communications between tracking devices and hub devices, thereby reducing overall bandwidth requirements and transmission costs for the custom communication network.

Figure 1:
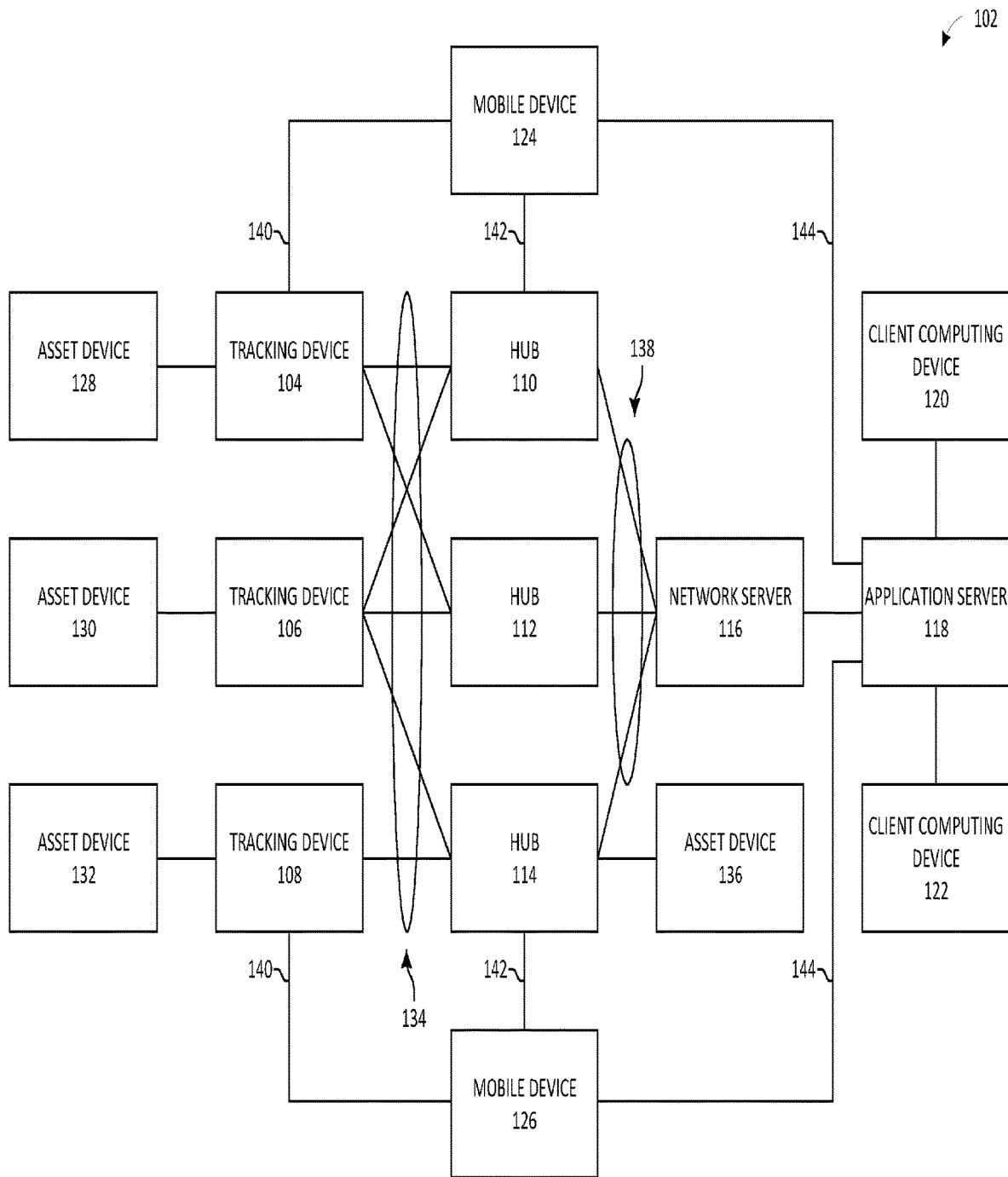
FIG. 1 is a block diagram of an exemplary embodiment of an asset tracking system.

FIG. 1 depicts an embodiment of an asset tracking system 102. The asset tracking system 102 includes one or more tracking devices 104-108, one or more hub devices 110-114, a network server 116, and the application server 118. The tracking system 102 optionally may include one or more client computing devices 120-122 and one or more mobile devices 124 and 126.

Tracking Devices

The tracking devices 104-108 are attached or connected to or otherwise associated with one or more asset devices 128-132. Examples of asset devices 128-132 include small tools (e.g. shovels, rakes, ladders, and hand tools), tool attachments, powered tools (e.g. pumps, generators, and powered hand tools), and machines.

The tracking devices 104-108 include one or more sensors to sense activity of an asset device 128-132 to which they are attached and store sensor data of that activity, including when the asset device is in motion or the asset device's orientation changes or optionally when the asset device is stationary. For example, a tracking device 104-108 may have an accelerometer to sense motion or movement of the asset device to which it is attached. In another example, a tracking device 104-108 has a temperature sensor to sense temperature of the asset device to which it is attached, such as from a motor of the asset device, which would indicate the asset device is operating. In another example, a tracking device 104-108 has an orientation sensor to sense changes in orientation of the asset device to which it is attached, which would indicate movement of the asset device. In another example, a tracking device 104-108 has a vibration sensor to sense vibration of the asset device to which it is attached, which would indicate movement of the asset device. The tracking devices 104-108 may include other sensors to sense one or more other characteristics of an asset device, such as activity by the asset device.

The tracking devices 104-108 take a sensor reading (sense data) of its sensor(s) (e.g. sensor(s) connected to an asset device to sense activity, such as movement or temperature, of the asset device) at one or more configurable sensor reading periods or intervals of time and optionally stores one or more sensor readings. For example, the tracking devices 104-108 may take a sensor reading constantly, every thirty seconds, every minute, every five minutes, every thirty minutes, when the tracking device is to report sensor readings to a hub device 110-114 for transmission to the network server 116, upon a sensor sensing activity, or another sensor reading period or interval of time between ten seconds and twenty four hours.

The tracking devices 104-108 transmit one or more communications to and receive one or more communications from one or more hub devices 110-114 via a first communication network 134, including at one or more configurable sensor data reporting periods or intervals of time. For example, a tracking device 104-108 may be configured to transmit the tracking device's sensor data in a communication (e.g. a sensor report) to a hub device 110-114 every minute, every eight minutes, every twenty minutes, every thirty minutes, every hour, every 12 hours, a multiple of an eight minute increment between eight minutes and 1440 minutes, a period between one minute and seven days, upon sensing activity of the asset device to which it is attached, upon waking from a sleep cycle, upon pairing with a hub device, or another configurable sensor data reporting period or interval of time.

In one example, a tracking device 104-108 is configured with a sensor data reporting interval of eight minutes or a multiple of an eight minute increment between eight minutes and 1440 minutes. In this example, the tracking device 110-114 reads its sensor every one minute increment and records (stores in its memory) the sensor activity for every one minute increment until it reaches eight minutes. The tracking device 104-108 then transmits its recorded sensor activity to a hub device 110-114.

Each tracking device 104-108 pairs to one hub device 110-114 so that a tracking device only transmits sensor data to and receives configuration data and/or other data from a single hub device while paired with that hub device. If a tracking device 104-108 loses the pairing with the hub device 110-114, the tracking device may re-pair with the same hub device 110-114 or pair with another hub device. This pairing is used instead of each tracking device 104-108 always broadcasting every communication for processing by all hub devices 110-114.

A tracking device 104-108 may pair with a particular hub device 110-114 based on one or more states of the hub device. For example, a tracking device 104-108 transmits a pair request to one or more hub devices 110-114. A pair request is a communication requesting a hub device to pair with a tracking device. Each hub device 110-114 transmits a pair response back to the tracking device. A pair response is a communication indicating a hub device is available to pair with a tracking device. Each pair request may include a device identification (ID) of the tracking device. The pair response may include a device identification (ID) of the responding hub device 110-114, a data channel over which the tracking device 104-108 is to transmit the sensor data to the hub device and the hub device is to receive the sensor data, information identifying one or more states of the hub device or the quality of one or more states of the hub device, such as a pairing quality rating value (PQRV) representing one or more states of the hub device or a composite value of multiple states of the hub device, such as based on one or more state pairing parameters of the hub device, and optionally the received signal strength indicator (RSSI) of the tracking device pair request. The tracking device 104-108 then selects and pairs with a hub device 110-114 that has the best state or best composite value of multiple states, for example with the best state quality value for the hub device, by selecting a hub device with the best state or state quality value, such as a pairing quality rating value (PQRV) representing one or more states of the hub device or a composite value of multiple states of the hub device, and transmitting its sensor data and optionally the hub device ID to the selected hub device over the data channel designated by the selected hub device, for example in one or more sensor reports or other communications. One example of the state quality value is a pairing quality rating value (PQRV), which is discussed below. Examples of values include positive and negative numbers, flags, and other designations or representations to identify a particular state of a device.

In one embodiment, the tracking devices 104-108 require a potential pairing hub device 110-114 to have a minimum pairing quality rating value (PQRV) in order to pair with the tracking device. The tracking devices 104-108 optionally may transmit the minimum pairing quality rating value (PQRV) in pair requests. If a pairing quality rating value (PQRV) of a particular hub device does not meet (is not equal to or greater than) the minimum pairing quality rating value (PQRV) required by a particular tracking device 104-108, the particular tracking device does not pair with the particular hub device in this embodiment. If the pairing quality rating value (PQRV) of all of the hub devices 110-114 do not meet (are not equal to or greater than) the minimum pairing quality rating value (PQRV) required by the particular tracking device 104-108, the particular tracking device does not pair with any of the hub devices in this embodiment. If a pairing quality rating value (PQRV) of one or more hub devices do meet (are equal to or greater than) the minimum pairing quality rating value (PQRV) required by a particular tracking device 104-108, the particular tracking device will select a hub device with the best pairing quality rating value (PQRV) for pairing.

In one embodiment, if two or more hub devices 110-114 have a same best state, quality of one or more states, composite state, composite quality of one or more states, or the pairing quality rating value (as the case may be) identified in the hub device's pair responses, the tracking device 104-108 selects the hub device having the highest measured RSSI of the pair request the tracking device transmitted for pairing, as measured at the selected hub device. If the two or more hub devices 110-114 also have the same RSSI of the pair request the tracking device 104-108 transmitted, the tracking device 104-108 selects the hub device for pairing that corresponds to the first received pair response.

The tracking devices 104-108 may transmit one or more communications to paired hub devices 110-114 that include sensor data and other data. The sensor data includes one or more sensor readings taken by one or more sensors of the tracking device 104-108, including over the configurable sensor data reporting period or interval of time. The tracking devices 104-108 also may include a battery level or power level of a battery or power device of the tracking device and/or the tracking device's device identification (ID) in communications transmitted to a paired hub device 104-108. The tracking devices 104-108 may transmit configuration requests and/or communication acknowledgements to a paired hub device 110-114, which optionally do not include sensor data.

The tracking devices 104-108 may receive one or more acknowledgement communications from a paired hub device 110-114, such as when a paired hub device receives sensor data (e.g. a sensor report) with the hub device ID over the data channel designated by the hub device in the pair response. The tracking device 104-108 also may receive one or more communications with one or more configurations or configuration changes (where configurations or configuration changes may be referred to simply as "configurations" hereafter or in the appended claims) from a paired hub device 110-114. The tracking device 104-108 will then install or otherwise implement the one or more configurations or configuration changes on the tracking device. For example, a communication from a paired hub device 110-114 may include a configuration identifying a new or change in the sensor data reporting interval for which sensor data should be transmitted to the hub device or a configuration with new firmware. The tracking device 104-108 optionally transmits an acknowledgement communication to the paired hub device 110-114 when the one or more configurations or configuration changes have been installed or optionally when the tracking device receives the one or more configurations or configuration changes.

The tracking devices 104-108 are hardware and contain one or more processors to process data and computer readable-executable instructions/software, memory to store data and computer readable-executable instructions/software, and one or more transceivers to transmit and receive communications. The processor(s) execute the computer readable-executable instructions/software, process communications, build communications, retrieve data from memory, and store data to memory. The processor(s) and the memory are hardware.

Hub Devices

Hub devices 110-114 are attached or connected to one or more stationary or mobile asset devices 136, such as vehicles, powered equipment (e.g. bull dozers, backhoes, and tractors), and tool containers, for example. The hub devices 110-114 optionally include one or more sensors to sense activity of the asset device to which it is attached or connected and stores sensor data of that activity, including when the asset device is in motion or the asset device's orientation changes or optionally when the asset device is stationary. For example, a hub device 110-114 may have an accelerometer to sense motion or movement of the asset device to which it is attached. In another example, a hub device 110-114 has a temperature sensor to sense temperature of the asset device to which it is attached, such as from a motor of the asset device, which would indicate the asset device is operating. In another example, a hub device 110-114 has an orientation sensor to sense changes in orientation of the asset device to which it is attached, which would indicate movement of the asset device. In another example, a hub device 110-114 has a vibration sensor to sense vibration of the asset device to which it is attached, which would indicate movement of the asset device. A hub device 110-114 may have other sensors to sense one or more other characteristics of an asset device, such as activity by the asset device.

The hub devices 110-114 take a sensor reading (sense data) of its sensor(s) (e.g. sensor(s) connected to an asset device to sense activity, such as movement or temperature, of the asset device) at one or more configurable sensor reading periods or intervals of time and optionally stores one or more sensor readings. For example, the hub devices 110-114 may take a sensor reading constantly, every thirty seconds, every minute, every five minutes, every thirty minutes, when the tracking device is to report sensor readings to the network server 116, upon a sensor sensing activity, or another sensor reading period or interval of time between ten seconds and twenty four hours.

The hub devices 110-114 transmit sensor data of the sensed activity to the network server 116 via a second communication network 138, including at one or more configurable sensor data reporting periods or intervals of time. For example, the hub devices 110-114 may be configured to transmit the hub device's sensor data in a communication (e.g. a sensor report) to the network server 116 every minute, every eight minutes, every twenty minutes, every thirty minutes, every hour, every 12 hours, a multiple of an eight minute increment between eight minutes and 1440 minutes, a period between two minutes to seven days, upon sensing activity of the asset device to which it is attached, upon waking from a sleep cycle, or another configurable sensor data reporting period or interval of time.

The hub devices 110-114 transmit one or more other communications to and receive one or more other communications from the network server 116 via the second communication network 138. For example, the hub devices 110-114 transmit to the network server 116 location data (e.g. GPS location data) for the location of the hub device, either with sensor data (e.g. sensor activity data) from one or more sensors on the hub device and/or sensor data (e.g. activity data) received from one or more tracking devices 104-108 or separately from sensor data (e.g. sensor activity data). In another example, the hub devices 110-114 receive one or more configurations or configuration changes from the network server 116 via the second communication network 138 to be installed or implemented on the hub devices and/or to be transmitted to one or more tracking devices 104-108 for installation or implementation.

The hub devices 110-114 determine their location, such as through satellite or terrestrial (ground based) GPS location data received by the hub devices from one or more GPS satellites or ground based GPS signal transmitters. The hub devices 110-114 may use alternate location determining methods, such as from receiving one or more communications from the Global Navigation Satellite System (GLONASS) or equivalent devices by one or more receivers of the hub device and/or by using one or more dead-reckoning determining devices and methods of the hub device. The hub devices 110-114 determine their coordinated universal time (UTC) time, such as from the GPS signals, GLONASS communications, and/or cellular network communications.

The hub devices 110-114 may include an internal power source (e.g. a battery) or connect to an external power source from an asset device, a solar powered device, a Long Range (LoRa) type transceiver, or some other external power source. For example, the hub devices 110-114 may connect to and receive power from a power system of a LoRa type transceiver or a power source of an asset device to preserve cellular connectivity.

The hub devices 110-114 receive one or more communications from and transmit one or more communications to one or more tracking devices 104-108, such as through the first communication network 134. For example, the hub devices 110-114 receive sensor data in one or more communications (e.g. sensor reports) transmitted by one or more tracking devices 104-108 and add date and time stamps to the sensor data (e.g. UTC time based time stamps). The data and time may be determined by the hub device from received GPS communications, GLONASS communications, and/or cellular network communications. The hub devices 110-114 optionally store the sensor data received from the one or more tracking devices 104-108. The hub devices 110-114 optionally transmit an acknowledgement to the one or more tracking devices 104-108 when a hub device receives a communication with sensor data from a tracking device. Because the hub devices 110-114 often are attached to mobile asset devices, they may move out of range of particular tracking devices 104-108 and, therefore, may not be able to receive communications from the out-of-range tracking devices.

The hub devices 110-114 pair with one or more tracking devices 104-108. The hub devices 110-114 then act on received sensor data from one or more communications transmitted from the paired tracking device 104-108, e.g. by processing that sensor data or other payload and/or transmitting that sensor data to the network server 116, but not act on received sensor data from unpaired tracking devices. The hub devices 110-114 also transmit configurations and configuration changes to paired tracking devices 104-108 but not to unpaired tracking devices in one embodiment.

A particular tracking device 104-108 may pair with a hub device 110-114 based on one or more states of the hub device. For example, a hub device 110-114 receives a pair request from one or more tracking devices 104-108. The hub device 110-114 determines information identifying one or more states of the hub device, such as a state quality value representing one or more states of the hub device or a composite value of multiple states of the hub device, such as based on one or more state pairing parameters of the hub device. The hub device 110-114 transmits a pair response back to the tracking device 104-108 with a device identification (ID) of the hub device, an identification of a data channel over which the tracking device is to transmit the sensor data to the hub device and the hub device is to receive the sensor data, optionally the RSSI of the corresponding tracking device pair request, and the information identifying the one or more states of the hub device, the quality of one or more states of the hub device, a composite value of multiple states of the hub device, or a composite value of the quality of one or more states of the hub device (e.g. PQRV). The tracking device 104-108 then pairs with a hub device 110-114 that has the best state or best composite value of multiple states, for example with the best state quality value for the hub device (e.g. PQRV), by transmitting its sensor data and the hub device ID to the paired hub device over the data channel designated by the hub device, for example in one or more sensor reports or other communications. The hub device 110-114 then transmits an acknowledgement to the tracking device indicating the hub device received the one or more sensor reports or other communications. One example of the state quality value is a pairing quality rating value (PQRV), which is discussed below. Examples of values include positive and negative numbers, flags, and other designations or representations to identify a particular state of a device.

In one example, each hub device 110-114 determines one or more states of the hub device and transmits one or more values or indicators of the one or more states of the hub device or a composite value of multiple hub states to one or more tracking devices 104-108 for evaluation of potential pairing between the hub device and those tracking devices. For example, a hub device 110-114 may determine a state quality value representative of a combination of or composite value of one or more states of the hub device, such as based on one or more state pairing parameters, and transmit that state quality value to the tracking devices 104-108. The tracking devices 104-108 then use that value to select a hub device 110-114 with which to pair. In one example, the state quality value is based on state pairing parameters for a received signal strength indicator (RSSI) of the pair request, a power status of the hub device indicative of whether or not the hub device is connected to an external power source, a signal quality of a cellular signal or other network signal or connection at/on the hub device 110-114 for communication/ communicating with the network server 116 (e.g. a received signal strength indicator (RSSI) of a cellular signal at/on the hub device (e.g. for communication/communicating with the network server using cellular signals such as a cellular connection), a signal strength of connectivity between the hub device and the network server, or a cellular signal strength of a cellular connection between the hub device and a network server), and a special offset value provided by the network server. The special offset value is optional in some embodiments. In another example, the state quality value can be based on one or more states or state pairing parameters of the hub device 110-114, such as a received signal strength indicator (RSSI) of one or more communications received by the hub device from the tracking device 104-108 (e.g. the RSSI of a pair request), a power status of the hub device (e.g. whether the hub device is connected to an external power source from an asset device, a solar powered device, a Long Range (LoRa) type transceiver, or some other external power source or an internal battery), how close the hub device is to a maximum value of a duty cycle for the hub device, whether or not the hub device has a cellular connection or other network connection to a network server 116, a signal quality of a cellular signal or other network signal or connection at/on the hub device for communication/communicating with the network server (e.g. a received signal strength indicator (RSSI) of a cellular signal at/on the hub device (e.g. for communication/communicating with the network server using cellular signals such as a cellular connection), a signal strength of connectivity between the hub device and the network server, or a cellular signal strength of a cellular connection between the hub device and a network server), a ground speed of the hub device optionally over a period of time (e.g. a value of zero or greater than zero as determined by the hub device from one or more GPS communications received by the hub device or one or more sensor readings of one or more hub device sensors), a determination by the hub device if there is activity (e.g. movement) of the hub device or an asset device to which the hub device is connected based on one or more sensor readings of one or more sensors of the hub device, and/or a special offset value provided by the network server. The hub device duty cycle is the fraction of a period of time a hub device is active (e.g. transmitting in the case of a transmitter). Both limited mobility of a hub device 110-114 and good cellular connectivity or other network connectivity between the hub device and the network server 116 result in a better state quality value for the hub device. The hub devices 110-114 measure the RSSI of the pair request and make one or more other measurements or sensor readings for the state pairing parameters or other states of the hub device by one or more sensors of the hub device.

In another example, a hub device 110-114 receives one or more pair requests from one or more tracking devices 104-108 and transmits a pair response to the one or more pair requests from the one or more tracking devices. The pair responses may include an identification of a data channel selected by the hub device 110-114 for receiving sensor data from a tracking device 104-108 and a device identification (ID) of the responding hub device. The pair responses also may include information identifying one or more states of the hub device 110-114, the quality of one or more states of the hub device, a composite value of multiple states of the hub device, a composite value of the quality of one or more states of the hub device, or a pairing quality rating value, as the case may be. The pair responses optionally may include an RSSI of the corresponding received pair request.

In one example, the hub device 110-114 only considers itself to be paired with the tracking device 104-108 if the hub device receives from the tracking device the sensor report or other communication with the hub device's ID over the data channel designated by the hub device to receive data from the tracking device. In that instance, the hub device 110-114 transmits to the tracking device 104-108 an acknowledgement that the hub device received the sensor report or other communication, and the tracking device receives the acknowledgement. In another example, the hub device 110-114 will not be paired with the tracking device 104-108 if the tracking device does not transmit the sensor report or other communication to the hub device with the hub device's ID over the data channel designated by the hub device to receive data from the tracking device. In another example, the tracking device 104-108 does not consider itself to be paired to the hub device 110-114 if the tracking device does not receive the acknowledgement that the hub device received the sensor report or other communication. In still another example, a hub device 110-114 will not process sensor data or other payload from any communication if the communication does not contain the hub device's device ID, and the hub device is not paired with the device transmitting such a communication. In still another example, a hub device 110-114 will not process sensor data or other payload from a communication if the communication is not received over a data channel designated by the hub device for receiving sensor reports and/or other data communications, and the hub device is not paired with the device transmitting such a communication.

The hub devices 110-114 may transmit one or more communications to a paired tracking device 104-108 that includes one or more configurations or configuration changes. For example, a hub device 110-114 may transmit a communication to a paired tracking device 104-108 with a firmware update or a configuration identifying a time frame (sensor data reporting interval) for which the paired tracking device should transmit sensor data to the hub device. The tracking devices 104-108 optionally transmit an acknowledgement communication to the hub device 110-114 when the one or more configurations or configuration changes have been installed or otherwise implemented or optionally after the one or more configurations or configuration changes have been received by the tracking devices, and the hub devices optionally receive the acknowledgements.

The tracking device-hub device pairing reduces redundant communications in the present asset tracking system 102 over prior systems because a tracking device 104-108 pairs with and transmits sensor data or other payload communications to a single hub device 110-114 (e.g. in one or more sensor reports) over a data channel designated by the hub and with the hub device ID, the hub device only processes sensor data or other payload of a paired tracking device, and that hub device transmits that sensor data or other payload to the network server 116. Cutting down on the redundant communications significantly lowers the number of communications with sensor data and other payload a hub device 110-114 must process and act on, significantly reducing use of precious processing resources of each hub device. Cutting down on the redundant communications also significantly lowers the total cost of data transfer because the total number of data bytes transmitted from the tracking devices 104-108 to the hub devices 110-114 and from the hub devices to the network server 116 are significantly reduced.

The hub devices 110-114 are hardware and contain one or more processors to process data and computer readable-executable instructions/software, memory to store data and computer readable-executable instructions/software, and one or more transceivers to transmit and receive communications. The processor(s) execute the computer readable-executable instructions/software, process communications, build communications, retrieve data from memory, and store data to memory. The processor(s) and the memory are hardware.

Network Server

The network server 116 receives one or more communications from one or more hub devices 110-114. The one or more communications may include sensor data and other data from the one or more hub devices 110-114 and/or sensor data and other data from one or more tracking devices 104-108. The network server 116 optionally stores that sensor data and other data in network server storage memory.

For example, the network server 116 optionally may store in network server storage one or more of sensor data (sensor reports) for each particular tracking device in the asset tracking system 102, the tracking device's device ID, an identification of the asset device to which the tracking device is attached, connected, or associated, the tracking device's location (e.g. latitude and longitude or GPS Coordinates), the tracking device's sensor data (sensor report) time stamp, the tracking device's battery voltage, that tracking device's activity logs, the tracking device's temperature, and the tracking device's configuration version. The network server 116 also optionally stores in network server storage one or more of sensor data for each particular hub device in the asset tracking system 102, the hub device's device ID, an identification of the asset device to which the hub device is attached, connected, or associated, the hub device's location (e.g. latitude and longitude or GPS Coordinates), the hub device's available configuration slots, the hub device's configuration version, the hub device's external power source if present, the hub device's power voltage, and the hub device's tracking device sensor reports. The network server 116 optionally may store in network server storage a list of hub devices 110-114 and tracking devices 104-108 with which the hub devices currently are paired and a list of hub devices and tracking devices with which the hub devices previously were paired.

The network server 116 transmits instructions and other communications to the hub devices. For example, the network server 116 transmits one or more configurations or configuration changes to one or more hub devices 110-114 for the hub device to install or otherwise implement on itself. The network server 116 may transmit a unique configuration or configuration change for a specific hub device 110-114 or a general configuration or configuration change for multiple hub devices. For example, the network server 116 may transmit a configuration or configuration change to a specific hub device 110-114 identified by a device ID of the hub device.

The network server 116 transmits one or more configurations and configuration changes to one or more hub devices 110-114 to be transmitted to and installed or otherwise implemented by one or more tracking devices 104-108. The network server 116 may transmit a unique configuration or configuration change for a specific tracking device 104-108 or a general configuration or configuration change for multiple tracking devices. For example, the network server 116 may transmit a configuration or configuration change to the hub device 110-114 with instructions to the hub device to transmit the configuration or configuration change to a specific tracking device 104-108 identified by a device ID of the tracking device.

The network server 116 may receive one or more communications from and/or transmit one or more communications to one or more application servers, such as application server 118. For example, the network server 116 may transmit sensor data from one or more of the tracking devices 104-108 and/or one or more hub devices 110-114 along with some or all of the data associated with those devices to the application server 118 with or without first receiving a request for the sensor data from the application server. That asset data, sensor data, and other data may include one or more of sensor data (e.g. from sensor reports) for each particular tracking device 104-108 in the asset tracking system 102, each tracking device's device ID, an identification of the asset device to which the tracking device is attached, connected, or associated, the tracking device's location (e.g. latitude and longitude or GPS Coordinates), the tracking device's sensor data (sensor report) time stamp, the tracking device's battery voltage, the tracking device's activity logs, the tracking device's temperature, the tracking device's activation or deactivation status, and the tracking device's configuration version, all of which optionally may be stored in network server storage. That asset data, sensor data, and other data also may include one or more of sensor data for each particular hub device in the asset tracking system 102, each hub device's device ID, an identification of the asset device to which the hub device is attached, connected, or associated, the hub device's location (e.g. latitude and longitude or GPS Coordinates), the hub device's available configuration slots, that hub device's configuration version, the hub device's external power source if present, the hub device's power voltage, the hub device's activation or deactivation status, and the hub device's tracking device sensor reports, all of which optionally may be stored in network server storage.

In one aspect, the network server 116 provides an endpoint for communication with the hub devices 110-114, queues incoming communications from hub devices, optionally converts communications received from hub devices from a binary encoded format to a text format, and stores data from the queued communications from the hub devices (after the optional conversion to the text format) in the application server 118 database. In this aspect, the network server 116 also receives configurations or configuration changes to be implemented for one or more tracking devices 104-108 and/or one or more hub devices 110-114 from the application server 118, optionally determines the correct one or more hub devices to transmit the configurations or configuration changes (e.g. for a particular tracking device paired with a particular hub device), and transmits communications to one or more hub devices with the configurations or configuration changes with an identification of the tracking device(s) and/or hub device(s) that the configurations or configuration changes are to be installed or implemented. In this aspect, the network server 116 operates as a message broker to order and queue the communications from the hub devices 110-114 and insert data from the ordered and queued communications into the database of the application server 118. In one example, the network server 116 includes an Amazon Web Services (AWS) IoT Core (HTTP/API Endpoint) to provide the endpoint functions and communicate with hub devices 104-108, an Amazon Web Services (AWS) Simple Queue Service (SQS) to provide the queueing functions, and an Amazon Web Services (AWS) Lambda service to convert communications or data from communications between the binary encoded format and the text format, store data to the application server 118 database, and communicate with the application server. Though, other types of servers may be used.

In another optional aspect, the network server 116 receives a list of activated and/or deactivated tracking devices 104-108 and/or hub devices 110-114 from another server (e.g. a third-party server) and transmits that list to the application server 118 or the application server's database for storage. In still another optional aspect, the network server 116 receives one or more firmware updates for one or more tracking devices 104-108 and/or one or more hub devices 110-114 from another server (e.g. a third-party server) and transmits the firmware updates to the one or more tracking devices and/or one or more hub devices for installation on the one or more tracking devices and/or one or more hub devices. The network server 116 may include the device ID of the tracking devices 104-108 and/or the hub devices 110-114 on which the firmware update is to be installed. In this example, the one or more tracking devices 104-108 and/or one or more hub devices 110-114 receive the firmware updates and install the firmware updates on their devices.

The network server 116 is hardware. The network server 116 includes one or more processors to process data and memory to store data. The processor processes computer-readable executable instructions, communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions, including for displaying data. In addition, the network server 116 further includes one or more transceivers or other communication interfaces to transmit communications to and receive communications from the application server 118, the hub devices 110-114, and the optional third-party server over one or more communication networks.

Although the network server 116 is shown as a single device, it may include multiple servers, for example, in a cloud computing configuration. Moreover, the network server 116 and the application server 118 may be combined.

Application Server

The application server 118 manages the tracking devices 104-108 and the hub devices 110-114 in the tracking system 102. The application server 118 maintains a list of hub devices 110-114 and tracking devices 104-108 in the asset tracking system 102. The application server 118 also maintains a location (e.g. latitude and longitude or GPS Coordinates) for each tracking device 104-108 and hub device 110-114 in the asset tracking system 102, such as from the location data transferred by one of the hub devices with sensor data received from one or more tracking devices and/or sensor data for the hub device itself.

The application server 118 contains a database that receives data from the network server 116 in one or more communications, including asset data, sensor data, and other data, and stores that asset data, sensor data, and other data in a network server database for evaluation, manipulation, and management by one or more users of the client computing devices 120-122. That asset data, sensor data, and other data may include one or more of sensor data (e.g. from sensor reports) for each particular tracking device 104-108 in the asset tracking system 102, each tracking device's device ID, an identification of the asset device to which the tracking device is attached, connected, or associated, the tracking device's location (e.g. latitude and longitude or GPS Coordinates), the tracking device's sensor data (sensor report) time stamp, the tracking device's battery voltage, the tracking device's activity logs, the tracking device's temperature, the tracking device's activation or deactivation status, and the tracking device's configuration version. That asset data, sensor data, and other data also may include one or more of sensor data for each particular hub device in the asset tracking system 102, each hub device's device ID, an identification of the asset device to which the hub device is attached, connected, or associated, the hub device's location (e.g. latitude and longitude or GPS Coordinates), the hub device's available configuration slots, that hub device's configuration version, the hub device's external power source if present, the hub device's power voltage, the hub device's activation or deactivation status, and the hub device's tracking device sensor reports.

The application server 118 generates user interfaces that enable one or more client computing devices 120-122 and optionally one or more mobile devices 125-126 to view, manipulate, and/or manage the asset data, sensor data, and other data, including the data discussed above. For example, the application server 118 optionally hosts a website user interface to connect with one or more client computing devices 120-122 and optionally one or more mobile devices 125-126, and that website user interface enables the client computing devices 120-122 and optionally one or more mobile devices 125-126 to view, manipulate, and/or manage the asset data, sensor data, and other data, including the data discussed above.

The application server 118 also enables users of the client computing devices 120-122 to manage configurations of the tracking device(s) 104-108 and/or hub device(s) 110-114 and to input and/or transmit one or more configurations and/or configuration changes, an identification of the tracking device(s) and/or hub device(s) that are to receive the configurations and/or configuration changes, and/or the identification of the tracking device(s) and/or hub device(s) to install or implement the configurations and/or configuration changes. The application server 118 then transmits the configurations and/or configuration changes along with the device identifications to the network server 116 with instructions to transmit the configurations and/or configuration changes to the tracking device(s) and/or hub device(s) identified for transmission and to install or implement the configurations and/or configuration changes to the tracking device(s) and/or hub device(s) identified for installation or implementation.

For example, the application server 118 may receive from a client computing device 120-122 a configuration change to change the sensor reading interval and/or the sensor data reporting interval for one or more tracking devices 104-108 and/or one or more hub devices 110-114. In this example, the application server 118 transmits a communication to the network server 116 with the configuration change for one or more tracking devices 104-108 along with the device identification of the one or more tracking devices to implement the configuration change. The network server 116 stores the communication in its queue until a hub device 110-114 reports sensor data with a device identification of the affected tracking devices 104-108. The network server 116 transmits the configuration change and the device identification of the affected tracking devices 104-108 to the hub device 110-114, such as in an acknowledgement message of the received communication from the hub device. The hub device 110-114 then will transmit the configuration change to the affected tracking devices 104-108 identified by the device identification from the network server 116, such as in or with acknowledgement messages of the received communications from the tracking devices. The affected tracking devices 104-108 receive and implement the configuration change by updating their sensor reading interval and/or sensor data reporting interval.

The application server 118 also communicates with one or more mobile devices 124-126, for example to receive data read from one or more tracking devices 104-108 and/or one or more hub devices 110-114 by the one or more mobile devices, receive the activation or deactivation status of one or more tracking devices and/or one or more hub devices from the one or more mobile devices, or transmit instructions for the activation or deactivation of one or more tracking devices and/or one or more hub devices to the one or more mobile devices.

In one aspect, the application server 118 operates as an application programming interface (API) controller between the network server 116, the application server's database, the client computing devices 120-122 (e.g. a website interface application on the client computing devices), and the mobile devices 124-126 (e.g. an application on the mobile devices) and directs requests and responses between the network server, the application server's database, the client computing devices (e.g. a website interface application on the client computing devices), and the mobile devices (e.g. an application on the mobile devices).

In one example, the application server 118 includes an Amazon Web Services (AWS) EC2 server, and the application server database includes a PostgreSQL database, another structured query language (SQL) database, a relational database management system (RDBMS) database, or another type of database system that stores and communicates data from at least one database. Though, other servers and databases may be used.

The application server 118 is hardware. The application server 118 includes one or more processors to process data and memory to store data. The processor processes computer-readable executable instructions, communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions, including for displaying data to a browser. In addition, the application server 118 further includes one or more transceivers or other communication interfaces to transmit communications to and receive communications from the network server 116 and the client computing devices 120-122 over a communication network, such as the Internet, an intranet, a cellular network, a wired or wireless broadband network, or another packet network.

The application server 118 may include a display, such as a computer monitor or touchscreen, for displaying data and/or graphical user interfaces. The application server 118 may also include an input device, such as a camera, a universal serial bus (USB) device, a serial or parallel bus, a wired or wireless transceiver, a keyboard, or a pointing device (e.g., a mouse, trackball, pen, or touch screen), to enter data into or interact with graphical and/or other types of user interfaces. In an exemplary embodiment, the display and the input device may be incorporated together as a touch screen of the smartphone, tablet computer, or personal computer.

Although the application server 118 is shown as a single device, it may include multiple servers, for example, in a cloud computing configuration. Moreover, the network server 116 and the application server 118 may be combined.

Client Computing Devices

The client computing devices 120-122 communicate with the application server 118 to view, manipulate, and/or manage the asset data, sensor data, and other data. For example, the client computing devices 120-122 connect to the application server 118, such as over a network, and receive the user interfaces from the application server that enable the client computing devices to view, manipulate, and manage asset data, sensor data, and other data. The client computing devices 120-122 also may enter and transmit one or more configurations and/or configuration changes along with the identification of the device(s) to receive the configurations and/or configuration changes and/or the identification of the device(s) to install or implement the configurations and/or configuration changes, such as for one or more tracking devices 104-108 and/or one or more hub devices 110-114.

The client computing devices 120-122 may display a graphical user interface (GUI) application to generate a graphical user interface on a display of the client computing device. The graphical user interface may be displayed by a browser of the client computing device. The graphical user interface enables a user of the one or more client computing devices 120-122 to interact with the application server 118.

The client computing devices 120-122 are hardware and include one or more processors to process data and memory to store data and computer instructions/software. The processor executes the computer instructions/software, processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing devices 120-122 further include one or more transceivers or other communication interfaces to transmit communications to and receive communications from the application server 118 via a communication network, such as the Internet, an intranet, a cellular network, a wired or wireless broadband network, or another packet network.

The client computing devices 120-122 can be a laptop computer, a smartphone, a personal digital assistant, a tablet computer, a standard personal computer, or another processing device. The client computing devices 120-122 may include a display, such as a computer monitor or touchscreen, for displaying data and/or graphical user interfaces. The client computing devices 120-122 may also include an input device, such as a camera, a universal serial bus (USB) device, a serial or parallel bus, a wired or wireless transceiver, a keyboard, or a pointing device (e.g., a mouse, trackball, pen, or touch screen), to enter data into or interact with graphical and/or other types of user interfaces. In an exemplary embodiment, the display and the input device may be incorporated together as a touch screen of a smartphone, a tablet computer, or a personal computer.

Networks

The communication network 134 is a wireless communication network. In an example, the communication network 134 may include a low-power wide-area network (LPWAN) such as a Long Range (LoRa)-based network, an IoT network, a cellular network, a wireless broadband network, an Internet Protocol (IP) network, another wireless packet network, a wireless application protocol (WAP) network, a WiFi network, or an IEEE 802.11 standards network, as well as various combinations thereof. Other wireless networks may also be used.

The communication network 138 can be a cellular network, a narrowband Internet of Things (NB-IoT) network, a Bluetooth connection network, a Bluetooth Low Energy (BLE) connection network, a WiFi network, a LoRa Alliance network, a wireless or wired broadband network, a wireless or wired narrowband network, the Internet, an intranet, another wired or wireless packet network, or another wired or wireless communication network, as well as various combinations thereof. In one example, the communication network 138 is a Long Term Evolution (4G) Cat-M1 (LTE-M) network. In another example, the communication network 138 may include a Mobile Communications (GSM) network, a code division multiple access (CDMA) network, or 3rd Generation Partnership Project (GPP) network. Other wired and wireless networks may also be used.

Mobile Devices

The mobile devices 124-126 activate and deactivate tracking devices 104-108 and hub devices 110-114 in the tracking system 102. In one aspect, the mobile devices communicate with the tracking devices 104-108 and hub devices 110-114 using a communication protocol 140 and 142, such as near field communications (NFC) or Bluetooth, to read one or more records or data items on the tracking devices and hub devices and/or transmit one or more communications to the tracking devices and hub devices to either activate the tracking devices and hub devices so that they are able to communicate with hub devices and tracking devices (and the network server 116), respectively, on the tracking system 102 or deactivate the tracking devices and hub devices so that they are not able to communicate with hub devices and tracking devices (and the network server), respectively, on the tracking system. In one aspect, an application on the mobile devices 124-126 provides a user interface that enables users to view the one or more records or data items on the tracking devices 104-108 and hub devices 110-114 and control either activating or deactivating the tracking devices and hub devices. In one example of this aspect, the application on a mobile device 124-126 writes a first value (e.g. a one (1) (or another integer other than zero)) to the application ID of the tracking device or hub device to activate the tracking device or hub device and writes a second value (e.g. a zero (0)) to the application ID of a tracking device or hub device to deactivate the tracking device or hub device. The first value and the second value may be an integer, a flag value (e.g. on/off, 0/1, or true/false), an indicator, or another value for the application ID. A deactivated tracking device or hub device turns off its transceivers and hibernates until reactivated. An activated tracking device or hub device turns on its transceivers and activates its other functions as specified herein.

The mobile devices 124-126 may transmit data from the tracking devices 104-108 and the hub devices 110-114 to the application server 118, such as over a cellular connection 144 or another wireless or wired connection. That data may include, for example, any data the mobile device reads from the tracking devices 104-108 and the hub devices 110-114 and the activation/deactivation status of the tracking devices and/or hub devices (whether a particular tracking device and/or a particular hub device is/are either activated or deactivated for operation in the tracking system 102). The mobile devices 124-126 also may receive data, instructions, and/or other communications from the application server 118 over the connection 144, such as for viewing data and/or instructions and acting upon the data and/or instructions on the mobile device application, for example to activate or deactivate one or more tracking devices 104-108 and/or the hub devices 110-114.

The mobile devices 124-126 may be, for example, a phone, a tablet, a laptop computer, or another mobile device. The mobile devices 124-126 are hardware and contain one or more processors to process data, memory to store data and computer instructions/software, and one or more transceivers to transmit and receive communications. The processor executes the computer instructions/software, processes communications, builds communications, retrieves data from memory, and stores data to memory. The processor and the memory are hardware.

Network Server Configurations and Configuration Changes Examples

Referring again to FIG. 1, in one embodiment, the network server 116 transmits configurations and configuration changes to one or more tracking devices 104-108 through one or more hub devices 110-114. For example, the network server transmits a configuration or configuration change to one of the hub devices 110-114, and that hub device transmits the configuration or configuration change to one of the tracking devices 104-108. Alternately, the network server 116 transmits a configuration or configuration change to multiple or all of the hub devices 110-114, and the hub devices transmit the configuration or configuration change to one or more tracking devices 104-108, for example the tracking device with which they currently are paired or have previously paired. The network server 116 may transmit a unique configuration or configuration change to one or more hub devices 110-114 for a specific tracking device 104-108 or may transmit a general configuration or configuration change to one or more hub devices for multiple tracking devices.

In one example, the network server 116 transmits a configuration or configuration change to the last hub device 110-114 with which a tracking device 104-108 is paired. The hub device 110-114 then transmits the configuration or configuration upgrade to the currently paired tracking device 104-108. This approach has a high probability of successfully transferring the configuration or configuration change to the tracking device 104-108 due to the already paired relationship between the hub device 110-114 and the tracking device.

In another example, the network server 116 will guide a particular tracking device 104 to pair with the best hub device 110, and then the particular tracking device will receive the configuration or configuration change from the best hub device. This approach also has a high probability of successfully transferring the configuration or configuration change to the particular tracking device 104 due to the strong communication signaling relationship between the hub device 110 and the tracking device.

The pairing quality rating value (PQRV) forces a tracking device 104-108 to pair with a hub device 110-114 that is in a stable location and has a strong transceiver frequency (RF) signal level for cellular communications and local network 134 (e.g. LoRa) communications. In one example, the pairing quality rating value (PQRV) is based on values for state pairing parameters for a received signal strength indicator (RSSI) of the pair request, a power status of the hub device indicative of whether or not the hub device is connected to an external power source, a signal quality of a cellular signal or other network signal or connection at/on the hub device 110-114 for communication/communicating with the network server 116 (e.g. a received signal strength indicator (RSSI) of a cellular signal at/on the hub device (e.g. for communication/communicating with the network server using cellular signals such as a cellular connection), a signal strength of connectivity between the hub device and the network server, or a cellular signal strength of a cellular connection between the hub device and a network server), and a special offset value provided by the network server. The special offset value is optional in some embodiments. In another example, the pairing quality rating value (PQRV) is based on values of state pairing parameters for one or more of a received signal strength indicator (RSSI) of a pair request received by a hub device, whether or not the hub device has an external power source (or just an internal battery), transmit duty cycle of the hub device, cellular signal strength (or other communication network signal strength) of the communication network used by the hub device to transmit communications to and receive communications from the network server (e.g. a received signal strength indicator (RSSI) of a cellular signal at/on the hub device or a cellular signal strength of connectivity between the hub device and the network server), hub device ground speed or activity, and a network server offset value for the particular hub device. In one aspect, each state pairing parameter has a state or value and a corresponding de-rating (e.g. subtraction or offset) value to be subtracted from a starting PQRV value based on the state pairing parameter value to result in the final PQRV. Therefore, the states or values of the different state pairing parameters are combined to determine the final PQRV.

In one embodiment, when a configuration or configuration change for one or more tracking devices 104-108 is transmitted from the network server 116 to a hub device 110-114, the hub device will hold or store the configuration or configuration change for a selected period of time or until the network server transmits a control communication to the hub device instructing the hub device to delete the configuration or configuration change.

In another embodiment, when a hub device 110-114 receives a pair request from a tracking device 104-108, the hub device determines if the hub device has or is storing a configuration or configuration change for that tracking device. If the hub device 110-114 has or is storing a configuration or configuration change for the tracking device 104-108, the hub device increases its pairing quality rating value (PQRV) to a maximum value so that the hub device becomes the best choice for pairing with the tracking device 104-108. The hub device 110-114 transmits the pairing quality rating value (PQRV) with the maximum value to the tracking device 104-108, and the tracking device pairs with the hub device. Once paired, the tracking device 104-108 and the hub device 110-114 will proceed with their data communication exchange, followed by the hub device transmitting the configuration or configuration change to the tracking device. The hub device 110-114 optionally transmits an acknowledgement to the network server 116 to indicate that the configuration or configuration change for this particular tracking device 104-108 has been transmitted to the tracking device and the configuration or configuration change exchange with the tracking device is completed.

In one example, the network server 116 may designate a particular tracking device 104-108 to which the hub device 110-114 is to transmit the configuration or configuration change (e.g. by transmitting a tracking device identification (ID) to the hub device in the same communication or in a separate communication as the configuration or configuration change), and the hub device transmits the configuration or configuration change to the tracking device with that tracking device ID. In this example, the tracking device 110-114 includes its tracking device ID in one or more communications it transmits to the hub device 110-114, such as in the pair request or other control communication or in one or more data communications. The hub device 110-114 then transmits the configuration or configuration change to the tracking device 104-108 with that tracking device ID, such as over the data channel with which the hub device is communicating with the tracking device.

Alternately, the network server 116 may designate multiple particular tracking devices 104-108 to which the configuration or configuration change is to be transmitted. In this example, the network device 116 may designate multiple tracking device IDs in a communication to a hub device 110-114, either in the same communication or in a different communication as the configuration or configuration change. The hub device 110-114 then will transmit the configuration or configuration change to the designated tracking devices 104-108 in a single broadcast communication to all designated tracking devices or in separate communications to each designated tracking device. The hub device 110-114 optionally may include the tracking device IDs for which the configuration or configuration change is intended in the same communication or in a different communication with the configuration or configuration change.

Hub Device Power Operating Modes

The hub devices 110-114 optionally may have any one or more or all of three power modes of operation, which, for example, may be based on the presence of an internal power source or a connection to an external power source. Those power modes include normal power operating mode, reduced power operating mode, and low power operating mode.

Normal power operating mode is used for a hub device 110-114, for example, when the hub device is connected to an external power source or the battery voltage of an internal battery of the hub device is greater than a first battery voltage threshold. Reduced power operating mode is used for a hub device 110-114, for example, when the hub device is not connected to an external power source and the battery voltage of an internal battery of the hub device is less than or equal to the first battery voltage threshold but greater than a second battery voltage threshold. Low power operating mode is used for a hub device 110-114, for example, when the hub device is not connected to an external power source and the battery voltage of an internal battery of the hub device is less than or equal to the second battery voltage threshold.

The first battery voltage threshold and the second battery voltage threshold are stored in memory of the hub devices 110-114. The state of whether or not the hub device 110-114 is connected to an external battery source also is stored in memory of the hub devices and/or the hub devices monitor one or more power source connections and/or inputs to determine if the hub device is connected to an external power source. The hub device 110-114 monitors the battery voltage of the internal battery and automatically switches between the normal power operating mode, reduced power operating mode, and low power operating mode based on the state of whether or not the hub device is connected to an external battery source, the battery voltage of the internal battery, the first battery voltage threshold, and the second battery voltage threshold.

In one example, an internal battery of a hub device 110-114 has a maximum voltage of 8.2 volts and a minimum voltage of 5.8 volts. In this example, the first battery voltage threshold is 6.5 volts direct current (VDC), the second battery voltage threshold is 6.2 VDC, and the first battery voltage threshold and the second battery voltage threshold are stored in memory of the hub device 110-114. In this example, the hub device 110-114 monitors a power source connection or input to determine if the hub device is connected to an external power source (e.g. by determining a voltage is present and/or determining a voltage level on that power source connection or input using a voltage detector of the hub device). The hub device 110-114 also monitors the battery voltage of the internal battery (if it exists, e.g. using a voltage detector of the hub device) and automatically switches between the normal power operating mode, reduced power operating mode, and low power operating mode based on the state of whether or not the hub device is connected to an external power source, the battery voltage of the internal battery (if any), the first battery voltage threshold, and the second battery voltage threshold.

In this example, the hub device 110-114 operates in normal power operating mode when the hub device is connected to an external power source or the hub device has an internal battery and the voltage of the hub device's internal battery is greater than 6.5 VDC. The hub device 110-114 operates in reduced power operating mode when the hub device is not connected to an external power source, the hub device has an internal battery, and the voltage of the hub device's internal battery is less than or equal to 6.5 VDC and greater than 6.2 VDC. The hub device 110-114 operates in low power operating mode when the hub device is not connected to an external power source, the hub device has an internal battery, and the voltage of the hub device's internal battery is less than or equal to 6.2 VDC.

In the normal power operating mode, the hub device 110-114 processor operations (including monitoring sensors, writing log files, and initiating and receiving communications) are normal. The LoRa transceivers operate as normal. In this example, the hub devices 110-114 have two LoRa transceivers, and both are set to on. The LoRa power amplifier (PA) is enabled on, the LoRa common collector supply voltage (VCC) low noise amplifier (LNA) is enabled off, and the LoRa common collector supply voltage (VCC) power amplifier (PA) is enabled off. The cellular communications and GPS operate as normal. The hub device 110-114 is connected to the network server 116 and pings the network server every ten (10) minutes. GPS communications are continuously received by the hub device 110-114, and GPS information on the hub device is continuously updated.

In the reduced power operating mode, the hub device 110-114 processor operations for monitoring sensors and writing log files are normal. However, updates to the firmware of the hub device 110-114 are disabled, and the hub device only communicates via cellular communications, e.g. with the network server 116. In this example, the hub devices 110-114 have two LoRa transceivers, and both are placed in sleep mode. The LoRa PA is enabled off, the LoRa VCC LNA is enabled off, and the LoRa VCC PA is enabled off. The hub device 110-114 is connected to the network server 116 and pings the network server every ten (10) minutes. GPS communications are continuously received by the hub device 110-114, and GPS information on the hub device is continuously updated.

In the low power operating mode, the hub device 110-114 processor operations for monitoring its own on-board sensors and writing log files are normal. The hub device 110-114 stores any data from any tracking devices 104-108 and data from its own sensors to memory to protect data from being lost due to a full power loss. Updates to the firmware of the hub device 110-114 are disabled, and the hub device only communicates via cellular communications, e.g. with the network server 116. In this example, the hub devices 110-114 have two LoRa transceivers, and both are placed in sleep mode. The LoRa PA is enabled off, the LoRa VCC LNA is enabled off, and the LoRa VCC PA is enabled off. The hub device 110-114 is connected to the network server 116 and pings the network server every ten (10) minutes. GPS communications are continuously received by the hub device 110-114, and GPS information on the hub device is continuously updated.

Custom Binary Encoding

Custom binary encoding is used for efficient transfer of data between the tracking devices 104-108 and the hub devices 110-110 and between the hub devices and the network server 116. The tracking devices 104-108 transmit binary encoded data communications to the hub devices 110-114 using the custom binary encoding over the first communication network 134. The hub devices 110-114 then transmit the data from those communications in other binary encoded communications over the second communication network 138 (e.g. LTE) to the network server 116.

The network server 116 receives the communications from the hub devices 110-114 and stores the data from those communications in the application server database. The network server 116 optionally converts the data received from hub devices 110-114 from a binary format to a text format if needed prior to storage. For example, the network server 116 may convert the data in the communications from a binary encoded format to a text based format, such as JavaScript Object Notation (JSON).

In one embodiment, the binary code represents a sensing state for a tracking device 104-108 or a hub device 110-114 based on a sensor sensing or not sensing activity. For example, the binary code=0 means the sensor of the tracking device 104-108 or the hub device 110-114 does not sense activity or the asset device is not active and the binary code=1 means the sensor of the tracking device or the hub device does sense activity or the asset device is active. The actual sensor could be an accelerometer to sense movement, a temperature sensor to sense heat (e.g. engine heat), or another sensor. Using the binary encoded communications reduces overhead costs for communications from the tracking devices 104-108 to the hub devices 110-114 and for communications from the hub devices to the network server 116.

Custom Network Reduces Interference and Outside Communications.

The tracking system 102 is a custom network that reduces interference from outside systems that would use precious processing resources, could cause communications of the tracking system to not be processed, and would cause increased costs due to larger cellular or other network usage. The tracking system 102 uses several techniques to reduce communication losses due to interference caused by overlap between hub devices 110-114 and the network server 116 or overlap with other privately or publicly deployed devices or networks (e.g. LoRa devices or LoRaWAN systems).

In one embodiment, each tracking device 104-108 and hub device 110-114 in the tracking system 102 is configured with a unique application ID and includes the unique application identification (ID) in each communication it transmits. The application ID may be a first value (e.g. a one or another integer greater than zero) to indicate the tracking device 104-108 and/or hub device 110-114 is available for operation in the asset tracking system 102 or a second value (e.g. a zero) to indicate the tracking device and/or hub device is not available for operation in the asset tracking system. The first value and the second value may be an integer, a flag value (e.g. on/off, 0/1, or true/false), an indicator, or another value for the application ID. The application ID is used to identify the tracking system 102. In this embodiment, the tracking devices 104-108 and the hub devices 110-114 analyze each communication from a hub device or a tracking device, respectively, that it receives to determine if the communication contains a correct application ID for the asset tracking system 102. If the communication does contain a correct application ID for the asset tracking system 102 (e.g. in which an application ID from a hub device matches an application ID of the tracking device or an application ID from a tracking device matches an application ID of the hub device), the tracking device 104-108 or hub device 110-114 will respond to the communication or take such other actions on the data or other payload of the communication as are needed. If the communication does not contain a correct application ID for the asset tracking system 102 (e.g. in which an application ID from a hub device does not match an application ID of the tracking device or an application ID from a tracking device does not match an application ID of the hub device), the tracking device 104-108 or hub device 110-114 will not respond to the communication, will discard the communication, and will not forward any data or other payload from the communication or take any other actions on the data or the payload. In one example, the tracking devices 104-108 and hub devices 110-114 only pair with other hub devices and tracking devices, respectively, that have a matching application ID.

In another embodiment, only the tracking devices 104-108 include the application ID in pair requests. In this embodiment, each hub device 110-114 analyses each communication it receives from a tracking device 104-108 to determine if the communication contains a correct application ID for the asset tracking system 102. If the communication does contain a correct application ID for the asset tracking system 102, the hub device 110-114 will respond to the communication or take such other actions on the data or other payload as are needed. For example, if a hub device 110-114 receives a pair request from a tracking device 104-108, and the pair request contains a correct application ID for the asset tracking system 102, the hub device will respond to the pair request with a pair response to the tracking device. If the communication does not contain a correct application ID, the hub device 110-114 will not respond to the communication, will discard the communication, and will not forward any data or other payload from the communication to the network server 116 or take any other action on the data or the payload. For example, if a hub device 110-114 receives a pair request from a tracking device 104-108 or other device communication, and the pair request or other device communication does not contain a correct application ID for the asset tracking system 102, the hub device will not respond to the pair request or other device communication. Therefore, use of the application ID helps the hub devices 110-114 filter out and discard communications from third party unrelated devices, resulting in savings in bandwidth and cellular (or other network) costs by not processing the payload/data in those communications and not transmitting payload/data from those communications to the network server 116.

In another embodiment, the tracking devices 104-108 and the hub devices 110-114 optionally include a sync word in their communications. The sync word is a single byte value used by the tracking devices 104-108 and the hub devices 110-114 to partially isolate and hardware reject a majority of communications that are not designated for the particular tracking devices or hub devices of the tracking system 102. This sync word will reduce the likelihood that a tracking device 104-108 or a hub device 110-114 would process a different system's communication. Each tracking device 104-108 and hub device 110-114 of the tracking system 102 is configured with the sync word during the provisioning process and includes the sync word in communications they transmit, including over the control channels.

In this embodiment, the tracking devices 104-108 and hub devices 110-114 analyze each communication it receives from a hub device or tracking device, respectively, to determine if the communication contains the sync word. If the communication does contain the sync word, the tracking device 104-108 or hub device 110-114 will respond to the communication or take such other actions on the data or other payload of the communication as are needed. If the communication does not contain the sync word, the tracking device 104-108 or hub device 110-114 will not respond to the communication, will discard the communication, and will not forward any data or other payload from the communication or take any other actions.

Tracking Device Operating Modes

In one embodiment, the tracking devices 104-108 operate in either a wake on activity mode or a timing mode. When in the wake on activity mode of operation, the tracking device 104-108 will sleep or hibernate when not active. When sleeping or hibernating, a tracking device 104-108 uses minimum power and optionally will not attempt to record/store activity data from its sensor(s). The tracking device 104-108 will exit the sleep or hibernate state if either a timer of the tracking device with a selected sensor reading interval or period (e.g. a seven (7) day timer) expires or an accelerometer or other sensor(s) of the tracking device detects motion/activity. If the seven day timer expires without activity, the tracking device 104-108 will attempt to pair with a hub device 110-114 to report no activity and re-enter the sleep or hibernate state. If the accelerometer of the tracking device 104-108 detects activity, the tracking device will attempt to pair with a hub device 110-114 to report the activity and enter a time-based interval report mode until the tracking device no longer detects activity. The time-based interval report mode has a selected sensor data reporting interval (e.g. eight (8) minutes). The tracking device 104-108 monitors activity of the accelerometer or other sensor(s) every minute or other time interval or period (e.g. sensor reading interval) during the selected sensor data reporting interval to determine whether the tracking device is active and will store any activity data from the sensor(s) in memory of the tracking device until the selected sensor data reporting interval has elapsed. If no activity is recorded in a selected number of days (e.g. 30 days) or other selected interval, the tracking device will sleep or hibernate and optionally enter a timer mode.

When in the timer mode of operation, the tracking device 104-108 will attempt to pair with a hub device 110-114 at a selected sensor data reporting interval to report any motion/activity detected by the tracking device's accelerometer or other sensor(s). The tracking device 104-108 monitors activity of the accelerometer or other sensor(s) every minute or other sensor reading interval during the selected sensor data reporting interval but only attempts to pair with a hub device 110-114 to report any motion/activity when the selected sensor data reporting interval has elapsed.

In one embodiment, the tracking devices 104-108 have a wake on activity parameter that indicates whether the tracking device is in the wake on activity mode or the timer mode. A tracking device is set to the wake on activity mode when the wake on activity parameter is set to a one (1) and is set to timer mode when the wake on activity parameter is set to a zero (0).

Control Channels, Data Channels, and Pairing Options

The tracking devices 104-108 and the hub devices 110-114 use one or more control channels to transmit and receive control communications and one or more data channels to transmit and receive data communications. A control channel is a communication frequency designated for control communications for setting up and configuring the data channels, a control channel is not used for data communications, and control communications include pair requests and pair responses. In one example, the control channel(s) is/are a LoRa or IoT control channel frequency. A data channel is a communication frequency designated for data communications, a data channel is not used for control communications, and data communications include sensor reports/sensor data communications, configurations and configuration changes, and acknowledgements. In one example, the data channel(s) is/are a LoRa or IoT data channel frequency.

In one embodiment, each tracking device 104-108 uses one of multiple control channels to transmit and receive control communications, including pair requests and pair responses. Each tracking device 104-108 may be pre-configured to communicate control communications over only one control channel. Alternately, each tracking device 104-108 may select one of multiple control channels to communicate control communications. The hub devices 110-114 in this embodiment are configured to receive and transmit control communications over any of the control channels. Alternatively, a hub device 110-114 may be configured to receive and transmit control communications over only one control channel.

In one embodiment, each hub device 110-114 selects one of multiple data channels over which data will be communicated between the hub device and a tracking device 104-108 to which it is pairing or paired. Each hub device 110-114 may be pre-configured to communicate data communications over only one data channel. Alternately, each tracking hub device 110-114 may select one of multiple data channels to communicate data communications. The tracking devices 104-108 in this embodiment are configured to receive and transmit data communications over any of the data channels. Alternatively, a tracking devices 104-108 may be configured to receive and transmit data communications over only one data channel.

In one example, each hub device 110-114 receives a control communication, such as a pair request, from a tracking device 104-108, selects one of multiple data channels over which data will be communicated between the hub device and the tracking device to which the hub device is pairing or paired, and transmits an identification of the selected data channel and the hub device's device ID to the tracking device to which the hub device is pairing or paired in a control communication, such as a pair response. The tracking device 104-108 receives the identification of the selected data channel and the device ID of the hub device 110-114 in the control communication (e.g. in a pair response) and transmits data (e.g. a sensor report) and the device ID of the hub device to the hub device over the selected data channel. The hub device 110-114 receives the data (e.g. a sensor report) and the device ID of the hub device over the selected data channel and transmits an acknowledgement of receipt of the data (e.g. sensor report) to the tracking device 104-108 over the selected data channel.

The paired tracking device 104-108 will continue to transmit communications (e.g. sensor reports) to and receive communications (e.g. acknowledgements and configurations and configuration changes) from the paired hub device 110-114 over the data communication channel selected by the hub device until the devices become unpaired, and the paired hub device will continue to transmit communications (e.g. acknowledgements and configurations and configuration changes) to and receive communications (e.g. sensor reports) from the paired tracking device over the data communication channel selected by the hub device until the devices become unpaired.

In one embodiment, after the tracking device 104-108 is paired with the hub device 110-114, the paired tracking device will transmit communications with sensor data and other communications only to the paired hub device and not to all other hub devices, for example by including the paired hub device's device ID in the communications. A hub device 110-114 will not process a data communication that does not contain its device ID. Similarly, the paired hub device 110-114 will transmit communications with acknowledgements and configurations and configuration changes and other communications only to the paired tracking device 104-108 and not to other tracking devices, for example by including the paired tracking device's device ID in the communications. In one example, a tracking device 104-108 will not process a communication with a configuration or configuration change received over a data channel if the communication does not contain the tracking device's device ID.

In one embodiment, after the tracking device 104-108 is paired with the hub device 110-114, the paired tracking device will always attempt to communicate with the paired hub device over the selected data channel. The paired tracking device 104-108 and the paired hub device 110-114 will remain paired and communicate with each other until the communication link between the paired tracking device and the paired hub device is severed. In this example, the communication link is the selected data channel over which the paired tracking device and the paired hub device communicate. The communication link is severed when either the paired tracking device or the paired hub device no longer receive communications or acknowledgements of received communications from the other paired device. This may occur, for example, when one of the paired devices moves out of range of the other paired device. Since the hub devices 110-114 may be located on a mobile device, a paired hub device may move out of range of a paired tracking device 104-108. When the communication link is severed such that the paired tracking device 104-108 and the paired hub device 110-114 are no longer communicating, the tracking device will try to pair with another hub device.

In another embodiment, a tracking device 104-108 attempts to pair with a new hub device 110-114 at each selected period or interval of time, at each new sensor activity, or upon awakening from a sleep or hibernating status, even if the tracking device previously was paired with a hub device. For example, a tracking device 104-108 reads its sensor data and stores the sensor data in memory at selected sensor reading periods or intervals of time, such as every thirty seconds, every minute, every five minutes, every thirty minutes, every hour, a period between every ten seconds and every twenty-four hours, or another sensor reading period or interval of time. The tracking device 104-108 will then try to pair with a new hub device 110-114 to transmit that sensor data to the newly paired hub device at a selected sensor data reporting interval, such as every minute, every five minutes, every eight minutes, every twenty minutes, every thirty minutes, every hour, every six hours, every 12 hours, a multiple of an eight minute increment between eight minutes and 1440 minutes, a period between two minutes to seven days, upon sensing activity of the asset device to which it is attached, upon waking from a sleep cycle, every data reading interval, another value selected between every one minute to every 720 minutes, or another configurable sensor data reporting period or interval of time. In this embodiment, the tracking device 104-108 attempts to pair with a new hub device 110-114 at each sensor data reporting interval.

In another example embodiment, the location of the tracking device 104-108 is approximated by the location of a paired hub device 110-114 because the hub device attaches location data of the hub device to sensor data of the tracking devices before transmitting a communication with the sensor data and location data to the network server 116. The locations of the tracking devices then are displayed by a user interface of a client computing device 120 or 122 or the application server 118 from data provided by the network server 116. Pairing the tracking device 104-108 to a hub device 110-114 at each sensor data reporting interval results in a good location accuracy of the tracking device 104-108 when presented by the application server 118.

In another example embodiment, the tracking device 104-108 first tries to pair with a hub device 110-114 by transmitting a pair request at a lowest communication power transmission level. Since the location of the tracking device 104-108 is approximated by the location of the hub device 110-114, the purpose for the tracking device transmitting a pair request at the lowest communication power transmission level is to pair to the closest hub device 110-114 so that a more precise location of the tracking device can be determined and used for reporting.

If a hub device 110-114 does not respond to the pair request from the tracking device 104-108 at the lowest communication power transmission level, the tracking device waits a selected period of time and attempts a pair request at the next higher communication power transmission level. The tracking device 104-108 repeats this process until the tracking device receives a pair response to the pair request from one of the hub devices 110-114 or performs the configured maximum number of pair attempts. If the tracking device 104-108 performs the maximum number of pair attempts and still does not receive a pair response to the pair request from a hub device 110-114, the tracking device stops the pairing process for the selected wait period or wait interval, such as until the next sensor data reporting interval.

In one example, the selected wait period of time or selected wait interval is from thirty seconds to 700 minutes. In another example, the selected wait period of time or selected wait interval starts at four minutes. In another example, the selected wait period of time or selected wait interval is dependent on the number of pairing retry attempts already made (e.g. with either an increasing interval for each successive retry attempt or with a decreasing interval with each retry attempt). In another example, the tracking device 104-108 waits until the next sensor data reporting interval to attempt to pair with a hub device 110-114. In one example, the selected wait interval is the difference between the current time and the next sensor data reporting interval.

In another example, a tracking device 104-108 attempts to pair with a hub device within a selected pairing completion time, such as five minutes or another selected pairing completion time. If the tracking device 104-108 does not receive a pair response, the tracking device transmits a pair request at each pairing retry interval or pairing retry period of time, such as each minute or another selected pairing retry interval of time, until the tracking device receives a response or a selected pairing completion time ends.

Pairing Quality Rating Value (PQRV) Examples

In one embodiment, a tracking device 104-108 will select a best hub device 110-114 with which to pair from among one or more hub devices, including for data and configuration exchanges. The tracking device 104-108 may determine the best hub device 110-114 with which to pair based on one or more state pairing parameters, such as the signal strength of the pair request received by a hub device and/or other pairing quality information from one or more hub device state pairing parameters.

In one example, each tracking device 104-108 determines the best hub device with which to pair to the particular tracking device based on a pairing quality rating value (PQRV) of each hub device 110-114. The pairing quality rating value (PQRV) is a metric that can be used by the tracking devices 104-108 to determine the best available pairing hub device. A better pairing quality rating value corresponds to more reliable communication links/connections between a particular tracking device 104-108 and a particular hub device 110-114 and between the particular hub device and the network server 116. Therefore, a particular tracking device 104-108 will select a particular hub device 110-114 having the best pairing quality rating value.

In one embodiment, one or more of the tracking devices 104-108 require a potential pairing hub device 110-114 to have a minimum pairing quality rating value (PQRV) in order to pair with the tracking device. In one example of this embodiment, the tracking devices 104-108 optionally transmit the minimum pairing quality rating value (PQRV) in the pair requests. In one example, if a particular hub device 110-114 does not have the minimum pairing quality rating value (PQRV) (is not equal to or greater than the minimum PQRV value) specified in the pair request transmitted by a particular tracking device 104-108, the particular hub device does not respond to the pair request with a pair response, and the particular tracking device therefore does not pair with the particular hub device.

In another example of this embodiment, the tracking devices 104-108 require a potential pairing hub device 110-114 to have a minimum pairing quality rating value (PQRV) in order to pair with the tracking device. The tracking devices 104-108 optionally either do or do not transmit the minimum pairing quality rating value (PQRV) in the pair requests. The hub devices 110-114 each respond to a pair request with a pair response and include their determined pairing quality rating value (PQRV) in the pair response. If a pairing quality rating value (PQRV) of a particular hub device does not meet (is not equal to or greater than) the minimum pairing quality rating value (PQRV) required by a particular tracking device 104-108, the particular tracking device does not pair with the particular hub device. If the pairing quality rating value (PQRV) of all of the hub devices 110-114 do not meet (are not equal to or greater than) the minimum pairing quality rating value (PQRV) required by the particular tracking device 104-108, the particular tracking device does not pair with any of the hub devices.

In another embodiment, a tracking device 104-108 and/or a hub device 110-114 determines the best hub device with which to pair to a particular tracking device based on a pairing quality rating value (PQRV). In this embodiment, the pairing quality rating value (PQRV) is a metric that can be used by either or both the tracking devices 104-108 and the hub devices 110-114 to determine the best available pairing device.

In one aspect, each hub device 110-114 determines (e.g. calculates) its own pairing quality rating value (PQRV). In this aspect, each state pairing parameter has a state or value and a corresponding de-rating (e.g. subtraction or offset) value to be subtracted from a starting PQRV value based on the state pairing parameter value to result in the final PQRV. Therefore, the states or values of the different state pairing parameters are combined to determine the final PQRV. In one aspect, the state pairing parameters for the pairing quality rating value (PQRV) determined by each hub device 110-114 includes a received signal strength indicator (RSSI) of the pair request, a power status of the hub device indicative of whether or not the hub device is connected to an external power source, a signal quality of a cellular signal or other network signal or connection at/on the hub device for communication/communicating with the network server (e.g. a received signal strength indicator (RSSI) of a cellular signal at/on the hub device (e.g. for communication/communicating with the network server using cellular signals such as a cellular connection), a signal strength of connectivity between the hub device and the network server, or a cellular signal strength of a cellular connection between the hub device and a network server), and a special offset value provided by the network server. In this aspect, each state pairing parameter has a state or value and a corresponding de-rating (e.g. subtraction or offset) value to be subtracted from a starting PQRV value based on the state pairing parameter value to result in the final PQRV. Therefore, the states or values of the different state pairing parameters are combined to determine the final PQRV.

In another aspect, each hub device 110-114 determines (e.g. calculates) its own pairing quality rating value (PQRV). In this aspect, each state pairing parameter has a state or value and a corresponding de-rating (e.g. subtraction or offset) value to be subtracted from a starting PQRV value based on the state pairing parameter value to result in the final PQRV. Therefore, the states or values of the different state pairing parameters are combined to determine the final PQRV. In one aspect, the state pairing parameters for the pairing quality rating value (PQRV) determined by each hub device 110-114 includes one or more of a received signal strength indicator (RSSI) of one or more communications received by the hub device 110-114 from the tracking device 104-108 (e.g. the RSSI of a pair request), a power status of the hub device (e.g. whether the hub device is connected to an external power source from an asset device, a battery, a LoRa type transceiver, or a solar powered device), how close the hub device is to a maximum value of a duty cycle, whether or not the hub device has a cellular connection or other connection to a network server 116, a signal quality of a cellular signal or other network signal or connection at/on the hub device for communication/communicating with the network server (e.g. a received signal strength indicator (RSSI) of a cellular signal at/on the hub device (e.g. for communication/communicating with the network server using cellular signals such as a cellular connection), a signal strength of connectivity between the hub device and the network server, or a cellular signal strength of a cellular connection between the hub device and a network server), a ground speed of the hub device optionally over a period of time (e.g. a value of zero or greater than zero as determined by the hub device from one or more GPS signals received by the hub device or one or more sensor readings of one or more hub device sensors), a determination by the hub device if there is activity (e.g. movement) of the hub device or an asset device to which the hub device is connected based on one or more sensor readings of one or more sensors of the hub device, and/or a special offset value provided by the network server. The hub device duty cycle is the fraction of a period of time a hub device is active (e.g. transmitting in the case of a transmitter).

In the above state pairing parameters, the hub device duty cycle refers to the hub device transmitting duty cycle. Though, in a different example, a transmitting and receiving duty cycle of the hub device may be used. Both limited mobility of a hub device 110-114 and good cellular connectivity or other connectivity between the hub device and the network server 116 result in a better pairing quality rating value for the hub device. For example, the hub devices 110-114 may connect to and receive power from a power system of a LoRa type transceiver to preserve cellular connectivity. Tracking devices 104-108 will attempt to pair with hub devices 110-114 that have limited mobility and good cellular connectivity or other connectivity with the network server 116.

In one aspect, all of the above-referenced state pairing parameters are used for the pairing quality rating value. In another aspect, one or more (but not all) of the above-referenced state pairing parameters are selected to be used for the pairing quality rating value.

In another aspect, each hub device 110-114 makes a determination of one or more of the state pairing parameters associated with a particular tracking device 104-108, assigns a quality rating (QR) value to each of the one or more state pairing parameters based on the value of the state pairing parameter, and adds up each quality rating value to determine a total or composite pairing quality rating value for the tracking device.

RSSI of the Tracking Device Pair Request

Each hub device 110-114 measures or otherwise determines the received signal strength indicator (RSSI) of each pair request from each tracking device 104-108 from which it receives a pair request and assigns a quality rating value to the RSSI state pairing parameter based on the RSSI of the pair request. For example, the RSSI of the received pair request may be a LoRa RSSI of the received pair request. The hub device 110-114 monitors the RSSI of each tracking device 104-108 pair request to determine if the hub device can make a good communication link or connection with the tracking device. Nearby objects can impact the RSSI of the tracking device 104-108 communication.

The following table depicts one example of measured RSSIs of pair requests and corresponding quality rating values used for the RSSI state pairing parameter based on the measured RSSIs. The de-rating value of the pair request RSSI state paring parameter is subtracted from a starting PQRV for a final PQRV.

TABLE 1

| Measured RSSI (dBm) of Pair Request | Derating (Subtracting) Quality Rating (QR) Value of RSSI State Pairing Parameter |
|---|---|
| >=−60 | 0 |
| <−60 & >=−70 | −15 |

TABLE 1-continued

| Measured RSSI (dBm) of Pair Request | Derating (Subtracting) Quality Rating (QR) Value of RSSI State Pairing Parameter |
|---|---|
| <-70 & >=-80 | -30 |
| <-80 & >=-90 | -45 |
| <-90 | -60 |

Cellular Signal Strength Indication

A hub device 110-114 monitors the cellular signal strength of the cellular communication network (or other network communication strength) for communications it is transmitting to and receiving from the network server 116. The cellular signal strength at/on the hub device 110-114 may be, for example, a received signal strength indicator (RSSI) of a cellular signal at/on the hub device or a cellular signal strength of connectivity between the hub device 110-114 and the network server 116, e.g. for communication/communicating with the network server using cellular signals such as a cellular connection. This cellular signal strength on the hub device 110-114 can be monitored constantly, periodically (e.g. every 1 minute, every 5 minutes, every 10 minutes, every 15 minutes, or another value between 0-90 minutes), or when a data transmission is taking place. The hub device 110-114 optionally monitors the cellular signal strength over a period of time. Therefore, the current status of the monitored cellular signal strength of a hub device may impact the hub device's pairing quality rating.

The following table depicts an example of how a cellular signal strength state pairing parameter can impact a quality rating (QR) value of a hub device. The de-rating value of the cellular signal strength (e.g. the RSSI of a cellular signal at/on the hub device 110-114) state paring parameter is subtracted from a starting PQRV for a final PQRV. Though, a measurement other than the RSSI may be used.

TABLE 2

| RSSI Measured Value (dBm) | Derating (Subtracting) Quality Rating (QR) Value of Cellular Signal Strength State Pairing Parameter |
|---|---|
| >=-93 | 0 |
| <-93 & >=-96 | -32 |
| <-96 & >=-99 | -64 |
| <-99 & >=-102 | -96 |
| <-102 | -128 |

Power Status

Each hub device 110-114 monitors the power source to which the hub device is connected. When a hub device 110-114 is operating using an internal battery, the operating time of the hub device may be more limited (e.g. if the battery becomes depleted) than if the hub device is operating on an external power source, such as a power source of a vehicle, a LoRa transceiver, or other asset device to which the hub device is attached, connected, or otherwise associated. Therefore, a tracking device 104-108 establishing a pairing relationship with a hub device 110-114 with an external power source may be a better choice in some circumstances than if the hub device only relies on an internal battery.

The following table depicts one example of how an external power source state pairing parameter can impact a quality rating (QR) value of a hub device. The de-rating value of the hub device external operating power state paring parameter is subtracted from a starting PQRV for a final PQRV.

TABLE 3

| Hub Device Operating on External Power? | Derating (Subtracting) Quality Rating (QR) Value of External Power Source State Pairing Parameter |
|---|---|
| Yes | 0 |
| No | -9 |

Network Server Provided Offset Value

In some cases, the network server 116 or a user may want to push a tracking device either toward or away from pairing with a particular hub device 110-114. The network server 116 or the user may accomplish this by making a hub device 110-114 more attractive or less attractive as a pairing option by pushing an offset value from the network server to a particular hub device, relative to pairing with a particular tracking device 104-108 or relative to pairing with any tracking device. For example, the network server 116 may transmit a first offset value to a first hub device 110-114 for a pairing with a first tracking device 104-108, transmit a second offset value to a second hub device for pairing with any tracking device, and not transmit any offset value (or transmit a zero offset value) to a third hub device for pairing with any tracking device.

The following table depicts an example of how an offset value state pairing parameter provided by the network server 116 can impact a quality rating (QR) value of a hub device. A lower number (e.g. -40) would make a hub device 110-114 less attractive to a particular tracking device 104-108 and a higher number (e.g. 0) would make a hub device more attractive. The de-rating value of the network server offset value state paring parameter is subtracted from a starting PQRV for a final PQRV.

TABLE 4

| Pairing Quality Offset | Derating (Subtracting) Quality Rating (QR) Value of Network Server Provided Offset Value State Pairing Parameter |
|---|---|
| Offset Value | Between 0 and -255 |

Duty Cycle

In certain regions, a communication from a hub device 110-114 is limited by a transmit duty cycle of the hub device. A duty cycle indicates the fraction of time a resource is active. The transmit duty cycle for a hub device is the total time a hub device is transmitting communications per time period, such as per hour. The total duty cycle for the hub device is the total time the hub device is transmitting and receiving communications per time period, such as per hour. In one embodiment, when the hub device 110-114 reaches 80% of the hub device's transmit duty cycle limit or a selected transmit duty cycle number in a range of 70-95% of the hub device's transmit duty cycle limit, the hub device will quit replying to pair requests in order to maintain communication capabilities with existing paired tracking devices 104-108. In this embodiment, if the hub device 110-114 reaches the 80% of the hub device's transmit duty cycle limit (or another selected transmit duty cycle number in the range of 70-95% of the hub device's transmit duty cycle limit), the hub device may be limited in the amount of communications the hub device can transmit to a tracking device 104-108. In another embodiment, when the hub device 110-114 reaches 80% of the hub device's total duty cycle limit or a selected total duty cycle number in a range of 70-95% of the hub device's total duty cycle limit, the hub device will quit replying to pair requests in order to maintain communication capabilities with existing paired tracking devices 104-108. Therefore, the current status of a duty cycle of a hub device may impact the hub device's pairing quality rating.

The following table depicts one example of how a hub device transmit duty cycle state pairing parameter can impact a quality rating (QR) value of a hub device. The de-rating value of the hub device transmit duty cycle state paring parameter is subtracted from a starting PQRV for a final PQRV.

TABLE 5

| Transmit Duty Cycle >80% | Derating (Subtracting) Quality Rating (QR) Value of Hub Device Transmit Duty Cycle State Pairing Parameter |
| --- | --- |
| No | 0 |
| Yes | −25 |

The following table depicts another example of how a hub device transmit duty cycle state pairing parameter can impact a quality rating (QR) value of a hub device.

TABLE 6

| Transmit Duty Cycle > or =Selected Value | Derating (Subtracting) Quality Rating (QR) Value of Hub Device Transmit Duty Cycle State Pairing Parameter |
| --- | --- |
| No | 0 |
| Yes | −25 |

The following table depicts another example of how a hub device total duty cycle state pairing parameter can impact a quality rating (QR) value of a hub device. The de-rating value of the hub device total duty cycle state paring parameter is subtracted from a starting PQRV for a final PQRV.

TABLE 7

| Total Duty Cycle > or =Selected Value | Derating (Subtracting) Quality Rating (QR) Value of Hub Device Total Duty Cycle State Pairing Parameter |
| --- | --- |
| No | 0 |
| Yes | −25 |

Hub Device Ground Speed or Activity Determination

The hub device 110-114 monitors the hub device's ground speed (e.g. in km/hr) (optionally over a selected time period) using one or more sensors of the hub device, one or more receivers of the hub device, and/or one or more communications received by the hub device, such as GPS signals received by the hub device's GPS receiver and/or dead reckoning sensors and processors. A hub device 110-114 optionally monitors this ground speed value over a period of time. A hub device 110-114 may move in and out of range of a particular tracking device 104-108. The ground speed of the hub device 110-114 is used in determining if the hub device is a reliable device to pair with a tracking device 104-108.

The following table depicts an example of how a hub device ground speed state pairing parameter (as measured currently or optionally within a selected prior period of time, e.g. within the last 720 minutes) can impact a quality rating (QR) value of a hub device. The de-rating value of the hub device ground speed state paring parameter is subtracted from a starting PQRV for a final PQRV.

TABLE 8

| Measured Ground Speed (km/hr) | Derating (Subtracting) Quality Rating (QR) Value of Hub Device Ground Speed State Pairing Parameter |
| --- | --- |
| <=10 | 0 |
| >10 and <50 | −25 |
| >=50 | −50 |

Alternately, the hub device 110-114 may use activity data from the hub device, using one or more sensors of the hub device and/or one or more receivers of the hub device. For example, the hub device 110-114 may have one or more accelerometers and/or one or more gyroscopes to sense motion of the hub device. The hub device 110-114 may assign a Quality Rating (QR) Value to current motion or motion, optionally over a period of time.

The following table depicts an example of how a hub device activity (e.g. motion) state pairing parameter (as measured currently or optionally within a selected prior period of time, e.g. within the last 720 minutes) can impact a quality rating (QR) value of a hub device. The de-rating value of the hub device activity state paring parameter is subtracted from a starting PQRV for a final PQRV.

TABLE 9

| Activity | Derating (Subtracting) Quality Rating (QR) Value of Hub Device Activity State Pairing Parameter |
| --- | --- |
| No | 0 |
| Yes | −25 |

Example 1

A hub device 110 receives a pair request from a tracking device 104 with a pair request RSSI of −72 dBm in a LoRa communication network, the hub device is running on external power, and the hub device has a cellular signal strength of −109 dBm. The hub device 110 determines (e.g. calculates) its pairing quality rating value (PQRV) based only on four state paring parameters: the received signal strength indicator (RSSI) of the pair request, the power status of the hub device indicative of whether or not the hub device is connected to an external power source, a signal quality of a cellular signal or other network signal or connection at/on the hub device for communication/communicating with the network server (e.g. a received signal strength indicator (RSSI) of a cellular signal at/on the hub device (e.g. for communication/communicating with the network server using cellular signals such as a cellular connection), a signal strength of connectivity between the hub device and the network server, or a cellular signal strength of a cellular connection between the hub device and a network server), and the special offset value provided by the network server. The special offset value is optional in some embodiments. The hub device 110 determines its pairing quality rating value (PQRV) in this example as follows and transmits its PQRV with the pair response to the tracking device 104 that sent the pair request:

TABLE 10

| State Pairing Parameter | State Pairing Parameter Values | Starting State Parameter Pairing Value = 255; State Pairing Parameter Derating (Subtracting) Values |
|---|---|---|
| LoRa RSSI of Pair Request | −72 dBm | −30 |
| Hub Device External Power (Y/N?) | Yes | 0 |
| Cellular Signal Strength | −98 dBm | −64 |
| Network Server Offset Value | 0 | 0 |
| Final Pairing Quality Rating Value | | 161 |

Example 2

A hub device 110-114 receives a pair request from a tracking device 104-108 with a pair request RSSI of −122 dBm in a LoRa communication network, the hub device is running on external power, the hub device has a transmit duty cycle of 82%, the hub device has a cellular signal strength of −97 dBm, and the hub device had a ground speed of 60 km/hr 45 minutes ago. In this example, the pairing quality rating value (PQRV) has a starting state pairing value of 255, and the values of the state pairing parameters are either added to or subtracted from the starting state pairing value by the hub device 110-114 to determine a final pairing quality rating value (PQRV). In other examples, the pairing quality rating value (PQRV) may have a starting state pairing value of 0 or another value, different values may be designated for the particular state pairing parameters (e.g. −10 or +10 instead of −50 and −5 or +5 instead of −25), and the values of the state pairing parameters may be added to or subtracted from the starting state pairing value by the hub device to determine a final pairing quality rating value (PQRV). The hub device 110-114 determines its pairing quality rating value (PQRV) in this example as follows and transmits its PQRV with the pair response to the tracking device that sent the pair request:

TABLE 11

| State Pairing Parameter | State Pairing Parameter Values | Starting State Parameter Pairing Value = 255; State Pairing Parameter Derating (Subtracting) Values |
|---|---|---|
| LoRa RSSI of Pair Request | −122 dBm | −60 |
| Hub Device External Power (Y/N?) | Yes | 0 |
| Hub Device Duty Cycle | 82% | −25 |
| Cellular Signal Strength | −97 dBm | −64 |
| Hub Device Ground Speed (last 12 hour) | 60 km/hr | −50 |
| Network Server Offset Value | 0 | 0 |
| Final Pairing Quality Rating Value | | 56 |

Example 3

A hub device 110-114 receives a pair request from a tracking device 104-108 in the evening with a pair request RSSI of −105 dBm in a LoRa communication network, the hub device is running on external power, the hub device has a duty cycle of 27%, the hub device has a cellular signal strength of −90 dBm, and the hub device had a ground speed of 11 km/hr 8 hours ago. In this example, the pairing quality rating value (PQRV) has a starting state pairing value of 255, and the values of the state pairing parameters are either added to or subtracted from the starting state pairing value by the hub device 110-114 to determine a final pairing quality rating value (PQRV). In other examples, the pairing quality rating value (PQRV) may have a starting state pairing value of 0 or another value, different values may be designated for the particular state pairing parameters (e.g. −10 or +10 instead of −50 and −5 or +5 instead of −25), and the values of the state pairing parameters may be added to or subtracted from the starting state pairing value by the hub device to determine a final pairing quality rating value (PQRV). The hub device 110-114 determines its pairing quality rating value (PQRV) in this example as follows and transmits its PQRV with the pair response to the tracking device that sent the pair request:

TABLE 12

| State Pairing Parameter | State Pairing Parameter Values | Starting State Parameter Pairing Value = 255; State Pairing Parameter Derating (Subtracting) Values |
|---|---|---|
| LoRa RSSI of Pair Request | −105 dBm | 0 |
| Hub Device External Power (Y/N?) | Yes | 0 |
| Hub Device Duty Cycle | 27% | 0 |
| Cellular Signal Strength | −90 dBm | 0 |
| Hub Device Ground Speed (last 12 hour) | 11 km/hr | −25 |
| Network Server Offset Value | 0 | 0 |
| Final Pairing Quality Rating Value | | 230 |

Example 4

A hub device 110-114 receives a pair request from a tracking device 104-108 in the evening with a pair request RSSI of −75 dBm in a LoRa communication network, the hub device is running on external power, the hub device has a duty cycle of 8%, the hub device has a cellular signal strength of −90 dBm, and the hub device had a ground speed of 11 km/hr 8 hours ago. In this example, the pairing quality rating value (PQRV) has a starting state pairing value of 255, and the values of the state pairing parameters are either added to or subtracted from the starting state pairing value by the hub device 110-114 to determine a final pairing quality rating value (PQRV). In other examples, the pairing quality rating value (PQRV) may have a starting state pairing value of 0 or another value, different values may be designated for the particular state pairing parameters (e.g. −10 or +10 instead of −50 and −5 or +5 instead of −25), and the values of the state pairing parameters may be added to or subtracted from the starting state pairing value by the hub device to determine a final pairing quality rating value (PQRV). The hub device 110-114 determines its pairing quality rating value (PQRV) in this example as follows and transmits its PQRV with the pair response to the tracking device that sent the pair request:

TABLE 13

| State Pairing Parameter | State Pairing Parameter Values | Starting State Parameter Pairing Value = 255; State Pairing Parameter Derating (Subtracting) Values |
|---|---|---|
| LoRa RSSI of Pair Request | −75 Bm | −30 |
| Hub Device External Power (Y/N?) | No | −9 |
| Hub Device Duty Cycle | 8% | 0 |
| Cellular Signal Strength | −90 dBm | 0 |
| Hub Device Ground Speed (last 12 hour) | 0 km/hr | 0 |
| Network Server Offset Value | 0 | 0 |
| | Final Pairing Quality Rating Value | 216 |

In examples 1-3 above, the hub device 110-114 in example 2 has the best final pairing quality rating value (PQRV), and the hub device in example 2 is selected by the particular tracking device for pairing before either the hub device of Example 3 or the hub device of Example 1.

Using the Pairing Quality Rating Values (PQRVs)

In one aspect, each hub device 110-114 determines a pairing quality rating value for each pair request received from each tracking device 104-110, optionally stores each pairing quality rating value for each tracking device in memory of the hub device, and transmits the pairing quality rating value corresponding to each tracking device (and optionally the RSSI of the corresponding tracking device pair request) in a pair response to the corresponding tracking device to which the pairing quality rating value applies. In this aspect, a pairing quality rating value determined for a first tracking device differs from a pairing quality rating value determined for a second tracking device because the pair request for the first tracking device has a different RSSI than the pair request from the second tracking device.

Thus, a first hub device 110-114 determines a pairing quality rating value for a first tracking device 104-108 from which the first hub device received a pair request, optionally stores the pairing quality rating value for the first tracking device in memory of the first hub device, and transmits the pairing quality rating value for the first tracking device (and optionally the RSSI of the first tracking device pair request) in a pair response to the first tracking device. The first hub device 110-114 also determines a pairing quality rating value for a second tracking device 104-108 from which the first hub device has received a pair request, optionally stores the pairing quality rating value for the second tracking device in memory of the first hub device, and transmits the pairing quality rating value for the second tracking device (and optionally the RSSI of the second tracking device pair request) in a pair response to the second tracking device. The first hub device 110-114 continues this process until it has determined a pairing quality rating value for each tracking device from which it has received a pair request, optionally stored the pairing quality rating value for each tracking device in memory of the first hub device, and transmitted the pairing quality rating value for each tracking device (and optionally the RSSI of the corresponding tracking device pair request) in a pair response to the corresponding tracking device.

Similarly, a second hub device 110-114 determines a pairing quality rating value for a first tracking device 104-108 from which the second hub device has received a pair request, optionally stores the pairing quality rating value for the first tracking device in memory of the second hub device, and transmits the pairing quality rating value for the first tracking device (and optionally the RSSI of the first tracking device pair request) in a pair response to the first tracking device. The second hub device 110-114 also determines a pairing quality rating value for a second tracking device 104-108 from which the second hub device has received a pair request, optionally stores the pairing quality rating value for the second tracking device in memory of the second hub device, and transmits the pairing quality rating value for the second tracking device (and optionally the RSSI of the second tracking device pair request) in a pair response to the second tracking device. The second hub device 110-114 continues this process until the second hub device has determined a pairing quality rating value for each tracking device from which it has received a pair request, optionally stored the pairing quality rating value for each corresponding tracking device in memory of the second hub device, and transmitted the pairing quality rating value for each tracking device (and optionally the RSSI of the corresponding tracking device pair request) in a pair response to the corresponding tracking device.

In another example, a tracking device 104-108 receives a pair response from multiple hub devices 110-114 in response to a pair request transmitted from the tracking device. The tracking device 104-108 selects the best hub device 110-114 from among the multiple hub devices that responded with the pair responses by selecting the best pairing quality rating value (PQRV) corresponding to each hub device. In this example, each hub device 110-114 determines the pairing quality rating value and transmits a pair response with the pairing quality rating value the hub device determined to the tracking device 104-108. Alternately, each hub device 110-114 may transmit the pairing quality rating value the hub device determined in a separate communication, such as a different control communication over a control channel, either before or after transmitting the pair response.

A better pairing quality rating value corresponds to more reliable communication links/connections between a particular tracking device 104-108 and a particular hub device 110-114 and between the particular hub device and the network server 11614. Therefore, the tracking device 104-108 selects the hub device 110-114 with the best pairing quality rating value with which to pair.

In one embodiment, the tracking device 104-108 pairs with a selected hub device 110-114 by transmitting its sensor data (e.g. in one or more sensor reports) and the device ID of the selected hub device to the selected hub device over the data channel designated by the selected hub device for receiving sensor data from the tracking device. In this embodiment, the tracking device 104-108 does not transmit any sensor data to the hub devices that were not selected for pairing. Since the not-selected hub devices did not receive any sensor data with their device ID, the not-selected devices are not paired with the tracking device.

In another embodiment, the tracking device 104-108 transmits a pair acknowledgement to the hub device 110-114 with the best pairing quality rating value, and the tracking device then pairs with that hub device with the best pairing quality rating value to which it sent the pair acknowledgement. In this embodiment, the tracking device 104-108 either does not transmit a pair acknowledgement to the other hub devices 110-114 that were not selected for pairing or transmits a control communication to the other hub devices not selected for pairing indicating the tracking device will not pair with the other hub devices.

FIG. 2

Figure 2:
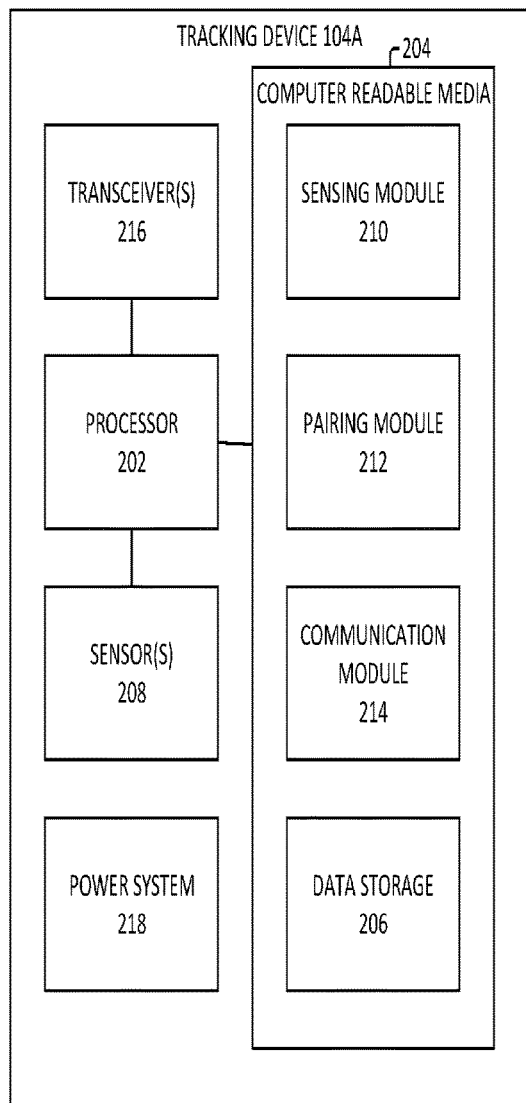
FIG. 2 is a block diagram of an exemplary embodiment of a tracking device.

FIG. 2 depicts an exemplary embodiment of a tracking device 104A. The tracking device 104A includes one or more processors 202 to process data and computer readable media (CRM) 204 to store data and computer readable-executable instructions. The processor 202 processes communications, builds communications, stores data to data storage/memory 206, and retrieves data from data storage/memory. The processor 202 and the CRM 204 are hardware. The CRM 204 may include volatile and/or non-volatile memory, e.g., a computer-readable storage medium such as a cache, random access memory (RAM), read only memory (ROM), flash memory, and/or other memory to store data and/or computer readable-executable instructions, such as one or more modules or a portion or component of one or more modules.

The tracking device 104A includes one or more sensors 208. The sensor(s) 208 include one or more sensors to sense activity or non-activity of the asset device to which it is attached, connected, or otherwise associated. For example, the sensor(s) 208 may be one or more of an accelerometer to sense motion or movement of the asset device to which it is attached, a temperature sensor to sense temperature of the asset device to which it is attached (e.g. a motor of the asset device), an orientation sensor to sense changes in orientation of the asset device to which it is attached, a vibration sensor to sense vibration of the asset device to which it is attached, or other sensors to sense activity or one or more other characteristics of an asset device. The sensor(s) 208 take one or more measurements or readings and transmit the results of the measurements or readings to the processor 202 as sensor data.

The tracking device 104A includes one or more modules, which are computer readable-executable instructions. The modules are stored in the CRM 204 and executed by the processor 202. In the example of FIG. 2, the modules include a sensing module 210, a pairing module 212, and a communication module 214.

The sensing module 210 controls obtaining data from the one or more sensors 208, transmitting that data to the processor 202, and storing that data in data storage 206. For example, the sensing module 210 is configured to obtain one or more sensor readings with sensor data at one or more data sensing periods or intervals and/or data reporting periods or intervals, transmitting that data to the processor 202, and storing that data in data storage 206. The sensing module 210 controls aspects of data sensing and storage of the sensor data for the tracking device 104A, as further discussed herein.

The pairing module 212 generates (creates) pair requests for transmission from the tracking device by the transceivers 216. The pairing module 212 evaluates data received during the pairing process, including the states, composite state, state quality values, or PQRV values and optional RSSI values of pair requests received in one or more pair responses and determines which of the hub devices with which to pair. The pairing module 212 optionally transmits pair requests to the communication module 214 for transmission by the transceiver(s) 216 and optionally receives pair responses or data from one or more pair responses from the communication module as received from the transceiver(s).

In one example, the pairing module 212 generates (creates) a pair request, which is transmitted by the transceiver 216. The pair request optionally is formatted by the communication module 214 (e.g. as a LoRa or IoT communication) prior to transmission by the transceiver(s) 216. The transceiver(s) 216 of the tracking device 104A receives multiple pair responses from the hub devices 110-114, and the pair responses each include a state, composite state, state quality values, or PQRV value of the transmitting hub device and an RSSI of the pair request as measured by that hub device. The pairing module 212 processes all of the pair responses, selects one of the hub devices 110-114 with the best state, composite state, state quality values, or PQRV value with which to pair, and instructs the processor 202 to pair with the selected hub device.

In one embodiment, the tracking devices 104-108 require a potential pairing hub device 110-114 to have a minimum pairing quality rating value (PQRV) in order to pair with the tracking device. The pairing module 212 determines if a pairing quality rating value (PQRV) in a pair response meets (is equal to or greater than) the minimum pairing quality rating value (PQRV). If a pairing quality rating value (PQRV) of a particular hub device does not meet (is not equal to or greater than) the minimum pairing quality rating value (PQRV) required by a particular tracking device 104-108, the pairing module 212 of the particular tracking device will not pair with the particular hub device. If the pairing quality rating value (PQRV) of all of the hub devices 110-114 do not meet (are not equal to or greater than) the minimum pairing quality rating value (PQRV) required by the particular tracking device 104-108, the particular tracking device does not pair with any of the hub devices. If a pairing quality rating value (PQRV) of one or more hub devices do meet (are equal to or greater than) the minimum pairing quality rating value (PQRV) required by a particular tracking device 104-108, the pairing module 212 of the particular tracking device will select a hub device with the best pairing quality rating value (PQRV) for pairing.

In one embodiment, if two or more hub devices 110-114 have a same best state, quality of one or more states, composite state, composite quality of one or more states, or the pairing quality rating value (as the case may be) identified in the hub device's pair responses, the pairing module 212 selects the hub device having the highest measured RSSI of the pair request the tracking device transmitted for pairing. If the two or more hub devices 110-114 also have the same RSSI of the pair request the tracking device 104-108 transmitted, the pairing module 212 selects the hub device for pairing that corresponds to the first received pair response. The communication module 214 in this example optionally receives the pair responses from the transceiver(s) 216, optionally decodes the pair responses from a LoRa or IoT format, and transmits the pair responses to the pairing module 214 for processing.

If In another example, the pairing module 212 generates (creates) a pair request, which is transmitted by the transceiver 216. The pair request optionally is formatted by the communication module 214 (e.g. as a LoRa or IoT communication) prior to transmission by the transceiver(s) 216. The transceiver(s) 216 of the tracking device 104A receives multiple pair responses from the hub devices 110-114, and the pair responses each include a pairing quality rating value of the transmitting hub device and an RSSI of the pair request as measured by that hub device. The pairing module 212 processes all of the pair responses, selects one of the hub devices 110-114 with the best pairing quality rating value with which to pair, and instructs the processor 202 to pair with the selected hub device. If two or more hub devices 110-114 have a same pairing quality response value identified in the hub device's pair responses, the pairing module 212 selects the hub device having a highest RSSI of the pair request the tracking device transmitted for pairing. If the two or more hub devices 110-114 also have the same RSSI of the pair request the tracking device transmitted, the pairing module 212 selects the hub device for pairing that corresponds to the first received pair response. The pairing module 212 controls all aspects of the pairing process for the tracking device 104A, as further discussed herein. The communication module 214 in this example optionally receives the pair responses from the transceiver(s) 216, optionally decodes the pair responses from a LoRa or IoT format, and transmits the pair responses to the pairing module 214 for processing.

The communication module 214 formats (e.g. encodes or decodes) communications to be transmitted to or received from one or more hub devices 110-114 and installs one or more configurations or configuration changes received from one or more hub devices. In one example, the communication module 214 retrieves sensor data from data storage 206, receives sensor data from the processor 202, or otherwise uses sensor data and creates or formats communications as binary encoded communications with that sensor data and other data (e.g. hub device ID) for transmission to one or more hub devices 110-114 over a data channel designated by the hub device. In another example, the communication module 214 receives configurations and/or configuration changes, stores the configurations or configuration changes as needed in data storage 206, installs the configurations or configuration changes on the tracking device 104A, generates acknowledgements that the configurations or configurations updates have been installed, and transmits the acknowledgements to the processor for transmission to one or more hub devices 110-114. The communication module 214 controls processing for receiving and transmitting communications for the tracking device 104A, as further discussed herein.

The tracking device 104A includes one or more transceivers 216 or other communication interfaces to transmit communications to and receive communications from one or more hub devices 110-114 via the first communication network 134. In one example, the one or more transceivers 216 include a Long Range (LoRa) type transceiver, an IoT transceiver, and/or another wireless transceiver. However, the tracking device 104A may include one or more additional or other types of transceivers to transmit communications to and receive communications from the hub devices 110-114 as further discussed herein.

The tracking device 104A may include a battery or other power system 218 to power the tracking device, connect to a power system of an asset device the tracking device is tracking, or receive power from a solar panel, solar cell, or other solar device attached or connected to or associated with the tracking device to generate power and store solar generated power. For example, an asset device may include a battery and/or a motor to generate power. A tracking device 104A may be connected to the asset device battery to receive power from the asset device battery or receive power via the asset device motor through one or more connections to a component of the motor.

FIG. 3

Figure 3:
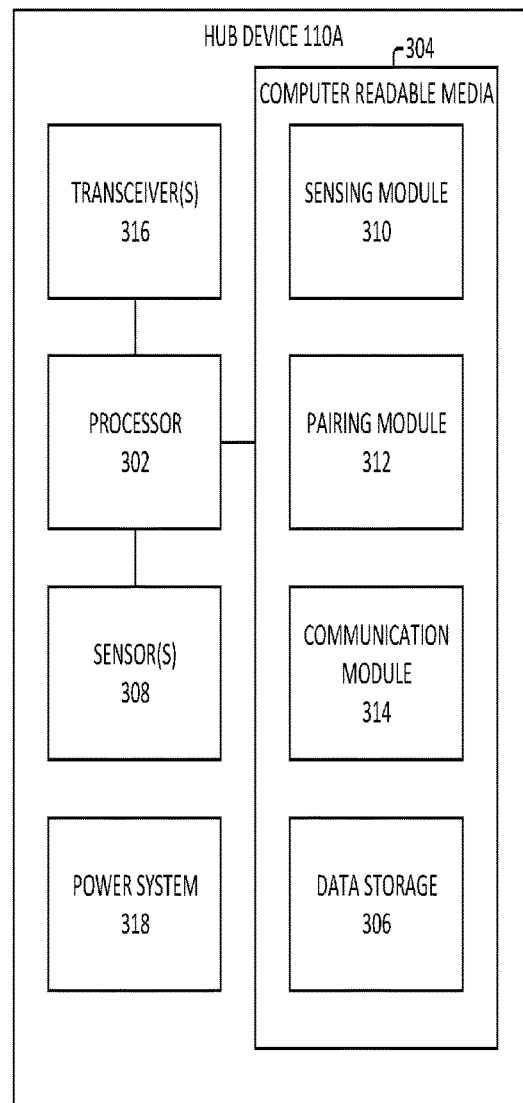
FIG. 3 is a block diagram of an exemplary embodiment of a hub device.

FIG. 3 depicts an exemplary embodiment of a hub device 110A. The hub device 110A includes one or more processors 302 to process data and computer readable media (CRM) 304 to store data and computer readable-executable instructions. The processor 302 processes communications, builds communications, stores data to data storage/memory 306, and retrieves data from data storage/memory. The processor 302 and the CRM 304 are hardware. The CRM 304 may include volatile and/or non-volatile memory, e.g., a computer-readable storage medium such as a cache, random access memory (RAM), read only memory (ROM), flash memory, and/or other memory to store data and/or computer readable-executable instructions, such as one or more modules or a portion or component of one or more modules.

The hub device 110A includes one or more sensors 308. The sensor(s) 308 include one or more sensors to sense activity or non-activity of the asset device to which it is attached, connected, or otherwise associated. For example, the sensor(s) 308 may be one or more of an accelerometer to sense motion or movement of the asset device to which it is attached, a temperature sensor to sense temperature of the asset device to which it is attached (e.g. a motor of the asset device), an orientation sensor to sense changes in orientation of the asset device to which it is attached, a vibration sensor to sense vibration of the asset device to which it is attached, or other sensors to sense activity or one or more other characteristics of an asset device. The sensor(s) 308 take one or more measurements or readings and transmit the results of the measurements or readings to the processor 302 as sensor data. The sensor(s) 308 also measure the RSSI of each received pair request and make one or more other measurements or sensor readings for the state pairing parameters or other states of the hub device.

The hub device 110A includes one or more modules, which are computer readable-executable instructions. The modules are stored in the CRM 304 and executed by the processor 302. In the example of FIG. 3, the modules include a sensing module 310, a pairing module 312, and a communication module 314.

The sensing module 310 controls obtaining data from the one or more sensors 308, transmitting that data to the processor 302, and storing that data in data storage 306. For example, the sensing module 310 is configured to obtain one or more sensor readings with sensor data at one or more data sensing periods or intervals and/or data reporting periods or intervals, transmitting that data to the processor 302, and storing that data in data storage 306. The sensing module 310 controls aspects of data sensing and sensor data storage for the hub device 110A, as further discussed herein.

The pairing module 312 determines and/or produces state data to be transmitted to one or more tracking devices 104-108 during the pairing process, including one or more states, composite states, state quality values, or a pairing quality rating value of the hub device 110A in one or more pair responses. In one example, the hub device 110A receives a pair request from a tracking device 104, and the pairing module 312 determines one or more states of the hub device, the quality of one or more states of the hub device, a composite value of multiple states of the hub device, a composite value of the quality of one or more states, or a pairing quality rating value of the hub device (as the case may be) and generates (creates) a pair response with the state, composite state, state quality values, or pairing quality rating value. The pairing module 312 also designates a data channel to receive sensor data from a tracking device 104 in the pair response along with a device ID of the hub device.

In another example, the hub device 110A receives a pair request from a tracking device 104, and the pairing module 312 determines a pairing quality rating value of the hub device based on one or more state pairing parameters. The pairing module 312 generates (e.g. creates) a pair response with the pairing quality rating value, a designated data channel to receive sensor data from a tracking device 104, a device ID of the hub device. The pairing module 312 optionally includes the RSSI of the pair request as measured by the hub device 110A with the pair response. The pairing module 312 controls all aspects of the pairing process for the hub device 110A, as further discussed herein.

The communication module 314 formats (e.g. encodes or decodes) communications to be transmitted to one or more tracking devices 104-108, formats communications to be transmitted to the network server 116, stores one or more configurations or configuration changes in the data storage 306 received from the network server intended for one or more tracking devices, retrieves one or more configurations or configuration changes from the data storage to be transmitted to one or more tracking devices, and installs one or more configurations or configuration changes received from the network server intended for the hub device. In one example, the communication module 314 retrieves sensor data from data storage 306, receives the sensor data from the processor 302, or otherwise uses sensor data and creates or formats communications as binary encoded communications with that sensor data for transmission to the network server 116. In another example, the communication module 314 generates acknowledgements that the configurations or configurations updates have been installed on the hub device, generates acknowledgements that one or more sensor reports with sensor data have been received from one or more tracking devices 104-108, and transmits the acknowledgements to the processor 302 for transmission to the network server or the one or more tracking devices. The communication module 314 controls processing for receiving and transmitting communications for the hub device 110A, as further discussed herein.

The hub device 110A includes one or more transceivers 316 or other communication interfaces to transmit communications to and receive communications from one or more tracking devices 104-108 via the first network 134 and to transmit communications to and receive communications from the network server 116 via the second network 138. In one example, the hub device 110A includes a Long Range (LoRa) type transceiver, IoT type transceiver, or other wireless transceiver to transmit communications to and receive communications from the tracking devices 104-108 via the first communication network 134 and a cellular transceiver (e.g. LTE-M transceiver) or other wired or wireless transceiver to transmit communications to and receive communications from the network server 116 via the second communication network 138. However, the hub device 110A may include one or more additional or other types of transceivers to transmit communications to and receive communications from the network server 116 and/or the tracking devices 104-108 as further discussed herein, including a Bluetooth connection transceiver, a Bluetooth Low Energy (BLE) connection transceiver, a WiFi network transceiver, and a LoRa Alliance network transceiver.

The one or more transceivers 316 of the hub device 110A also include a location data receiver to receive location data from one or more location data transmitting devices, such as a GPS receiver to receive GPS location data from one or more GPS devices, such as one or more GPS satellites or ground based GPS signal transmitters. Alternately, the one or more transceivers 316 of the hub device 110A may include a Global Navigation Satellite System (GLONASS) or equivalent receiver to receive other types of location data communications. In one example, an LTE-M transceiver includes a GPS receiver.

The hub device 110A may include a battery or other power system 318 to power the hub device, connect to a power system of an asset device the hub device is tracking, connect to a LoRa type transceiver, or receive power from a solar panel, solar cell, or other solar device attached or connected to or associated with the hub device to generate power and store solar generated power. For example, an asset device may include a battery and/or a motor to generate power. A hub device 110A may be connected to the asset device battery to receive power from the asset device battery or receive power via the asset device motor through one or more connections to a component of the motor.

FIG. 4

FIG. 4 depicts an exemplary embodiment of a network server 116A. The network server 116A includes one or more processors 402 and computer readable media (CRM) 404. The processor 402 executes computer readable-executable instructions in one or more modules 406-412 to build, transmit, and receive communications, process communications and data, optionally store data to an optional database/memory 414, and optionally retrieve data from database/memory. The processor 402 is hardware.

The CRM 404 stores data and computer readable-executable instructions of the modules 406-412. The CRM 404 may include volatile and/or non-volatile memory, e.g., a computer-readable storage medium such as a cache, random access memory (RAM), read only memory (ROM), flash memory, and/or other memory to store data and/or computer readable-executable instructions, such as the one or more modules 406-412 or a portion or component of one or more modules. In the example of FIG. 4, the modules include a communication module 406, a queue module 408, a configuration module 410, and an optional data module 412. The CRM 404 is hardware.

The communication module 406 controls receiving and transmitting communications for the network server 116A, as further discussed herein. The communication module 406 receives one or more communications from one or more hub devices 110-114 and transmits one or more communications to one or more hub devices. In one aspect, the communication module operates as a hypertext transfer protocol (HTTP) endpoint or an application programming interface (API) endpoint.

The communication module 406 formats (e.g. decodes) communications received from the one or more hub devices 110-114 and formats (e.g. encodes) communications to be transmitted to one or more hub devices 110-114. In one example, the communication module 406 converts data in binary encoded communications received from one or more hub devices 110-114 from a binary encoded format to a text based format, such as JavaScript Object Notation (JSON), for transmission to the queue module 408 or from the queue module, and may convert communications from a text based format or other format to a binary encoded format for transmission to one or more hub devices. In another example, conversions of communications (e.g. encoding and decoding) between a binary encoded format and a text format is performed by the queue module 408. The communication module 406 transmits received communications, including received communications that are converted from a binary encoded format to a text based format, to the queue of the queue module 408.

The queue module 408 has a queue in which communications or data from those communications are stored before being transferred to the application server 118 or to the communication module 406. In one example, the queue module 408 receives sensor data and/or other data from the communication module 406, temporarily stores the sensor data and/or other data in its queue awaiting to be transmitted, and transmits a communication with that sensor data and/or other data (or just the sensor data and/or other data) to a database of the application server 118 for storage in the database. In one example, the queue module 408 converts data in binary encoded communications received from one or more hub devices 110-114 from a binary encoded format to a text based format, such as JavaScript Object Notation (JSON), and may convert communications from a text based format or other format to a binary encoded format for transmission to one or more hub devices. In another example, conversions of communications (e.g. encoding and decoding) between binary encoded format and text format is performed by the communication module 406.

The configuration module 410 controls configurations and configuration changes for one or more tracking devices 104-108 and one or more hub devices 110-114 and transmitting the configurations and configuration changes to hub devices. For example, the configuration module 410 generates a device ID for a particular tracking device or a particular hub device and a configuration or configuration change for the particular tracking device or the particular hub device. The configuration module 410 identifies or transmits the device ID and the associated configuration or configuration change for the device ID for or to the communication module 406 for transmission from the network server 116A. The configuration module 410 may receive the configurations, configuration changes, and device IDs from the application server 118. The configuration module 410 controls other processes of the network server 116A for configurations and configuration changes for one or more tracking devices 104-108 and one or more hub devices 110-114, as further discussed herein.

The optional data module 412 optionally stores data from one or more communications in the database 414. For example, the network server 116A may receive sensor data from one or more hub devices 110-114, which may include sensor data and other data from the hub devices and/or sensor data and other data from one or more tracking devices 104-108. The data module 412 identifies the sensor data and the tracking device or the hub device to which the sensor data originated (e.g. from the device ID sent with the communication) and stores the sensor data with the device ID of the originating device in the database 414. The data further may include one or more of sensor data (sensor reports) for each particular tracking device in the asset tracking system 102, the tracking device's device ID, an identification of the asset device to which the tracking device is attached or associated, the tracking device's location (e.g. latitude and longitude or GPS Coordinates), the tracking device's sensor data (sensor report) time stamp, the tracking device's battery voltage, the tracking device's activity logs, the tracking device's temperature, and the tracking device's configuration version. The data also may include one or more of sensor data for each particular hub device in the asset tracking system 102, the hub device's device ID, an identification of the asset device to which the hub device is attached, connected, or associated, the hub device's location (e.g. latitude and longitude or GPS Coordinates), the hub device's available configuration slots, the hub device's configuration version, the hub device's external power source if present, the hub device's power voltage, and the hub device's tracking device sensor reports.

The optional data module 412 also optionally retrieves data from the database 414 for transmission or processing. For example, the network server 116A may receive a request for sensor data or other data. The data module 412 retrieves the data for those requests from the database 414 and transmits or provides that data to the communication module 406 for transmitting to the requesting device. The data module 412 performs and controls aspects of the data storage and retrieval from the database 414 of the network server 116A, as further discussed herein.

The optional database 414 may include a structured query language (SQL) database, a relational database management system (RDBMS) database, or another type of database management system that stores and communicates data from at least one database. The data stored in the database may be asset data, including data about one or more asset devices to be tracked by the tracking system, among other data. The data may include an identifier for one or more asset devices, a name and/or other metadata for one or more asset devices, an identifier for one or more tracking devices, an identifier for one or more hub devices, and/or sensor data provided by one or more tracking devices and/or one or more hub devices. The sensor data may include temperature data from one or more tracking devices and/or one or more hub devices, accelerometer data from one or more tracking devices and/or one or more hub devices, orientation data from one or more tracking devices and/or one or more hub devices, vibration data from one or more tracking devices and/or one or more hub devices, battery voltage data from one or more tracking devices and/or one or more hub devices, and signal strength data from one or more tracking devices and/or one or more hub devices. The data further may include one or more of sensor data (sensor reports) for each particular tracking device in the asset tracking system 102, the tracking device's device ID, an identification of the asset device to which the tracking device is attached, connected, or associated, the tracking device's location (e.g. latitude and longitude or GPS Coordinates), the tracking device's sensor data (sensor report) time stamp, the tracking device's battery voltage, the tracking device's activity logs, the tracking device's temperature, and the tracking device's configuration version. The data also may include one or more of sensor data for each particular hub device in the asset tracking system 102, the hub device's device ID, an identification of the asset device to which the hub device is attached, connected, or associated, the hub device's location (e.g. latitude and longitude or GPS Coordinates), the hub device's available configuration slots, the hub device's configuration version, the hub device's external power source if present, the hub device's power voltage, and the hub device's tracking device sensor reports.

The input/output (I/O) devices 416 are optional and include hardware input devices to enable a user to interact with functions of the network server 116A or otherwise provide inputs to the network server 116A. Examples of input devices include a mouse, a keyboard, a trackpad, a touchscreen, and/or other input devices. Input devices also include hardware devices to receive configurations, configuration changes, and other data, including universal serial bus (USB) devices, serial or parallel devices, wireless or wired transceivers, and other hardware devices used to receive data and programming at a computing device. The I/O devices 416 also include one or more output devices, such as a display or printing device.

The network server 116A includes one or more transceivers 418 or other communication interfaces to transmit communications to and receive communications from one or more hub devices 110-114 and transmit communications to and receive communications from the application server 118. In one example, the transceiver(s) 418 of the network server 116A include a cellular transceiver (e.g. LTE-M transceiver), a narrowband Internet of Things (NB-IoT) transceiver, a wireless or wired broadband network transceiver, a wireless or wired narrowband network transceiver, a Bluetooth connection transceiver, a Bluetooth Low Energy (BLE) connection transceiver, a WiFi network transceiver, a LoRa network transceiver, and/or another wired or wireless transceiver to transmit communications from and receive communications from one or more hub devices 110-114. In another example, the transceiver(s) 418 of the network server 116A include another wireless or wired transceiver or other communication interface to transmit communications to and receive communications from the application server 118, such as via the Internet, an intranet, a cellular network, a wired or wireless broadband network, a wireless or wired narrowband network, or another packet network.

A power system 420 powers the network server 116A. The power system 420 may be, for example, an alternating current power source and/or direct current power source.

FIG. 5

FIG. 5 depicts an exemplary embodiment of an application server 118A. The application server 118A includes one or more processors 502 and computer readable media (CRM) 504. The processor 502 executes computer readable-executable instructions in one or more modules 506-512 to build, transmit, and receive communications, process communications and data, store data to a database/memory 514, and retrieve data from database/memory. The processor 502 is hardware.

The CRM 504 stores data and computer readable-executable instructions of the modules 506-512. The CRM 504 may include volatile and/or non-volatile memory, e.g., a computer-readable storage medium such as a cache, random access memory (RAM), read only memory (ROM), flash memory, and/or other memory to store data and/or computer readable-executable instructions, such as the one or more modules 506-512 or a portion or component of one or more modules. In the example of FIG. 5, the modules include a communication module 506, a configuration and device management module 508, a user interface module 510, and a data module 512. The CRM 504 is hardware.

The communication module 506 controls receiving and transmitting communications for the application server 118A, as further discussed herein. The communication module 506 receives one or more communications from and transmits one or more communications to the network server 116, one or more client computing devices 120-122, and one or more mobile devices 124-126. In one aspect, the communication module 506 transmits configurations and configuration changes to the network server, along with device IDs for devices to which the configurations and configuration changes are to be transmitted and to which configurations and configuration changes are to be installed or implemented. In another aspect, the communication module 506 transmits one or more communications for a user interface generated by the user interface module 510 to one or more client computing devices and receives one or more communications from the client computing devices, including requests for data and receipt of configurations and configuration changes. The communication module 506 retrieves data from the database 514 to fulfill data requests and transfers received data to the database. In another aspect, the communication module 506 receives data requests from an application on the one or more mobile devices 124-126, retrieves data from the database 514 for those data requests, and transmits the retrieved data to the mobile device application. In another aspect, the communication module 506 receives data from an application on the one or more mobile devices 124-126 and stores the data in the database 514.

The configuration and device management module 508 manages configurations and configuration changes for one or more tracking devices 104-108 and one or more hub devices 110-114 and transmitting the configurations and configuration changes to hub devices through the communication module 506. For example, the configuration and device management module 508 generates a device ID for a particular tracking device or a particular hub device and a configuration or configuration change for the particular tracking device or the particular hub device and transmits that data to the communication module 506. The configuration and device management module 508 identifies or transmits the device ID and the associated configuration or configuration change for the device ID for or to the communication module 506 for transmission from the application server 118A to the network server 118. In one example, the device ID and the configuration or configuration changes are received from the user interface module 510 and associated by a user with the configuration or configuration change. The configuration and device management module 508 manages a list of all tracking devices 104-108 and hub devices 110-114 in the asset system 102.

The user interface module 510 hosts a website user interface to connect with one or more client computing devices 120-122 and optionally one or more mobile devices 125-126, and that website user interface enables the client computing devices 120-122 and optionally one or more mobile devices 125-126 to view, manipulate, and/or manage the asset data, sensor data, and other data for the tracking devices 104-108, the hub devices 110-114, and the asset devices 128-132 and 136, including the data discussed above.

The user interface module 510 enables one or more users to input data and instructions and view data and instructions for the processes of the application server 118A. For example, the user interface can be generated by the user interface module 510 to a connecting client computing device 120 or 122 via a network connection or to a connected display to view sensor data and other data, configurations, configuration changes, status, states, and information of tracking devices 104-108, hub devices 110-114, and asset devices 128-132 and 136 and other information about the asset tracking system 102 and receive configurations, configuration changes, device IDs, instructions for particular actions to be taken for particular devices in the asset tracking system, data for particular devices in the asset tracking system, or view or input a special offset value (application server offset value) for a pairing quality rating value for one or more hub devices.

The data module 512 stores data from one or more communications in the database 514. For example, the application server 118A may receive sensor data from one or more hub devices 110-114 via the network server 116, which may include sensor data and other data from the hub devices and/or sensor data and other data from one or more tracking devices 104-108. The data module 512 identifies the sensor data and the tracking device or the hub device to which the sensor data originated (e.g. from the device ID sent with the communication) and stores the sensor data with the device ID of the originating device in the database 514. The data further may include one or more of sensor data (sensor reports) for each particular tracking device in the asset tracking system 102, the tracking device's device ID, an identification of the asset device to which the tracking device is attached or associated, the tracking device's location (e.g. latitude and longitude or GPS Coordinates), the tracking device's sensor data (sensor report) time stamp, the tracking device's battery voltage, the tracking device's activity logs, the tracking device's temperature, and the tracking device's configuration version. The data also may include one or more of sensor data for each particular hub device in the asset tracking system 102, the hub device's device ID, an identification of the asset device to which the hub device is attached, connected, or associated, the hub device's location (e.g. latitude and longitude or GPS Coordinates), the hub device's available configuration slots, the hub device's configuration version, the hub device's external power source if present, the hub device's power voltage, and the hub device's tracking device sensor reports.

The data module 512 also retrieves data from the database 514. For example, the application server 118A may receive a request for sensor data or other data from one or more client computing devices 120-122. The data module 512 retrieves the data for those requests from the database 514 and transmits or provides that data to the communication module 506 or user interface module 410 for transmitting to the requesting device. The data module 512 performs and controls aspects of the data storage and retrieval from the database 514 of the application server 118A, as further discussed herein.

The database 514 may include a structured query language (SQL) database, a relational database management system (RDBMS) database, or another type of database management system that stores and communicates data from at least one database. The data stored in the database may be asset data, including data about one or more asset devices to be tracked by the tracking system, among other data. The data may include an identifier for one or more asset devices, a name and/or other metadata for one or more asset devices, an identifier for one or more tracking devices, an identifier for one or more hub devices, and/or sensor data provided by one or more tracking devices and/or one or more hub devices. The sensor data may include temperature data from one or more tracking devices and/or one or more hub devices, accelerometer data from one or more tracking devices and/or one or more hub devices, orientation data from one or more tracking devices and/or one or more hub devices, vibration data from one or more tracking devices and/or one or more hub devices, battery voltage data from one or more tracking devices and/or one or more hub devices, and signal strength data from one or more tracking devices and/or one or more hub devices. The data further may include one or more of sensor data (sensor reports) for each particular tracking device in the asset tracking system 102, the tracking device's device ID, an identification of the asset device to which the tracking device is attached, connected, or associated, the tracking device's location (e.g. latitude and longitude or GPS Coordinates), the tracking device's sensor data (sensor report) time stamp, the tracking device's battery voltage, the tracking device's activity logs, the tracking device's temperature, and the tracking device's configuration version. The data also may include one or more of sensor data for each particular hub device in the asset tracking system 102, the hub device's device ID, an identification of the asset device to which the hub device is attached, connected, or associated, the hub device's location (e.g. latitude and longitude or GPS Coordinates), the hub device's available configuration slots, the hub device's configuration version, the hub device's external power source if present, the hub device's power voltage, and the hub device's tracking device sensor reports.

The input/output (I/O) devices 516 are optional and include hardware input devices to enable a user to interact with functions of the application server 118A or otherwise provide inputs to the application server 118A. Examples of input devices include a mouse, a keyboard, a trackpad, a touchscreen, and/or other input devices. Input devices also include hardware devices to receive configurations, configuration changes, and other data, including universal serial bus (USB) devices, serial or parallel devices, wireless or wired transceivers, and other hardware devices used to receive data and programming at a computing device. The I/O devices 516 also include one or more output devices, such as a display or printing device.

The application server 118A includes one or more transceivers 518 or other communication interfaces to transmit communications to and receive communications from the network server 116, one or more client computing devices 120-122, and one or more mobile devices 124-126. In one example, the transceiver(s) 518 of the application server 118A include a wireless or wired transceiver or other communication interface to transmit communications to and receive communications from a wired or wireless network, such as a cellular network, a narrowband Internet of Things (NB-IoT) network, a wireless or wired broadband network, a wireless or wired narrowband network, the Internet, an intranet, another wired or wireless packet network, or another wired or wireless communication network, as well as various combinations thereof A power system 520 powers the application server 118A. The power system 520 may be, for example, an alternating current and/or direct current power source.

FIG. 6

Figure 6:
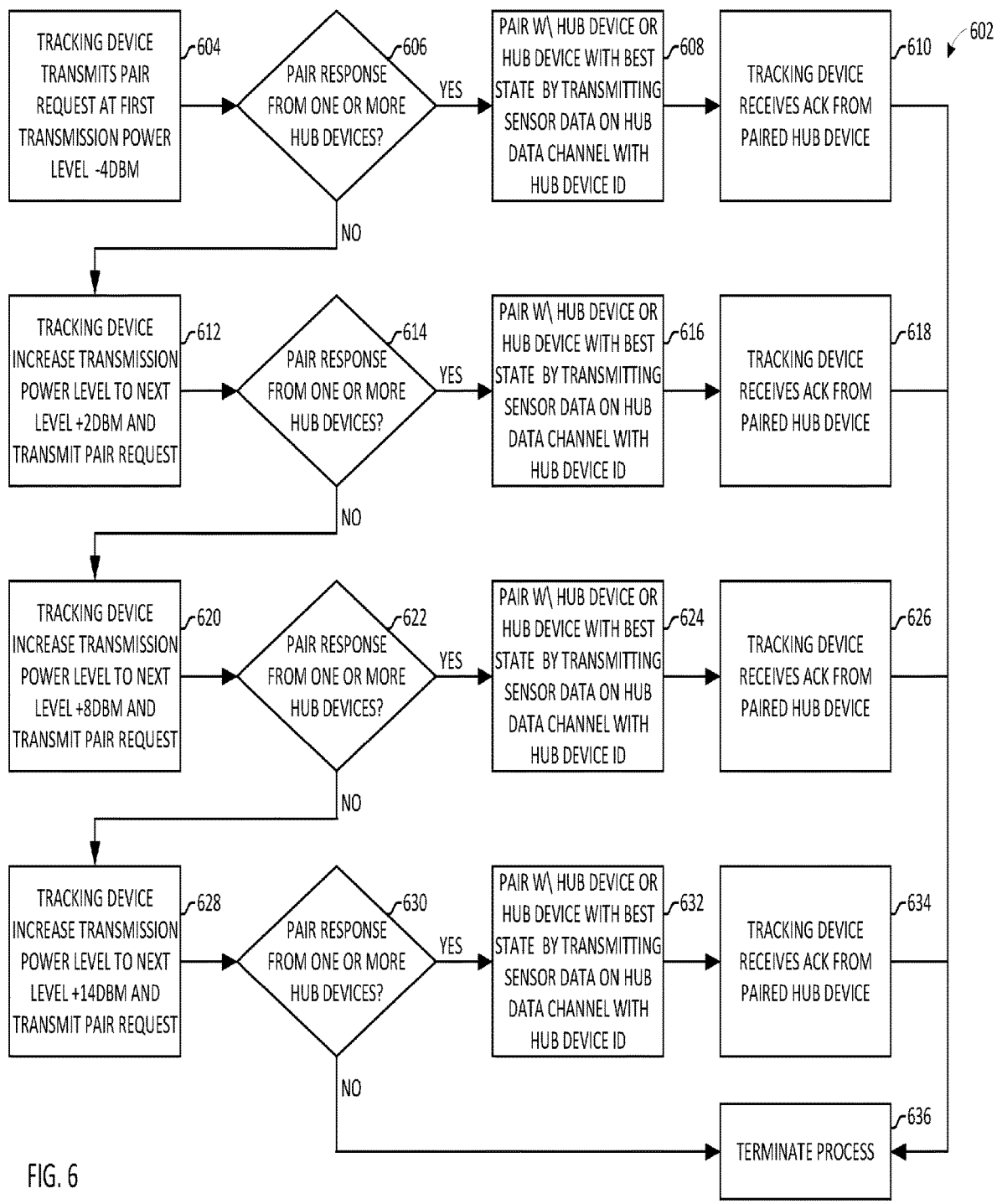
FIG. 6 is a flow diagram of an exemplary embodiment of a pair request process of a tracking device.

FIG. 6 depicts an example embodiment of a communication power transmission level pair request process 602 of a tracking device to successively increase communication power transmission levels to try to pair with one or more hub devices. The power transmission level pair request process 602 is one aspect of a pairing process executed, for example, by the pairing module 212 of a tracking device 104.

In the power transmission level pair request process 602, a tracking device 104 attempts to communicate with a nearby hub device 110-114 using successive increasing communication power transmission levels. At 604, the pairing module 212 of the tracking device 104 generates a first communication (e.g. a pair request) for transmission by the transceiver(s) 218 at a first communication power transmission level (e.g. −4 decibel-milliwatts (dBm)) at a first time of a pairing completion time. For example, the first time may be minute zero of a five minute time or other selected pairing completion time in which pairing is to be completed. The pairing process 602 may start a pairing report timer at the start of the pairing process (e.g. at time zero) and maintain, count, or time the elapsed time for a selected pairing completion time (e.g. five minutes or another selected pairing completion time).

At 606, if the tracking device 104 receives a response to the first communication (e.g. a pair response) from a hub device 110-114, the tracking device optionally increases the communication power transmission level to a second communication power transmission level (e.g. +2 dBM) and transmits its sensor data to the responding hub device (or responding hub device with the best state/PQRV) (e.g. in a sensor report) with the device ID of the responding hub device over a data channel designated by the responding hub device in the responding hub device's response at the first or optionally second communication power transmission level at 608. The tracking device 104 receives an acknowledgement (e.g. a sensor report acknowledgement) at 610 from the responding hub device when the responding hub device receives the sensor data. The tracking device 104 is paired with the responding hub device and may transmit additional sensor data (e.g. in sensor reports) to the paired hub device or receive configurations and configuration changes from the paired hub device. Alternately, the tracking device 104 may pair with a different hub device to transmit additional sensor data (e.g. in sensor reports).

However, if the tracking device 104 does not receive a response to the first communication (e.g. a pair response) at 606, the tracking device increases the power transmission level to a second communication power transmission level (e.g. +2 dBM) and transmits a second communication (e.g. a pair request) at the second communication power transmission level at 612 at a second time of a pairing completion time. For example, the second time may be minute one of a five minute time or other selected pairing completion time in which pairing is to be completed.

At 614, if the tracking device 104 receives a response to the second communication (e.g. a pair response) from a hub device 110-114, the tracking device optionally increases the communication power transmission level to a third communication power transmission level (e.g. +8 dBM) and transmits its sensor data to the responding hub device (or responding hub device with the best state/PQRV) (e.g. in a sensor report) with the device ID of the responding hub device over a data channel designated by the responding hub device in the responding hub device's response at the second or optionally third communication power transmission level at 616. The tracking device 104 receives an acknowledgement (e.g. a sensor report acknowledgement) at 618 from the responding hub device when the responding hub device receives the sensor data. The tracking device 104 is paired with the responding hub device and may transmit additional sensor data (e.g. in sensor reports) to the paired hub device or receive configurations and configuration changes from the paired hub device. Alternately, the tracking device 104 may pair with a different hub device to transmit additional sensor data (e.g. in sensor reports).

However, if the tracking device 104 does not receive a response to the second communication (e.g. a pair response) at 614, the tracking device increases the power transmission level to a third communication power transmission level (e.g. +8 dBM) and transmits a third communication (e.g. a pair request) at the third communication power transmission level at 620 at a third time of a pairing completion time. For example, the third time may be minute two of a five minute time or other selected pairing completion time in which pairing is to be completed.

At 622, if the tracking device 104 receives a response to the third communication (e.g. a pair response) from a hub device 110-114, the tracking device optionally increases the communication power transmission level to a fourth communication power transmission level (e.g. +14 dBM) and transmits its sensor data to the responding hub device (or responding hub device with the best state/PQRV) (e.g. in a sensor report) with the device ID of the responding hub device over a data channel designated by the responding hub device in the responding hub device's response at the third or optionally fourth communication power transmission level at 624. The tracking device 104 receives an acknowledgement (e.g. a sensor report acknowledgement) at 626 from the responding hub device when the responding hub device receives the sensor data. The tracking device 104 is paired with the responding hub device and may transmit additional sensor data (e.g. in sensor reports) to the paired hub device or receive configurations and configuration changes from the paired hub device. Alternately, the tracking device 104 may pair with a different hub device to transmit additional sensor data (e.g. in sensor reports).

However, if the tracking device 104-108 does not receive a response to the third communication (e.g. a pair response) at 622, the tracking device increases the power transmission level to a fourth communication power transmission level (e.g. +14 dBM) and transmits a fourth communication (e.g. a pair request) at the fourth communication power transmission level at 628 at a fourth time of a pairing completion time. For example, the fourth time may be minute three of a five minute time or other selected pairing completion time in which pairing is to be completed.

At 630, if the tracking device 104 receives a response to the fourth communication (e.g. a pair response) from a hub device 110-114, the tracking device optionally increases the communication power transmission level to a fifth communication power transmission level (e.g. +20 dBM) or maintains the fourth communication transmission level if it is the maximum power transmission level and transmits its sensor data to the responding hub device (or responding hub device with the best state/PQRV) (e.g. in a sensor report) with the device ID of the responding hub device over a data channel designated by the responding hub device in the responding hub device's response at the fourth or optionally fifth communication power transmission level at 632. The tracking device 104 receives an acknowledgement (e.g. a sensor report acknowledgement) at 634 from the responding hub device when the responding hub device receives the sensor data. The tracking device 104 is paired with the responding hub device and may transmit additional sensor data (e.g. in sensor reports) to the paired hub device or receive configurations and configuration changes from the paired hub device. Alternately, the tracking device 104 may pair with a different hub device to transmit additional sensor data (e.g. in sensor reports).

However, if the tracking device 104-108 does not receive a response to the fourth communication (e.g. a pair response) from a hub device 110-114 at 630, the tracking device terminates the process at 636, waits a selected wait period of time or for a selected wait interval, and retries the pairing process 602.

In one example, the wait period is the remaining time of the selected pairing completion time, which is the difference between the selected pairing completion time and the elapsed time from the start of the present pairing process 602. In another example, the selected wait period of time or selected wait interval is from thirty seconds to 700 minutes. In another example, the selected wait period of time or selected wait interval starts at four minutes. In another example, the selected wait period of time or selected wait interval is dependent on the number of pairing retry attempts already made (e.g. with either an increasing interval for each successive retry attempt or with a decreasing interval with each retry attempt). In another example, the selected wait interval is the difference between the current time and the next reporting interval. In another example, the tracking device 14-108 waits until the next reporting interval or next activity of a sensor of the tracking device 104 to attempt to pair with a hub device 110-114.

After 634, the tracking device terminates the process at 638 and waits until a next reporting interval or until there is a next activity of a sensor of the tracking device 104.

Of course, the tracking device 104 can be configured to transmit more or less than four pair requests (e.g. a number between 1 and 20) before waiting for the selected wait interval and retrying to pair with a hub device 110-114 or terminating the process. The tracking device 104 also can be configured to transmit pair requests at different successive power transmission levels. For example, the tracking device 104-108 can be configured to transmit successive pair requests at equal power transmission level increases, such as an increase of +2 dBm, +3 dBm, +4 dBm, or another value between +1 dBm and +10 dBm for each successive pair request until the tracking device successfully pairs with a hub device 110-114 or the tracking device stops transmitting pair requests as discussed herein. Alternately, the tracking device 104 can be configured to transmit successive pair requests at unequal power transmission level increases, such as an increase of +2 dBm, then +3 dBm, then +6 dBm, then +3 dBm, and then +4 dBm or different values for the successive communication power transmission level increases until the tracking device successfully pairs with a hub device 110-114 or the tracking device stops transmitting pair requests as discussed herein.

FIGS. 7-8

Figure 7:
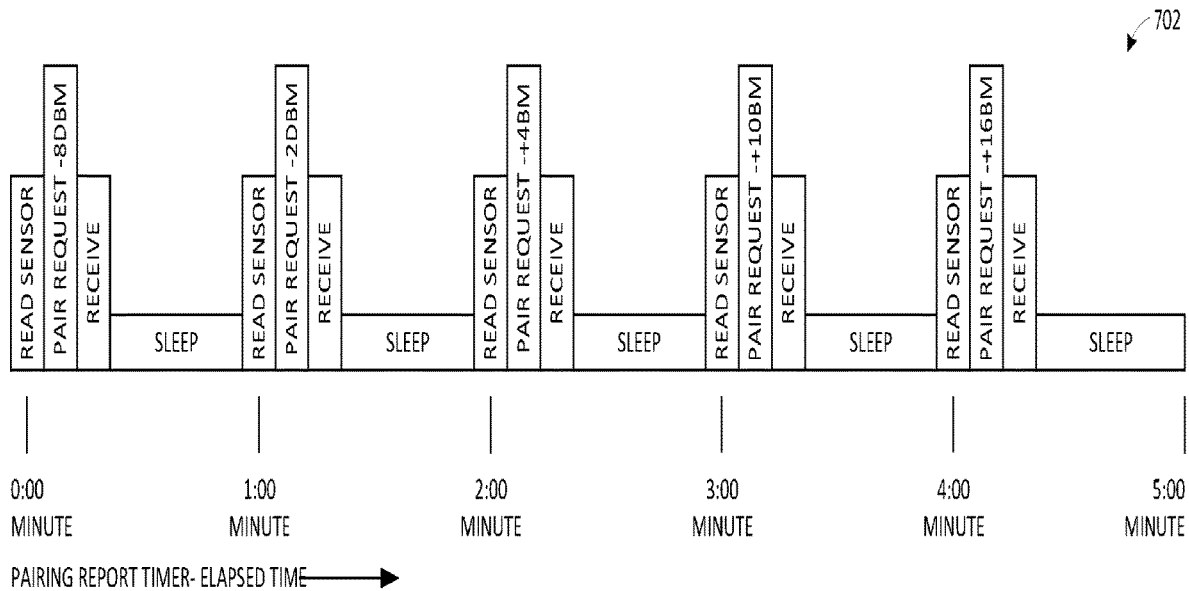
FIGS. 7-8 are diagrams of example embodiments of a pairing report timer process of a tracking device.
Figure 8:
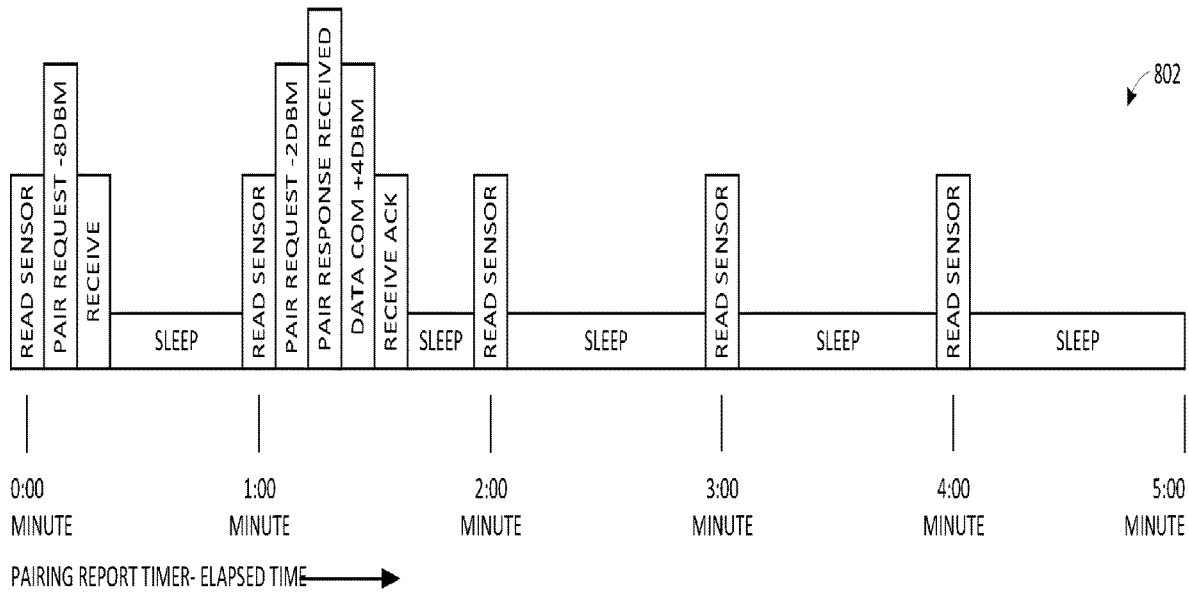

FIGS. 7-8 depict an example embodiment of a pairing report timer process and associated actions for a pairing process to be completed in a selected pairing completion time. The pairing report timer process 702 is one aspect of a pairing process executed, for example, by a pairing module 212 of a tracking device 104. For example, the pairing report timer process 702 of FIGS. 7-8 may be used in conjunction with the pair request process 602 of FIG. 6 and/or the pairing process 1202 of FIG. 12.

Referring to FIG. 7, the pairing report timer process 702 starts a pairing report timer at the start of the pairing process (e.g. at time zero) and maintains, counts, or times the elapsed time for a pairing report timer until a selected pairing completion time (e.g. five minutes or another selected pairing completion time). At a first time (e.g. time zero), the sensing module 210 reads the sensor 208. The pairing module 212 of the tracking device 104 then starts the pairing report timer of process 702. The tracking device 104 transmits a first pair request at a first communication power transmission level (e.g. −8 dBm) and waits to receive a pair response for a sleep period. The time between (a) the first time the sensor is read and the first pair request is transmitted in the process 702 and (b) the second time the sensor optionally is read and the second pair request is transmitted is the pairing retry period, which in this case is one minute. The time between transmission of the pair request and the next report timer interval is a sleep period in FIG. 7.

The tracking device 104 does not receive a pair response to the first pair request by the end of the sleep period. Therefore, the tracking device 104 optionally reads its sensor and transmits a second pair request at a second communication power transmission level (e.g. −2 dBm) at a second time (e.g. one minute) of a pairing report timer and waits to receive a pair response for the sleep period. If the tracking device 104 does not receive a pair response within the pairing retry period or sleep period, the tracking device will transmit another pair request at the next pairing retry period and at the next communication power transmission level.

In the example of FIG. 7, the tracking device 104 does not receive a pair response to its second pair request during the second pairing retry period or sleep period. Therefore, the tracking device 104 optionally reads its sensor and transmits a third pair request at a third communication power transmission level (e.g. +4 dBm) at a third time (e.g. two minutes) of a pairing report timer and waits to receive a pair response for the sleep period.

The tracking device 104 does not receive a pair response to the third pair request during the third pairing retry period or sleep period. Therefore, the tracking device 104 optionally reads its sensor and transmits a fourth pair request at a fourth communication power transmission level (e.g. +10 dBm) at a fourth time (e.g. three minutes) of a pairing report timer and waits to receive a pair response for the sleep period.

The tracking device 104 does not receive a pair response to the fourth pair request during the fourth pairing retry period or sleep period. Therefore, the tracking device 104 optionally reads its sensor and transmits a fifth pair request at a fifth communication power transmission level (e.g. +16 dBm or at the fourth communication power transmission level if the fourth communication power transmission level is the maximum communication power transmission level) at a fifth time (e.g. four minutes) of a pairing report timer and waits to receive a pair response for the sleep period. The pairing report timer expires at the paring completion time, which in this case is five minutes, and the process 702 terminates. The process 702 optionally waits for a wait period, and restarts the process.

Referring to FIG. 8, the pairing report timer process 802 starts a pairing report timer at the start of the pair request process (e.g. at time zero) and maintains, counts, or times the elapsed time for a pairing report timer until a selected pairing completion time (e.g. five minutes or another selected pairing completion time). At a first time (e.g. time zero), the sensing module 210 reads the sensor 208. The pairing module 212 of the tracking device 104 then starts the pairing report timer of process 802. The tracking device 104 transmits a first pair request at a first communication power transmission level (e.g. −8 dBm) and waits to receive a pair response for a sleep period.

The tracking device 104 does not receive a pair response to the first pair request by the end of the first sleep period. Therefore, the tracking device 104 optionally reads its sensor and transmits a second pair request at a second communication power transmission level (e.g. −2 dBm) at a second time (e.g. one minute) of a pairing report timer and waits to receive a pair response for the sleep period. The tracking device 104 receives a pair response during the pairing retry period or sleep period from a responding hub device, and the tracking device transmits its sensor data and the responding hub device's device ID to the responding hub device optionally at a next higher communication power transmission level (e.g. +4 dBM) in a sensor report over the data channel designated by the responding hub device in the pair response. The tracking device 104 receives a sensor report acknowledgement from the responding hub device, and the tracking device sleeps until the next reporting interval or activity of the tracking device's sensor.

FIG. 9

Figure 9:
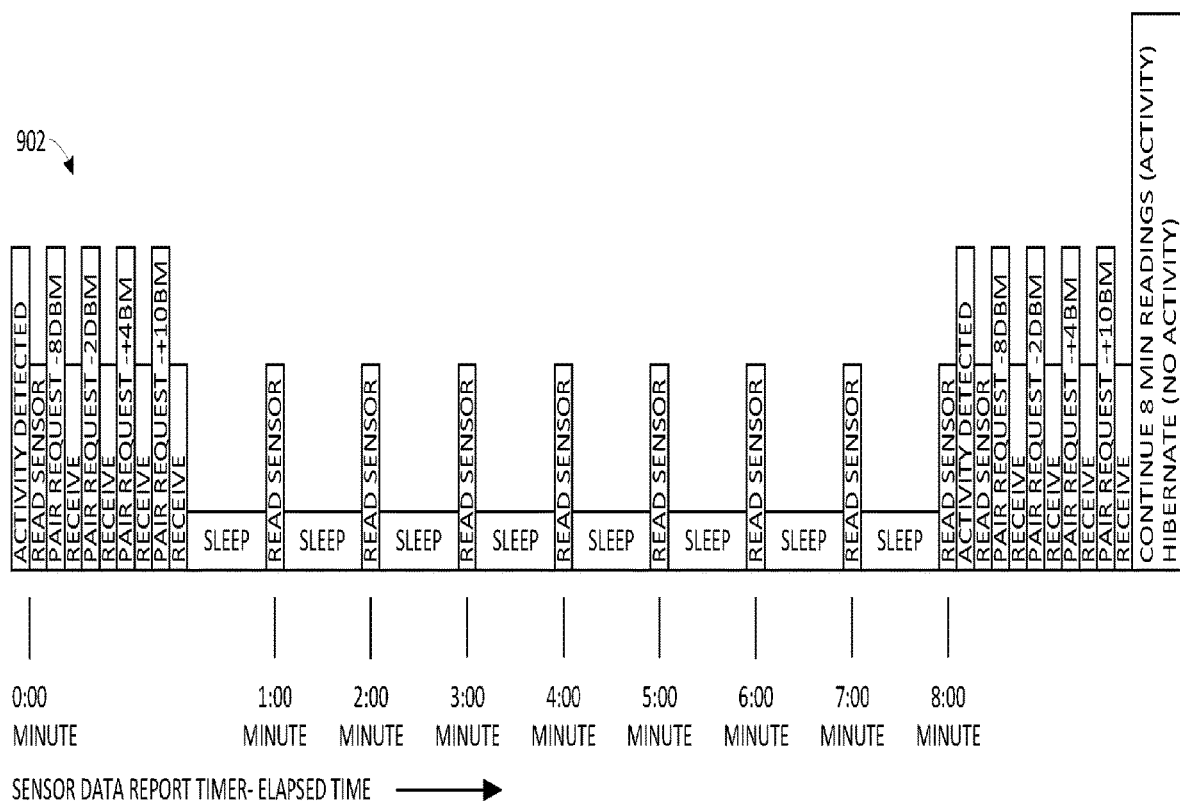
FIG. 9 is a diagram of an example embodiment of a wake on activity mode process of a tracking device.

FIG. 9 depicts an example embodiment of a sensor data reporting process 902 in a tracking device configured for the wake on activity mode and associated actions. In this example, the tracking device is configured with a selected sensor reading interval (e.g. every minute), a selected sensor data reporting interval (e.g. every eight minutes or multiples of every eight minutes up to 720 minutes), and a selected pair request timeout period (in this example, 500 milliseconds). The pair request timeout period is the period of time the tracking device 104-108 waits after transmitting a pair request to receive a pair response from a hub device 110-114 before transmitting another pair request. In this example, the selected pair request timeout period is 500 milliseconds. However, a different pair request timeout period may be selected, such as 250 milliseconds or a period between 10 milliseconds and 30 minutes. The sensor data reporting process 902 is one aspect of a process executed, for example, by a sensor module 210 and a pairing module 212 of a tracking device 104. For example, the sensor data reporting process 902 of FIG. 9 may be used in conjunction with the pair request process 602 of FIG. 6 and/or the pairing process 1202 of FIG. 12.

Referring to FIG. 9, the sensor data reporting process 902 starts a sensor data reporting timer at the start of the process (e.g. at time zero) and maintains, counts, or times the elapsed time for a sensor data reporting timer for the selected sensor data reporting interval (e.g. eight minutes or another selected pairing completion time). At a first time (e.g. time zero), the sensor 208 (e.g. accelerometer) of the tracking device 104 senses activity. This causes an interrupt in the sensing module 210 to read the sensor 208 and the pairing module 212 of the tracking device 104 to start the sensor data reporting process 902.

The tracking device 104 transmits a first pair request at a first communication power transmission level (e.g. −8 dBm) and waits to receive a pair response for a selected pair request timeout period. The tracking device 104 does not receive a pair response to the first pair request by the end of the selected pair request timeout period. Therefore, the tracking device 104 transmits a second pair request at a second communication power transmission level (e.g. −2 dBm) and waits to receive a pair response. The tracking device 104 does not receive a pair response to the second pair request by the end of the selected pair request timeout period. Therefore, the tracking device 104 transmits a third pair request at a third communication power transmission level (e.g. +4 dBm) and waits to receive a pair response. The tracking device 104 does not receive a pair response to the third pair request by the end of the selected pair request timeout period. Therefore, the tracking device 104 transmits a fourth pair request at a fourth communication power transmission level (e.g. +10 dBm) and waits to receive a pair response. The tracking device 104 does not receive a pair response to its fourth pair request and sleeps (hibernates) for the remainder of the selected sensor reading interval (e.g. the remainder of the minute 0-1 of the sensor data reporting timer). In this example, the tracking device 104 does not successfully pair with a hub device 110-114.

When the sensor data reporting timer reaches the second time (e.g. the end of minute one of timer period 0-1 of the sensor data reporting timer), the sensor module 210 reads the sensor 208 and then sleeps (hibernates) for the remainder of the selected sensor reading interval (e.g. the remainder of minute two of timer period 1-2 of the sensor data reporting timer).

When the sensor data reporting timer reaches the third time (e.g. the end of minute 2 of timer period 1-2 of the sensor data reporting timer), the sensor module 210 reads the sensor 208 and then sleeps (hibernates) for the remainder of the selected sensor reading interval (e.g. the remainder of timer period 2-3 of the sensor data reporting timer).

When the sensor data reporting timer reaches the fourth time (e.g. the end of minute 3 of timer period 2-3 of the sensor data reporting timer), the sensor module 210 reads the sensor 208 and then sleeps (hibernates) for the remainder of the selected sensor reading interval (e.g. the remainder of timer period 3-4 of the sensor data reporting timer).

When the sensor data reporting timer reaches the fifth time (e.g. the end of minute 4 of timer period 3-4 of the sensor data reporting timer), the sensor module 210 reads the sensor 208 and then sleeps (hibernates) for the remainder of the selected sensor reading interval (e.g. the remainder of timer period 5-6 of the sensor data reporting timer).

When the sensor data reporting timer reaches the sixth time (e.g. the end of minute 5 of timer period 5-6 of the sensor data reporting timer), the sensor module 210 reads the sensor 208 and then sleeps (hibernates) for the remainder of the selected sensor reading interval (e.g. the remainder of timer period 6-7 of the sensor data reporting timer).

When the sensor data reporting timer reaches the seventh time (e.g. the end of minute 6 of timer period 6-7 of the sensor data reporting timer), the sensor module 210 reads the sensor 208 and then sleeps (hibernates) for the remainder of the selected sensor reading interval (e.g. the remainder of timer period 7-8 of the sensor data reporting timer).

When the sensor data reporting timer reaches the eighth time (e.g. the end of minute 7 of timer period 7-8 of the sensor data reporting timer), the pairing module 212 attempts to pair with a hub device 110-114 and transmit the sensor data collected at times 0, 1, 2, 3, 4, 5, 6, and 7 (for a total of eight sensor readings) to the hub device.

In order to report the collected sensor data, the tracking device 104 transmits a first pair request at a first communication power transmission level (e.g. −8 dBm) and waits to receive a pair response for a selected pair request timeout period. The tracking device 104 does not receive a pair response to the first pair request by the end of the selected pair request timeout period. Therefore, the tracking device 104 transmits a second pair request at a second communication power transmission level (e.g. −2 dBm) and waits to receive a pair response. The tracking device 104 does not receive a pair response to the second pair request by the end of the selected pair request timeout period. Therefore, the tracking device 104 transmits a third pair request at a third communication power transmission level (e.g. +4 dBm) and waits to receive a pair response. The tracking device 104 does not receive a pair response to the third pair request by the end of the selected pair request timeout period. Therefore, the tracking device 104 transmits a fourth pair request at a fourth communication power transmission level (e.g. +10 dBm) and waits to receive a pair response. The tracking device 104 does not receive a pair response to its fourth pair request and sleeps (hibernates) for the remainder of the selected sensor reading interval (e.g. the remainder of the minute 0-1 of the sensor data reporting timer). In this example, the tracking device 104 does not successfully pair with a hub device 110-114. The process 902 continues.

FIG. 10

Figure 10:
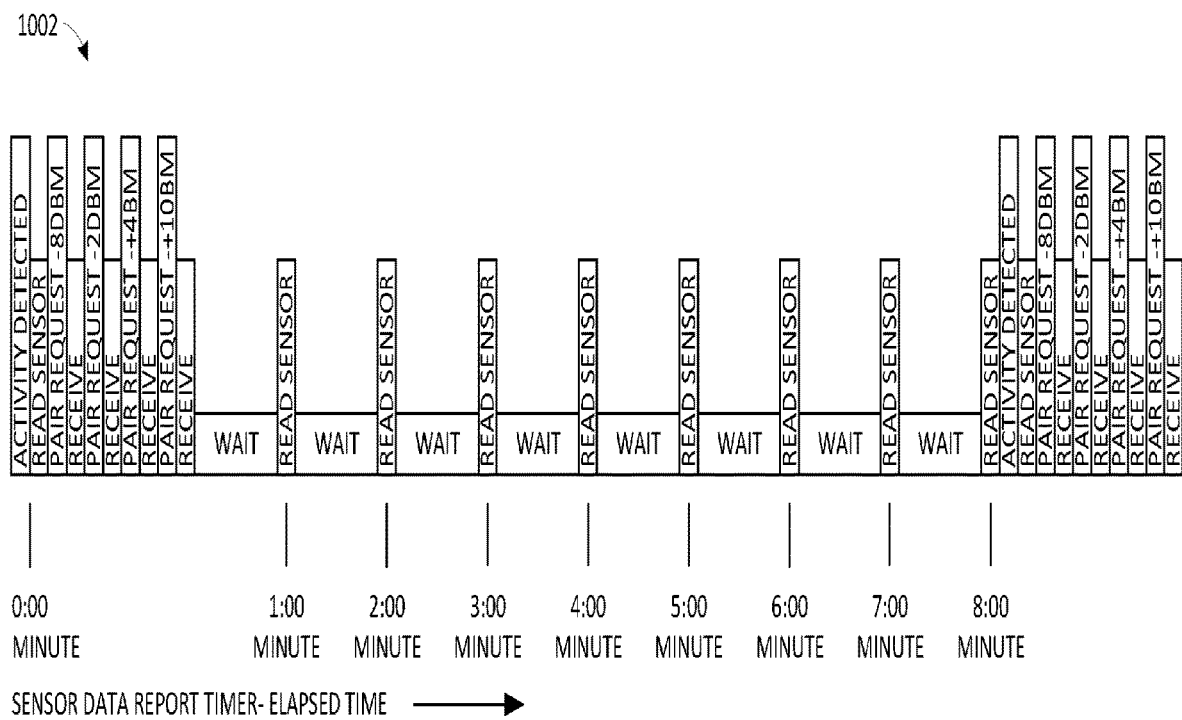
FIG. 10 is a diagram of an example embodiment of a timer mode process of a tracking device.

FIG. 10 depicts an example embodiment of a sensor data reporting process 1002 in a tracking device configured for the timer mode and associated actions. In this example, the tracking device is configured with a selected sensor reading interval (e.g. every minute), a selected sensor data reporting interval (e.g. every eight minutes or multiples of every eight minutes up to 720 minutes), and a selected pair request timeout period (e.g. 500 milliseconds). The pair request timeout period is the period of time the tracking device 104-108 waits after transmitting a pair request to receive a pair response from a hub device 110-114 before transmitting another pair request. In this example, the selected pair request timeout period is 500 milliseconds. However, a different pair request timeout period may be selected, such as 250 milliseconds or a period between 10 milliseconds and 30 minutes. The sensor data reporting process 1002 is one aspect of a process executed, for example, by a sensor module 210 and a pairing module 212 of a tracking device 104. For example, the sensor data reporting process 1002 of FIG. 10 may be used in conjunction with the pair request process 602 of FIG. 6 and/or the pairing process 1202 of FIG. 12.

Referring to FIG. 10, the sensor data reporting process 1002 starts a sensor data reporting timer at the start of the process (e.g. at time zero) and maintains, counts, or times the elapsed time for a sensor data reporting timer for the selected sensor data reporting interval (e.g. eight minutes or another selected pairing completion time). At a first time (e.g. time zero), the sensing module 210 automatically reads the sensor 208 and the pairing module 212 of the tracking device 104 starts the sensor data reporting process 902.

The tracking device 104 transmits a first pair request at a first communication power transmission level (e.g. −8 dBm) and waits to receive a pair response for a selected pair request timeout period. The tracking device 104 does not receive a pair response to the first pair request by the end of the selected pair request timeout period. Therefore, the tracking device 104 transmits a second pair request at a second communication power transmission level (e.g. −2 dBm) and waits to receive a pair response. The tracking device 104 does not receive a pair response to the second pair request by the end of the selected pair request timeout period. Therefore, the tracking device 104 transmits a third pair request at a third communication power transmission level (e.g. +4 dBm) and waits to receive a pair response. The tracking device 104 does not receive a pair response to the third pair request by the end of the selected pair request timeout period. Therefore, the tracking device 104 transmits a fourth pair request at a fourth communication power transmission level (e.g. +10 dBm) and waits to receive a pair response. The tracking device 104 does not receive a pair response to its fourth pair request and waits for the remainder of the selected sensor reading interval (e.g. the remainder of the minute 0-1 of the sensor data reporting timer). In this example, the tracking device 104 does not successfully pair with a hub device 110-114.

When the sensor data reporting timer reaches the second time (e.g. the end of minute one of timer period 0-1 of the sensor data reporting timer), the sensor module 210 reads the sensor 208 and then waits (optionally sleeps) for the remainder of the selected sensor reading interval (e.g. the remainder of minute two of timer period 1-2 of the sensor data reporting timer).

When the sensor data reporting timer reaches the third time (e.g. the end of minute 2 of timer period 1-2 of the sensor data reporting timer), the sensor module 210 reads the sensor 208 and then waits (optionally sleeps) for the remainder of the selected sensor reading interval (e.g. the remainder of timer period 2-3 of the sensor data reporting timer).

When the sensor data reporting timer reaches the fourth time (e.g. the end of minute 3 of timer period 2-3 of the sensor data reporting timer), the sensor module 210 reads the sensor 208 and then waits (optionally sleeps) for the remainder of the selected sensor reading interval (e.g. the remainder of timer period 3-4 of the sensor data reporting timer).

When the sensor data reporting timer reaches the fifth time (e.g. the end of minute 4 of timer period 3-4 of the sensor data reporting timer), the sensor module 210 reads the sensor 208 and then waits (optionally sleeps) for the remainder of the selected sensor reading interval (e.g. the remainder of timer period 5-6 of the sensor data reporting timer).

When the sensor data reporting timer reaches the sixth time (e.g. the end of minute 5 of timer period 5-6 of the sensor data reporting timer), the sensor module 210 reads the sensor 208 and then waits (optionally sleeps) for the remainder of the selected sensor reading interval (e.g. the remainder of timer period 6-7 of the sensor data reporting timer).

When the sensor data reporting timer reaches the seventh time (e.g. the end of minute 6 of timer period 6-7 of the sensor data reporting timer), the sensor module 210 reads the sensor 208 and then waits (optionally sleeps) for the remainder of the selected sensor reading interval (e.g. the remainder of timer period 7-8 of the sensor data reporting timer).

When the sensor data reporting timer reaches the eighth time (e.g. the end of minute 7 of timer period 7-8 of the sensor data reporting timer), the pairing module 212 attempts to pair with a hub device 110-114 and transmit the sensor data collected at times 0, 1, 2, 3, 4, 5, 6, and 7 (for a total of eight sensor readings) to the hub device.

In order to report the collected sensor data, the tracking device 104 transmits a first pair request at a first communication power transmission level (e.g. −8 dBm) and waits to receive a pair response for a selected pair request timeout period. The tracking device 104 does not receive a pair response to the first pair request by the end of the selected pair request timeout period. Therefore, the tracking device 104 transmits a second pair request at a second communication power transmission level (e.g. −2 dBm) and waits to receive a pair response. The tracking device 104 does not receive a pair response to the second pair request by the end of the selected pair request timeout period. Therefore, the tracking device 104 transmits a third pair request at a third communication power transmission level (e.g. +4 dBm) and waits to receive a pair response. The tracking device 104 does not receive a pair response to the third pair request by the end of the selected pair request timeout period. Therefore, the tracking device 104 transmits a fourth pair request at a fourth communication power transmission level (e.g. +10 dBm) and waits to receive a pair response. The tracking device 104 does not receive a pair response to its fourth pair request and waits for the remainder of the selected sensor reading interval (e.g. the remainder of the minute 0-1 of the sensor data reporting timer). In this example, the tracking device 104 does not successfully pair with a hub device 110-114. The process 1002 continues.

FIG. 11

FIG. 11 depicts an example embodiment of a sensor data queue of a pairing process of a tracking device. The pairing sensor data queue process 1102 is one aspect of a pairing process executed, for example, by a pairing module 212 of a tracking device 104. In this example, the pairing sensor data queue process 1102 of a tracking device 104 maintains a queue of one or more sensor readings that have not yet been transmitted to a hub device. The sensor readings (sensor readings) are measurements taken by the tracking device's sensor at different times, which may be sequential times. The pairing sensor data queue process 1102 also resends sensor data reports to a selected hub device if a sensor report acknowledgement is not received by the tracking device from the selected hub device. In this example, the pairing module 212 is configured with a retry number for the number of retries the pairing sensor data queue process 1102 may attempt to transmit the sensor report to the selected hub device before invalidating the pairing with the selected hub device.

In the example of FIG. 11, the pairing module 212 of a tracking device 104 starts the pairing sensor data queue process 1102 when the sensor of the tracking device senses activity or alternately at a tracking device reporting interval at 1104. At 1106, the tracking device 104 transmits a pair request, optionally with a minimum pairing quality rating value or minimum state value. At 1108, the tracking device 104 receives pair responses from multiple hub devices, and each pair response contains a hub device ID of the responding hub device, a data channel over which the tracking device should transmit and the responding hub device will receive the sensor data, a pairing quality rating value or state value, and an RSSI of the pair request from the tracking device 104. At 1110, the tracking device 104 selects one of the responding hub devices with the best pairing quality rating value or best state value for pairing, and the selected hub device optionally has a pairing quality rating value or state value greater than the minimum pairing quality rating value or minimum state value required by the tracking device 104. At 1112, the tracking device 104 transmits its sensor data and the selected hub device's device ID to the selected hub device in a communication (e.g. in a sensor report) over the data channel designated by the selected hub device in the selected hub device's pair response.

At 1114, if the tracking device 104 receives a sensor report acknowledgement from the selected hub device, the tracking device removes the transmitted sensor data from its sensor data queue at 1116. At 1118, the tracking device 104 determines if the sensor data queue has other sensor readings. If the sensor data queue does not have other sensor readings at 1118, the sensor data transmission of the pairing sensor data queue process 1102 ends at 1120.

At 1118, if the sensor data queue does have other sensor readings, the tracking device 104 transmits its next sensor data from the sensor data queue and the selected hub device's device ID to the selected hub device in a communication (e.g. in a sensor report) over the data channel designated by the selected hub device in the selected hub device's pair response at 1122. The process then proceeds back to 1114.

At 1114, if the tracking device 104 does not receive a sensor report acknowledgement from the selected hub device (after the tracking device transmits the sensor report to the selected hub device), the tracking device increases a retry number for the number of retries the tracking device may attempt to transmit the sensor report to the selected hub device at 1124 and determines if the current retry number is equal to a maximum retry number. If the retry number is not equal to a maximum retry number at 1124, the process 1102 proceeds to 1112 where the tracking device retransmits the sensor data and the selected hub device's device ID to the selected hub device in a communication (e.g. in a sensor report) over the data channel designated by the selected hub device in the selected hub device's pair response. If the retry number is equal to the maximum retry number at 1124, the tracking device 104 invalidates the pairing with the selected hub device at 1126 and restarts the pairing process. FIG. 12

FIG. 12 depicts an example embodiment of a pairing process of a hub device. The pairing process 1202 is one aspect of a pairing process executed, for example, by a pairing module 312 of a hub device 110.

At 1204, the hub device 110 receives a pair request. The hub device 110 determines a pairing quality rating value or hub device state value at 1206. The hub device 110 transmits the pairing quality rating value or hub device state value, the hub device's device ID, a data channel over which the tracking device should transmit and the hub device will receive the sensor data from the tracking device (e.g. sensor report), and the RSSI of the pair request to the tracking device at 1208. The hub device 110 receives the sensor data and the hub device's device ID from the tracking device (e.g. in a sensor report) over the data channel designated by the hub device in its pair response at 1210. The hub device 110 transmits an acknowledgement (e.g. sensor report acknowledgement) to the tracking device at 1212 to indicate the hub device received the sensor data (e.g. sensor report). The hub device 110 then may receive other sensor reports from the paired tracking device and/or transmit configurations or configuration changes to the paired tracking device.

It is believed that the present disclosure and many of its attendant advantages will be understood by the foregoing description, and it will be apparent that various changes may be made in the form, construction, or arrangement of the components without departing from the disclosed subject matter or without sacrificing all of its material advantages. The form described is explanatory, and it is the intention of the following claims to encompass and include such changes.

While the present disclosure has been described with reference to various embodiments, these embodiments are illustrative, and the scope of the disclosure is not limited to them. More generally, embodiments in accordance with the present disclosure have been described in the context of particular implementations. Variations, modifications, additions, and improvements are possible without departing from the scope of the disclosure. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   transmitting a pair request from a tracking device connectable to an asset device;
   receiving the pair request at a hub device;
   at the hub device, determining a value based on a plurality of states of the hub device and transmitting a pair response with the value, wherein the plurality of states of the hub device used by the hub device to determine the value comprise at least:
     a received signal strength indicator (RSSI) of the pair request,
     a power status of the hub device indicative of whether or not the hub device is connected to an external power source,
     a signal strength of a cellular signal at the hub device, and
     a special offset value provided by a network server;
   receiving the pair response with the value from the hub device at the tracking device;
   selecting, by the tracking device, the hub device with which to pair based on the value in the pair response;
   sensing activity of the asset device by at least one sensor of the tracking device; and
   transmitting one or more communications with sensor data of activity of the asset device to the hub device.

2. The method of claim 1 wherein the tracking device selects the hub device with a best value in the pair response from the hub device from a plurality of pair responses received from the plurality of hub devices.

3. The method of claim 1 wherein the plurality of states used by the hub device to determine the value further comprise one or more of:
   how close the hub device is to a maximum value of a duty cycle for the hub device,
   a ground speed of the hub device,
   the ground speed of the hub device over a period of time, and
   a determination by the hub device if there is activity of another asset device to which the hub device is connected based on one or more sensor readings of one or more sensors of the hub device.

4. The method of claim 1 wherein each state has a state value and a de-rating value corresponding to the state value, wherein each de-rating value is subtracted from a starting value to result in the value.

5. The method of claim 1 wherein the tracking device requires the hub device to have a minimum value to pair with the tracking device, and the tracking device transmits the minimum value in the request.

6. The method of claim 5 wherein the tracking device selects the hub device for pairing when the hub device has the value greater than or equal to the minimum value and a best value in the response from the hub device from among a plurality of responses received from a plurality of hub devices.

7. The method of claim 1 wherein:
the hub device transmits the received signal strength indicator (RSSI) of the pair request with the pair response; and
if two or more hub devices respond in pair responses with a same best value, the tracking device selects the hub device for pairing when the hub device has a greater RSSI of the pair request received at the hub device.

8. The method of claim 1 wherein:
the hub device transmits the received signal strength indicator (RSSI) of the pair request with the pair response; and
if two or more hub devices respond in pair responses with a same best value and a same RSSI of the pair request received at the two or more hub devices, the tracking device selects the hub device for pairing when the response from the hub device is a first received response by the tracking device.

9. The method of claim 1 wherein:
the hub device transmits to the tracking device a device identification of the hub device and an identification of a data channel over which to receive sensor data from the tracking device; and
a pairing between the tracking device and the hub device is complete when the hub device receives the sensor data of the activity of the asset device and the device identification of the hub device over the data channel.

10. The method of claim 1 wherein:
the tracking device attempts to pair with one or more hub devices within a pairing completion time; and
if the tracking device does not receive at least one pair response within a pair request timeout period, the tracking device transmits another pair request at each pairing retry interval within the pairing completion time until the tracking device receives the at least one pair response or the pairing completion time ends.

11. The method of claim 1 wherein:
the tracking device transmits the pair request at a first transmission power level; and
if the tracking device receives the pair response from the hub device and selects the hub device for pairing, the tracking device transmits the sensor data of the activity of the asset device to the hub device at a second transmission power level that exceeds the first transmission power level.

12. The method of claim 1 wherein the at least one sensor is selected as at least one of an accelerometer, an orientation sensor, a vibration sensor, and a temperature sensor.

13. The method of claim 1 wherein the at least one sensor takes a sensor reading at a sensor reading interval and the tracking device pairs with the hub device at a sensor data reporting interval to transmit the one or more communications with the sensor data of the activity of the asset device to the hub device.

14. The method of claim 1 wherein the tracking device operates in:
a first mode in which the tracking device attempts to report activity or no activity of the asset device at a selected interval; or
a second mode in which the tracking device attempts to report activity to the hub device upon the at least one sensor of the tracking device sensing the activity of the asset device.

15. The method of claim 1 wherein the hub device transmits an identification of a data channel to the tracking device in the pair response from the hub device, and the tracking device transmits the one or more communications with the sensor data of the activity of the asset device to the hub device over the data channel identified by the hub device.

16. The method of claim 1 wherein the hub device transmits an identification of the hub device to the tracking device in the pair response from the hub device and the tracking device transmits the identification of the hub device in the one or more communications transmitted to the hub device.

17. The method of claim 16 wherein the hub device transmits the sensor data of the activity of the asset device to the network server only when the one or more communications from the tracking device contain the identification of the hub device.

18. The method of claim 16 wherein the hub device transmits the sensor data of the activity of the asset device to the network server only when the one or more communications from the tracking device contain an application identification matching an application identification of the hub device.

19. The method of claim 1 wherein the tracking device and the hub device communicate using a long range (LoRa) communication.

20. The method of claim 1 wherein the tracking device and the hub device communicate over at least one of a long range (LoRa) communication network, an Internet of Things (IoT) network, a cellular network, a wireless broadband network, an Internet Protocol (IP) network, a wireless packet network, a wireless application protocol (WAP) network, and a WiFi network.

21. The method of claim 1 wherein the tracking device transmits the sensor data of the activity of the asset device to the hub device in a binary encoded data communication.

22. The method of claim 1 wherein the hub device transmits the sensor data of the activity of the asset device to the network server in a binary encoded data communication.

23. The method of claim 1 further comprising enabling tracking devices and hub devices for operation and disabling other tracking devices and other hub devices for no operation using a mobile device application on a mobile device.

24. The method of claim 1 wherein the hub device transmits the sensor data of the activity of the asset device to the network server.

25. The method of claim 24 wherein the hub device and the network server communicate over at least one of a cellular network, a narrowband Internet of Things (NB-IoT) network, a Bluetooth connection network, a Bluetooth Low Energy (BLE) connection network, a WiFi network, a LoRa communication network, a wireless broadband network, a wired broadband network, a wireless narrowband network, a wired narrowband network, the Internet, an intranet, a wired packet network, and a wireless packet network.

26. The method of claim 24 further comprising transmitting the sensor data of the activity of the asset device from the network server to an application server and storing the sensor data of the activity of the asset device in a database.

27. The method of claim 26 wherein the application server generates a user interface that enables a client computing device to manage at least one of sensor activity data and asset data stored in the database.

28. The method of claim 1 wherein:
the hub device operates in a normal power operating mode when the hub device is connected to an external power source or a battery voltage of an internal battery of the hub device is greater than a first battery voltage threshold;
the hub device operates in a reduced power operating mode when the hub device is not connected to an external power source and the battery voltage of the internal battery of the hub device is less than or equal to the first battery voltage threshold and greater than a second battery voltage threshold; and
the hub device operates in a low power operating mode when the hub device is not connected to the external power source and the battery voltage of the internal battery of the hub device is less than or equal to the second battery voltage threshold.

29. The method of claim 1 wherein the asset device is selected as at least one of a shovel, a rake, a ladder, a hand tool, a tool attachment, a powered tool, and a machine.

30. The method of claim 1 wherein the tracking device comprises at least two tracking device long range (LoRa) transceivers, the hub device comprises at least two hub device LoRa transceivers, the tracking device transmits the pair request over a control channel from a first tracking device LoRa transceiver, the hub device receives the pair request over the control channel at a first hub device LoRa transceiver, the hub device transmits the pair response from the first hub device LoRa transceiver over the control channel to the first tracking device LoRa transceiver, the pair response identifies a data channel over which the tracking device is to transmit the sensor data of the activity of the asset device, the tracking device transmits the sensor data of the activity of the asset device over the data channel from a second tracking device LoRa transceiver, and the hub device receives the sensor data of the activity of the asset device over the data channel at a second hub device LoRa transceiver.

* * * * *